United States Patent
Ragner

(10) Patent No.: US 7,814,554 B1
(45) Date of Patent: Oct. 12, 2010

(54) DYNAMIC ASSOCIATIVE STORAGE SECURITY FOR LONG-TERM MEMORY STORAGE DEVICES

(76) Inventor: Gary Dean Ragner, 711 SW. 75th St., Apt. #103, Gainesville, FL (US) 32607

( * ) Notice: Subject to any disclaimer, the term of this patent is extended or adjusted under 35 U.S.C. 154(b) by 1546 days.

(21) Appl. No.: 10/983,320

(22) Filed: Nov. 6, 2004

Related U.S. Application Data

(60) Provisional application No. 60/607,444, filed on Sep. 3, 2004, provisional application No. 60/517,745, filed on Nov. 6, 2003.

(51) Int. Cl.
G06F 21/00 (2006.01)
G06F 21/02 (2006.01)
G06F 21/22 (2006.01)

(52) U.S. Cl. ............... 726/27; 726/26; 726/30; 713/193; 713/165

(58) Field of Classification Search ............ 726/26, 726/27, 30; 711/163, 155, 152, 117; 713/193, 713/187, 165
See application file for complete search history.

(56) References Cited

U.S. PATENT DOCUMENTS

| | | | | |
|---|---|---|---|---|
| 6,588,010 B1 * | 7/2003 | Ogata | ............... | 717/169 |
| 6,671,786 B2 * | 12/2003 | Wang et al. | ............... | 711/162 |
| 6,775,754 B2 * | 8/2004 | Okaue et al. | ............... | 711/163 |
| 6,826,097 B2 * | 11/2004 | Kang | ............... | 365/196 |
| 6,961,833 B2 * | 11/2005 | Leung | ............... | 711/163 |
| 7,035,990 B1 * | 4/2006 | Muhlbauer | ............... | 711/172 |
| 2003/0056070 A1 * | 3/2003 | Dayan et al. | ............... | 711/163 |
| 2003/0061504 A1 * | 3/2003 | Sprigg et al. | ............... | 713/200 |
| 2005/0091192 A1 * | 4/2005 | Probert et al. | ............... | 707/1 |

* cited by examiner

Primary Examiner—Jung Kim
Assistant Examiner—Izunna Okeke

(57) ABSTRACT

A hierarchical folder security system for mapping files into and out of alias directories and/or real directories depending on: 1) the directory of the specific file being accessed, 2) the program thread requesting access to a memory storage device (114), and 3) the type of access request being made (i.e. load, save, run, etc.). For write access requests (i.e. save, modify, paste, delete, cut, move, rename, etc.), security controller (180) determines if the requested folder access address (150a) is associated with the requesting program's folder address (168). If it is, the file is written at absolute address (156b) on disk platter (160) through real folder map (152). If requested address (150a) is not associated with program folder address (168), then an alias directory address is created and the file is written at alias address (156a) through alias folder address map (154).

34 Claims, 16 Drawing Sheets

Figure 1B:
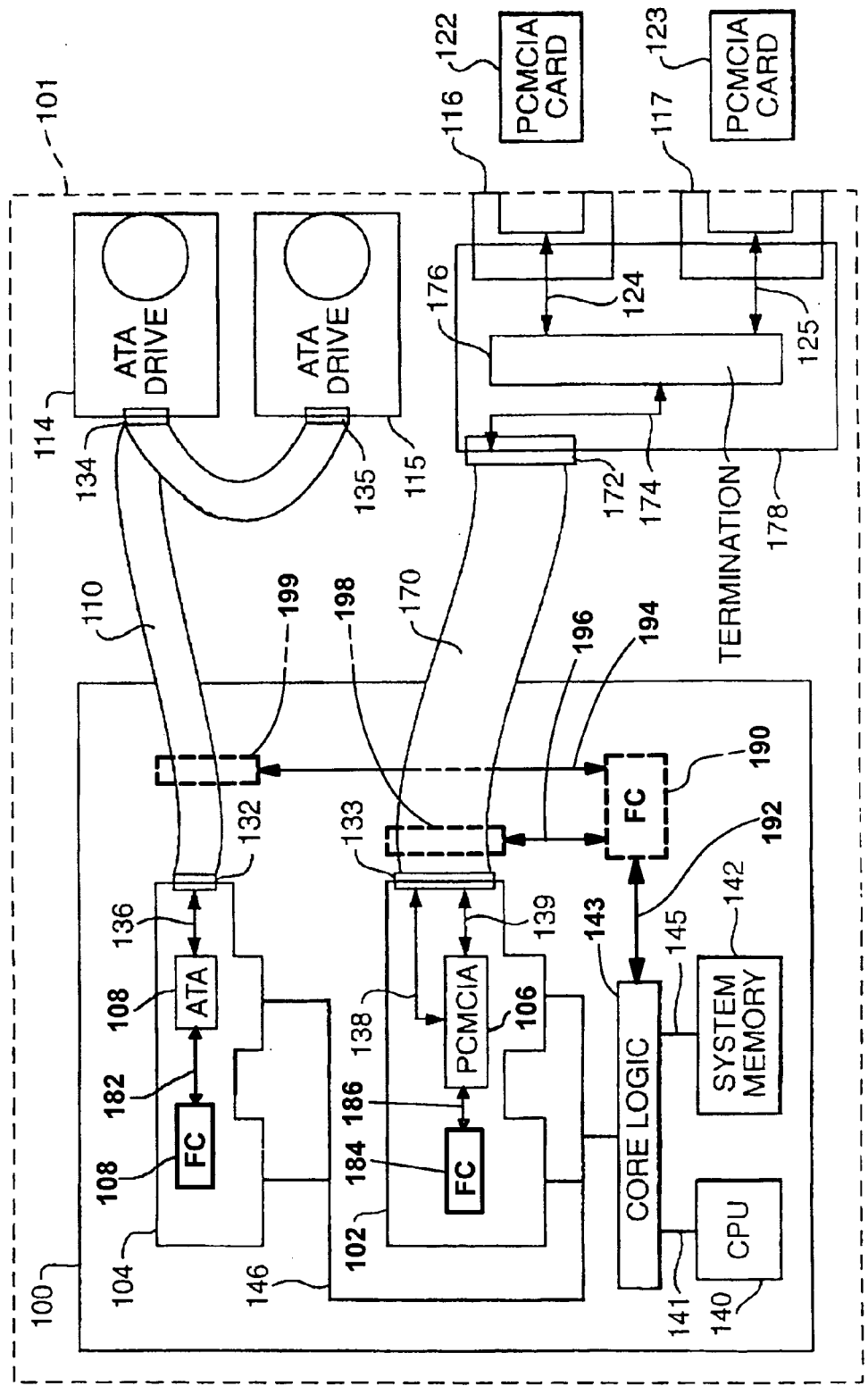

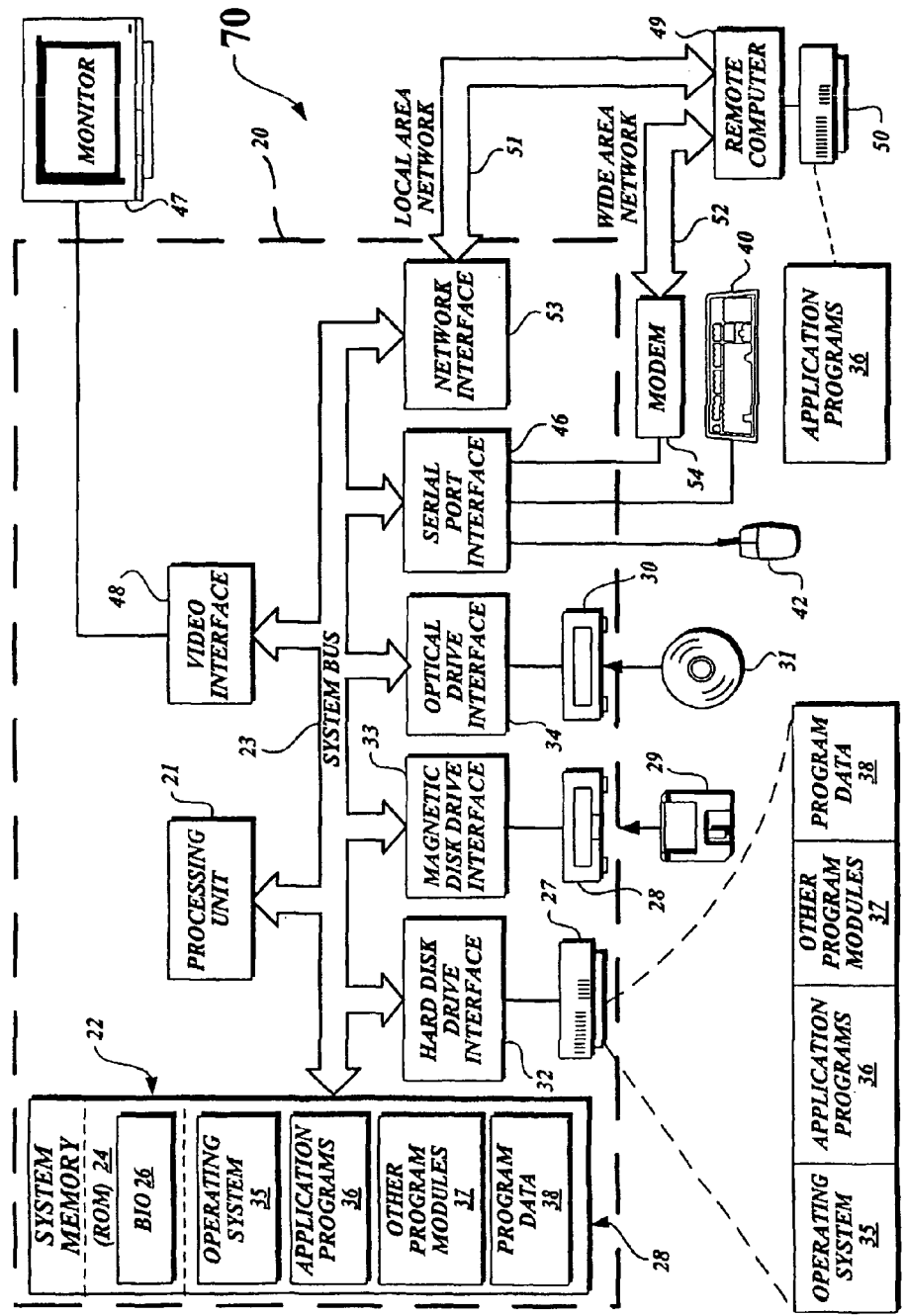
FIG. 1A - Prior Art

DYNAMIC ASSOCIATIVE STORAGE SECURITY FOR LONG-TERM MEMORY STORAGE DEVICES

CROSS-REFERENCE TO RELATED APPLICATIONS

This utility application claims priority from U.S. Provisional application Ser. No. 60/607,444, filed on Sep. 3, 2004, titled: "Dynamic Associative Storage Security for Long-Term Memory Storage Devices", and U.S. Provisional application Ser. No. 60/517,745, filed on Nov. 6, 2003, titled: "Long-Term Re-Writeable Computer Storage Security".

BACKGROUND

1. Field of Invention

The field of this invention relates to computer security systems for preventing unauthorized changes to computer files stored on a long-term rewritable memory storage device.

2. Description of Prior Art

Computers have become very common and have advanced greatly in recent years. However, there still remains the problem of viruses, worms and other malicious programs that can disable a computer and damage files on long-term storage devices. As we have found in recent years, it is almost impossible to prevent malicious programs from finding their way onto our computers. New and more dangerous viruses and worms are appearing almost daily. To solve this problem, the disclose invention attacks the problem in a completely different way than security systems before it. Instead of trying to prevent malicious programs from entering the computer, the disclosed system focuses on preventing damage to long-term memory devices attached to the computer. The system allows programs, even malicious programs to execute on the computer, but long-term storage can be protected. Thus, once the computer is turned-off or re-booted, all changes that the malicious program appeared to make are quarantined, and do not effect the computer again unless the user actually executes the malicious program again. The disclosed security system functions by segregating (quarantining) each program and/or program thread within their own associated group or folder. However, this "quarantine" is unlike any such quarantine before it, because programs can still load, execute, modify and save any file on the hard drive for its own use. In this way, programs (executable files) can operate without restriction with their own files and data, unaware that they are unable to make lasting changes to files on the long-term memory storage device that are not part of its associated group and/or within its storage folder. Thus programs operate in a partially-virtual computer space (i.e. alias files and/or alias folders) when trying to modify and saving other program's files to the long-term storage device. From the program's point of view, it can always operating in "real" computer space, but in fact, it may be operating in a virtual space with alias files and not be aware of it. The terms alias directories (alias folders) and alias files will be used to distinguish these files and folder from the virtual directories and virtual folders which Windows operating system already uses and are different from the disclosed security system using alias directory address system. Thus, to avoid confusion the term "alias directories", "alias folders" and "alias files" will be used throughout the remainder of this patent to describe the alternate folders and files generated for security purposes by the disclosed security system.

Program Directories are another type of virtual directory used by the disclosed security system. Program directories are a dynamically generated directory for specific programs at the time they access the long-term storage device. Depending on which program is accessing the storage device, what file is being accessed and what type of access is requested, a different Program Directory can be generated that the Program believes is the "Real" or "Absolute" directory.

TERMINOLOGY

In this patent, specific words will have very specific meanings, which will be described here.

DASS—Dynamic Associative Storage Security. The disclosed invention. Also referred to as "security system", "folder security system", "folder controller", "storage security", "Security Program", and others.

Read—any operation where data is transferred from a long-term storage device to the disclosed security device or a computer. Nearly all storage commands will read data in some way from the long-term storage device.

Write—any operation where data is changed on a long-term storage device. For example, Save, SaveAs, Cut, Copy, Paste, Delete, Modify, and etc.

Program—any file that can be executed on a computer system (i.e. applications, subroutines, Interrupt Service Routines, viruses, worms, etc.

Folder—used interchangeably with "directory". A common terms used to describe an address location of a collection of files and/or other folders, which are associated with each other in a hierarchical folder and file structure (directory structure). This hierarchical file structure is used in nearly all modern computer filing systems.

Hierarchical—for modern computers, "hierarchical" is usually use to describe the directory and file arrangement used on modern computers, where folders can contain both files and other folders with files and folders. In this patent, however, the term will be used generally, to mean any hierarchical association between programs, folders and/or files, and does not necessarily need to be associated to the directory filing system of the computer. For example, a specific program may have a hierarchical association with a second program and/or files, but this association can be generated by the security system not something belonging to their directory and/or subdirectory relationship. For example, in the above example, the specific program may be given a security hierarchical position over the second program so that it can write directly to the second program's directory and files with the DASS system. The specific program, however, in the directory filing system may be below the second program's folder (the reverse of the security hierarchical filing system). Thus, the hierarchical arrangement for the dynamic association (security hierarchy) between programs does not need to mirror the directory structure on the long-term storage device. However, having the Security hierarchy different from the directory hierarchy adds an extra layer of complexity that is substantially not needed if programs and their files are stored with the correct directory hierarchical structure when they are installed or saved.

Association Group—a group of files (executable and/or non-executable) that are marked as associated with each other. Generally the grouping structure will be hierarchical, but does not necessarily have to be. The Associated Group may be defined by the directory folder they are stored in, or other grouping means.

Association—or dynamic association, is used in the context of this patent to describe an operational relationship between an executable program, and other programs and/or files. Association, or lack of association, can be generated dynamically as programs and/or files are added to the long-term storage device being protected by DASS. The association is such, that only a program within its specific association group can create or modify a "real file" that is associated with that specific association group. Programs outside the "specific associated group" can not create "real files" within the "specific associated group". If the outside program tries to write the file into the "specific associated group" space, DASS creates an alias file, which is associated with both the outside program's "association group" and the originally "requested file address". The "association" means the alias file has been marked as belonging with that outside program, either written (saved, modified, deleted, etc.) to long-term storage by that outside program, or identified (associated) with that outside program during installation onto the long-term storage device, or marked by other means that the file is associated with the program.

One example of this association is a hierarchical directory system used by Windows operating systems, where files associated with each other can be placed within the same directory, or one of its subdirectory folder. In this way, DASS can associate files with a specific executable program by placing the files in the same directory, or one of its subdirectories, as that specific executable program. This placement of files, not only associates the files with the program, but also with other programs and files within that directory and its subdirectories. This means of association allows the security system to easily identify their association with each other.

Folder Address—same as "Directory Address", and refers to the unique address of a particular folder or directory. For example the "folder address" of the SYSTEM folder for Microsoft Windows on most computers can be: "C:\WINDOWS\SYSTEM", "MyComputer\C:\WINDOWS\SYSTEM", and etc.

Subfolder—same as subdirectory, a folder or directory within another folder or directory, which may contain other folders and/or files.

File Name—identifying name give a particular file (program, data, image, etc.). Does not include the "Folder Address" or "Directory Address".

File Address—used to identify the full address for a file, comprising the file's full "Folder Address" plus "File Name" (Directory Address plus File Name).

File Requested—same as "Requested File". Refers to a specific file at a specific "Requested File Address" on a long-term storage device, which is requested for access by a computer program.

Requesting Program—the program initiating a "File Request" to either read or write to the long-term storage device.

Real File—The File stored at the "Requested File Address". A Real File is the original file located on storage device's directory structure at the same address as the "Requested file address". Normally, only the program which originally wrote the Real File can write or modify it. Other program in that program's associated group may also be allowed to write to the originally Real File and modify it. Also, new Real Files are created during installation of new programs and files.

Real Folder Address—same as "Real Directory Address". The actual "Folder Address" location of a "Real File" on the long-term storage device.

Real File Address—same as "Real Address". Defines the actual "File Address" requested by an executable program ("Requested File" by an executable program). This is the file address that the program or application believes it is accessing.

Alias File—A "Requested File" mapped to an alternate location (physically different location) on a long-term storage device and an address different than the "Requested Address". Located at an "Alias File Address" and associated with the executable program originally requesting the file be written. Also identified (but not "Associated" see definition above) with its originally requested "Real File Address". Wherein the security system can determine the Alias File's originally requested "Real File Address" and distinguish it from the "Alias File" and/or "Alias File Address".

Alias Folder Address—or "Alias Directory Address". Defines a "Folder Address" for holding (or associated with) "Alias Files" for a specific program and/or specific group of programs. An "Alias Folder Address" also has a "Real Folder Address" identified with it, and also associated with the location on the long-term storage device of the program(s) which wrote the Alias File(s). A specific "Alias Folder Address" can be the same as its "Real Folder Address" for the same "Real File Address" and "Requesting Program" address. However, for a number of advantages, Alias Folders can be placed as a subdirectory containing the address of the program's "Real" storage directory. In this way, the Alias Files can be associated with the program that wrote them and the absolute folder address they exist in on the storage device. The Alias Directory is different than the Program Directory. The Alias Directory referred to a specific Absolute directory where Alias files are stored. A Program Directory is a virtual directory generated dynamically of all Files (Alias and Real) that the access requesting program has access to, given the type of access request and the "Real File Address" requested.

Alias File Address—or "Alias Address". Defines an "Absolute File Address" mapped in response to an access request to a specific "Real File Address" by a specific executable program, which is identified with (but not "Associated" with (see definition above)) the "Real File Address" and stored physically separate from the Real File. The Alias Address can retain information for later use about the specific "Real File Address" and the specific executable program which created the Alias File at the Alias File Address.

Phantom File—essentially a shortcut like file pointing to an Alias File and placed at the real directory address where the Alias File was originally requested to be written Absolute Directory Address—same as "absolute address" or "absolute directory". Defines the directory structure on the long-term storage device. The "Absolute Directory" is the actual directory structure that the storage device uses to identify all stored files and contains the directory addresses for all files stored on the storage device, comprising both the files in the "Real Directory" and the "Alias Directories".

Real Directory Table—a dynamically generated table containing directory addresses for multiple files stored on a long-term storage device. The Real Directory Table contains only directory addresses for Real Files and Real Directory Addresses. This is the Directory table that the operating system and applications on the computer normally are allowed access to (in prior art this directory can be the same as the Master File Table (MFT)). However, in cooperation with the DASS system, a Real Directory can be different for every Program attempting to access a File, and/or different whether a "read" or "write" function was requested.

Alias Directory Table—or "Alias Directory". A directory of Alias Files for a specific executable program that contains Alias Files. The Alias directory structure can comprise both the directory file addresses of all existing "Alias File" and the Alias Folder(s) for that specific program or program group. The "Alias File Addresses" for the specific Program are created while requesting access to specific "Real File Address" Each "Alias File Address" and/or "Alias File" in the "Alias Directory" is associated with the program and/or program group, which initiated it to be written, and identified with the initially requested "Real File Address" when it was supposed to be written to. The "Alias Directory" is a portion of the "Absolute Directory" and at times the term "Absolute Directory Table" or "Absolute Directory" will be used to describe Alias directories on the long-term storage device and DASS uses. The term "Alias Directory" will mostly be used to describe the list of Alias files for a single program or program group, but may at times be used describe Alias files in multiple programs and/or program groups. Note that Alias Directories generally contain all Alias Files available for its specific Program, but not all these Alias Files may be accessible directly for a specific command (i.e. save, load, list, etc.).

Program Directory Table—(or Program Directory) a dynamically generated table of accessible files for a particular Program requesting access. The content of the Program Directory is dependent on three factors: 1) the particular program requesting access, 2) the particular "Real File Address" being accessed, and 3) the particular access command (i.e. save, load, run, list, etc.) being used. A Program Directory comprises both the Real Directories and the Alias Directories for the particular accessing Program and accessed File combination. Note that the Program Directory is a transient data table, which is created anew every time an access request is made. This differs from the Alias Directory, which locates all the Alias Files for a specific Program. The Program Directory contains both "Real Files" and "Alias Files" that are accessible by the Program given the three factors stated above.

Absolute Directory Table—the directory structure used by the long-term storage device and the DASS system. The "Absolute Directory Table" can contain a directory address for every file on the long-term storage device (both Real Files, Alias Files and Phantom files). Normally, applications executing on the computer never see this table, nor needing to know it is there. However, a special program (possibly integrated with the operating system) can be included to read the Absolute Directory on the long-term storage device if desired. Such a program may include protection so that only specific user's are allowed access to the "Absolute Directory Table", and/or only specific authorized programs can gain access to it (preferably with some hardware, biometric and/or user authorization).

EXECUTIVE SUMMARY

Computer security has become a priority for many businesses because of the increasing number of malicious programs (viruses, worms, Trojan horses, etc.). The disclosed Dynamic Associative Storage Security (DASS) system promises to vastly improve protection for files stored on rewritable long-term storage devices (hard drive, DVD-RW, etc.). The DASS system provides a permanent solution to malicious programs, without significant use of computer bandwidth and without the need for updates. DASS does not attempt to prevent malicious programs from being executed on the computer, or stop them from gaining access to files, instead DASS only focuses on preventing damage to files on protected long-term storage devices. All programs are basically quarantined in their own folder directory (or other associative arrangement) by DASS, while still allowing all programs substantially unlimited read, write and modify access to a protected drive for their own use. This improbable combination allows substantially normal operation for both system files and applications, while providing rock-solid file protection for all files on the protected drive. DASS would not replace existing security, but complement it, by operating like a firewall between the computer and a storage drive.

The DASS system operates under a specific set of logical rules within a hidden layer between a computer's operating system and a protected drive. These rules dynamically map access requests addresses depending on a number of factors derived directly from the CPU, BIOS, and/or Operating System. This provides a framework for storage and protection of files on the protected drive, independent of whether the requesting program is a system file or a virus. Neither the computer's operating system nor the hard drive need be aware of the DASS system as it acts as a middle man, redirecting file access requests to the protected drive according to its own logical rules. Files are protected by the logical mapping of access to files, not by identifying a file as containing a malicious program. This means updates are never needed, and the logical rules can be implemented in hardware so that DASS cannot be altered. The information needed for mapping access requests is provided by three main sources: 1) the identity of the program making the access request to the protected drive, 2) the type of request made (i.e. read/write/execute/etc.), and 3) the address of the file being accessed. Additional factors can also be used in determining how to redirect the file request. DASS is 100% secure if the program making the access request can be 100% accurately identified. This requires that real and virtual memory allocation is not circumvented, which for most computers is very secure. DASS can insure security by directly monitoring CPU and memory operation to detect any violations of memory allocation should it occur.

Summary 1

Many different ways have been tried to stop malicious computer programs, such as, viruses, worms, Trogon horses, etc., from damaging computer files in random access memory (RAM) and/or in long-term nonvolatile storage memory. These fixes have been only partially effective, because they rely on catching the malicious programs before it can be "executed" (run) by the computer operating system. If the malicious programs gets passed security, the computer can execute the program, and the program can achieve its goal.

Whether it is designed to take control of the computer, delete files, modify files, or simply to replicate itself. Because all computers loose all information in their random access memory (RAM) when power is turned off, what really must be protected is the long-term storage device (i.e. hard disc drive), which holds all the important information for the computer when it is turned back on. If one can protect the long-term storage memory from damage, one has protected the computer system from long-term damage. This disclosed security will work with nearly any long-term storage device, including memory systems needed to provide "instant on" computers. With "instant on" available one would merely needs to restart, or turn off their computer and then back on, to eliminate any malicious program they may have executed.

The disclosed security system essentially quarantines all Folders and/or Files from each other, so that programs are unable to damage un-associated files or folders. However, this "quarantine" is unlike any normal quarantine, because programs executing on the computer system are unrestrained from their normal operation. Below is a list of some function that are unaffected by having the security system quarantine Folders and/or files from each other:

1) a Program can Read (i.e. load, etc.) any "Real File" on the protected storage device.
2) a Program can Modify (i.e. save, rename, etc.) any "Real File" on the protected storage device for its own use. (This includes files such as the Registry)
3) a Program can Execute any "Real file" on the protected storage device.
4) a Program can Write (i.e. Save As, etc.) any new file on the protected storage device for its own use.
5) a Program can Read, Write and Execute any File which was Written or Modified by the Program for its own use.
6) all Files Written by the Program appear to be at their "Real File Address" to the Program, but may not even appear to exist to a second Program if the "Real File Address" is outside the allowed Folder Directory for the first Program.
7) All Files Modified by the Program appear to have been changed from the Program's perspective, but do not appear changed to other Programs (unless requested).

With these base functions allowed, most programs and applications will operate normally under the disclosed security system with the proper permissions and/or authorization settings. Even though the Program's ability to modify non-associated files has been stopped, most programs will never notice. Program groups that require that their files be shared, will also operate under the disclosed security system, by simply arranging the permissions for the Program Group properly during installation.

The disclosed computer security control system will work with any computer storage device that can be rewritten, such as, hard-drives, CD-RWs, DVD-RWs, flash memories, zip drives, tape drives, network drives, virtual memory storage, etc. (Virtual Memory is often used by Windows operating system to create a larger operational space for RAM by usually saving extra data in Virtual Memory on the hard drive). The disclosed security system can even be used to in RAM (which is volatile) to separate running programs from each other (while operating) and make them "think" they are altering other program space, but actually just creating alias RAM locations where their modified programs are executed. This disclosed security storage system operate in an entirely different manner than previous security systems. Instead of trying to stop the malicious program from being loaded and/or executed in the computer memory and/or executed from non-volatile memory storage (virtual memory, hard-drive, DVD+RW, etc.), the disclosed security control system allows all of these operations. Viruses, worms, etc. are allowed to enter the computer system freely, and allowed to run as is normal for that virus, worm or other malicious program (from the malicious program's point of view). The disclosed security control system only stops the malicious program from modifying files on a protected long-term nonvolatile storage which are not associated with the program. Files that are associated with the program can be modified without restriction if permitted by the user. This prevents one program from writing onto a second program's files unless it has the proper authorization or association with the second program, while at the same time allowing a program to modify its own related files. Files on the long-term storage device may also be read by any program (unless specifically protected by additional security). Programs can also load, modify and rewrite files to the long-term storage device for their own use. The key phrase here is "for their own use", since alias files are created for that program's specific use (and associated programs and files), and do not effect the original file (real or requested file), which other programs may be using. By doing this, malicious programs can operate normally. Not that one want malicious programs to operate normally, but so other programs, we do want to operate normally, will also be able to operate normally. This means the malicious program can disrupt your computer, maybe even cause it to crash, but cannot change nonvolatile files already on your hard-drive, and/or modify other programs within random access memory (RAM).

Figure 3:
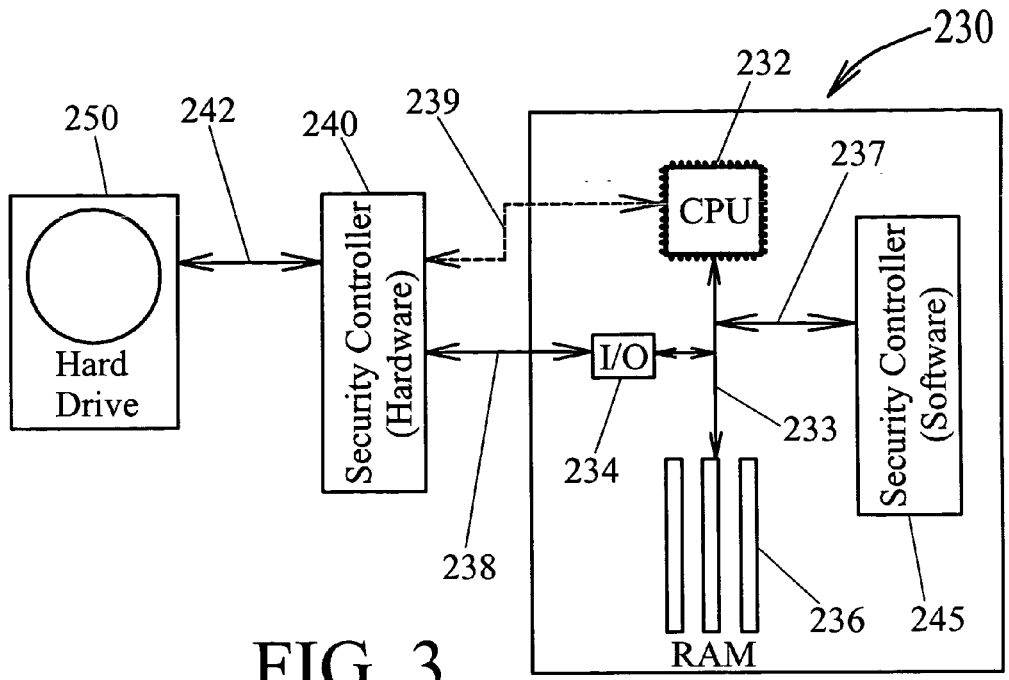

For hardware solutions to the disclosed security system, connections can be made directly to the CPU in order to directly follow the flow of information (files) in RAM and Virtual Memory. The CPU controls actual physical memory addressing, thus one can use the address locations and functions being performed to determine where each file is stored in memory, and also to track that file if it is moved from one location in memory to another. Thus, the security system could create its own "hardware version" of the "descriptor tables" which would override any software based "descriptor table data" created by the operating system. Examples of how this hardware "descriptor table" might be connected are shown by data line 239 in FIG. 3, capture circuit 272 in FIG. 4, and file and/or folder identification circuit 328 in FIG. 5B. In FIG. 3, data lines 239 reads data directly off the CPU and send that information to security controller 240. This information is then used to construct a descriptor table(s) describing the location of each file loaded from hard drive 250 onto the computer and where it is stored in RAM 236, Virtual Memory on hard drive 250, and Caches (not shown) on the CPU 232 and/or Motherboard 230. Further, security controller 240 would keep track of any change of position of each file's location in RAM 236 or to a virtual memory address on hard drive 250 in the descriptor table(s). Such information can comprise, the physical address pointer, instruction pointer register, code segment register, selector register, etc. Thus, the exact memory locations of all files in RAM, can be match with their Absolute File Address on hard drive 250. Even if the operating system's descriptor table(s) should get corrupted, the hardware solution described here would still track the correct memory locations of each file, and thus be able to protect files and folders on hard drive 250 from damage. The placement of security controller 240 may be directly on mother board 230, either within CPU 232 or elsewhere, to provide sufficient access speed to keep up with the CPU (see circuits 272 and 328 in FIGS. 4 and 5B). Data from the CPU through data lines 239, can also be combined with data in lines 238 to provide a more comprehensive identification of the data being moved, loaded or saved, into RAM and/or Virtual Memory.

Figure 4:
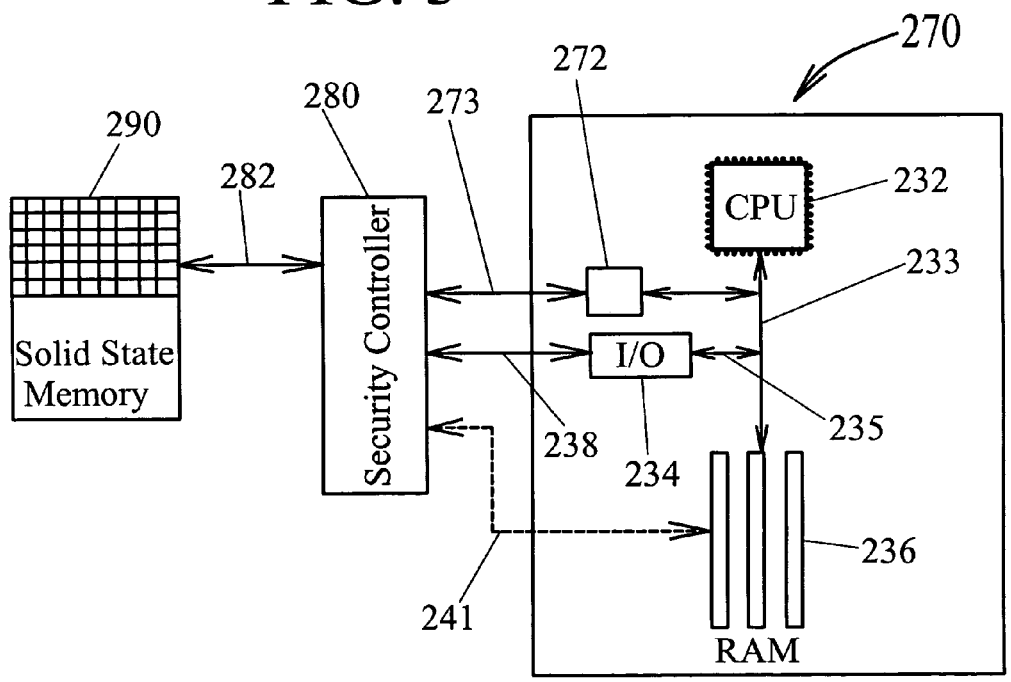

In a similar way, security controller 280 in FIG. 4, can have a connection directly to RAM memory 236 by dedicated data lines 241. In this way controller 280 can observe all data coming to and from its long-term storage device (Solid State Memory 290) to determine exactly where it is being placed in RAM 236. This connection also would allow direct observation of movements of data within RAM 236 and to any Virtual Memory pages moved to memory 290. Direct dedicated data lines 241 is somewhat redundant since the system bus 233 and I/O 234 can be used to monitor all data and addresses accessed in RAM 236, but is shown here to illustrate there are many different ways of obtaining and tracking the memory location of files loaded from a long-term storage device. Motherboard 320 gives an even more redundant example, where circuits 328, 334 and 332 collect data from CPU 232, system bus 322, and RAM memory 306, respectfully. Any one of these circuits connections could provide sufficient information to identify and track files as they are loaded from a long-term storage device (hard drive 250) and stored in RAM 306. The use of modern operating systems which use "Virtual Machines" to execute programs, can actually make it easier to determine the specific program which made the access request to the long-term storage device. With a "Virtual Machine", identifying the memory block the "Virtual Machine" is working on provides the information needed to identify the access requesting program.

For proper operation of the security system, the computer should be operated in what is called "Protected Memory Mode" or "Protected Mode", where all programs can be stored in separate protected memory spaces in RAM or Virtual memory on another storage device (i.e. hard drive). Protected Mode segregates each program from the other programs as they are executed on the computer, so that they cannot modify each others code. For the security system to work, each program and/or program thread is given its own memory space to operate within (i.e. RAM, Virtual Memory, etc.), and is not allowed to operate outside its defined space. The disclosed security device requires two things to secure the long-term storage device, comprising: 1) a secure protected memory mode, so that one program cannot modify another program's memory space, and 2) correct information about the program executing and initiating a read or write access request to the long-term storage device. By meeting these two requirements, the identity of the program making a read or write request can be reliably obtained. The CPU, BIOS, Operating System and/or additional hardware or software can work together to provide a secure memory management system, so that, the access requesting program in RAM memory can be reliably identified and associated with its folder and file location on the long-term storage device (i.e. hard drive).

When "protected mode" operation is combined with dynamically generating alternate directories and files (Alias Files and Alias Folders) on the long-term storage device, a powerful means is created for preventing one program from damaging another program's files. The BIOS and Operating System can usually prevent programs from modify other programs in RAM memory or virtual memory, but files and programs on the long-term storage device is more difficult. Through this use of Protected Mode operation and alias files and/or alias folders, all programs (malicious or otherwise) can be trapped in their own memory space and forced to stay within their own long-term storage folder (storage directory on the long-term storage device). In Protected Mode operations a memory table keeps track of each program and its memory space, and a stack pointer determines the address currently being executed. With the stack pointer address and the memory table information, the folder security system can determine exactly, which program or thread generated a call to the routine(s) for accessing the long-term storage device. Additional data stored within the security system's protected memory (dedicated memory within the security system itself, and/or a secure portion of the long-term storage device, etc.), can further assist in determining the absolute folder address of the requesting program making the access request. This requesting program identified, the security system can generate the proper Program Directory for reading or writing to the long-term storage device.

In a computer, programs can be blocked by hardware means from writing outside their memory allocation range. Thus, they are prevented from writing onto other programs in RAM and Virtual memory. For storage on a hard drive, the malicious program can be limited to only writing new files to its own directory or sub-directories, and/or designated alias folder or files (alternative folder and/or file)). As an option, authorization can be given through a hardware input device (such as conformation through keyboard, mouse, or other hardware input device, which cannot be simulated from software), so that the user can decide if they want to allow the program to write files to a folder address(es) outside its own. The user can be given choices on how they want to handle file writing and access in the future, with a list of choices, such as, "Write this time Only", "Write Always" (allows program access to that file anytime), "Write this file only in Alternative or Alias Folder directory (i.e. safe-folder), "write all files from this program in Alias Folder", etc. Without this authorization the malicious program is trapped within its own folder where it was executed from and cannot write to any other directory on the hard drive (nonvolatile memory). All files it tries to write outside its own directory can be mapped back in to the program's absolute folder directory and stored there as an Alias File. When the program tries to reload this written file the Alias File is loaded instead. This effectively traps the program from damaging other files while still allowing it to operate unaware that anything is different than expected.

Summary 2

The disclosed security system provides protection for computers of all types from malicious programs (viruses, worms, Trojan horses, etc.) by protecting data stored on long-term storage devices (hard drive, Rewritable CD, Rewritable DVD, flash memory, RAM memory with battery backup, etc.). While the disclosed security system also enhances overall security (by reducing malicious program's effect, it does not directly protect user data from theft or viewing. Additional security measures must be taken in order to protect confidential or secret data, since the security system disclosed here generally allows all files and programs to be accessed, read, and executed unless otherwise restricted.

The disclosed security system operates between a long-term storage device and a computer. Neither the long-term storage device nor the computer or its operating system need be aware of the security system, since it operates as a hidden process redirecting read and write requests according to specific parameters within the computer and its operating system. The long-term storage device can be a standard hard drive and the computer can be a standard computer, with the disclosed security system connected between the two. The hard drive can operate as if it were sending and receiving access requests directly from the computer, and the computer can be sending and receiving access requests as if it were communicating directly with the hard drive. In variations of the security system, components of the security system may be placed partially or fully on the long-term storage device, the computer and/or programmed into the operating system (operating system, drivers, applications, etc.).

The disclosed security system operates by redirecting the read and write requests from the computer to the long-term storage device, depending on which program, or program thread, initiated the read or write request. By associating the program making the access request with a file being written, each program (and program thread) can have its own file (alias file) with the same directory address, even though from the computer's perspective each program is reading and writing to the same exact file on the storage device. The real power of this security system comes when a read request is made by the computer. The correct file is match up with the program making the request, the "alias" file if it has one on the storage device and the "real" file if the "alias" file does not exist. What this means is that any program can modify a file and appear to "save" the modified file to the storage device at its "real" location, but all it has really done is saved the modified file for itself in an alias file. When other programs on the computer attempt to access the same file they either get the original "real" file or their own "alias" file, not the "alias" file for the other program. Thus, each program can operate normally, modifying and saving any file on the long-term storage device, but without interfering with the file interaction with other programs using the same exact file address.

In many computer operating systems the read and write requests are handled by one or more programs that are accessed to initiate a read or write function on the long-term storage device. These programs normally reside in the BIOS, the Operating System, the ATA Interface Card, and/or etc.

This effectively quarantine all programs to within their own associated group of files without limiting what programs can access, files it can write or what files it can load. Thus, programs, including malicious programs, can operate normally on the computer, but can only alter long-term storage space associated with itself. This means that programs can only do long-term damage to their own files, because as soon as the computer is turned-off, all the things the malicious program thought it had changed only exist in association with the malicious program itself on the long-term storage device. Similarly, special files, such as, the registry in the Windows based operating system, can also be organized and controlled so that each program can only modify its own data entries. By only allowing a program to edit its own data in the registry, that program is unable to adversely effect other programs. In this way the security system protects programs from each other. Even if one program or file directory is compromised on the storage device, the other programs and file directories are unaffected because of the invisible and impenetrable wall between them.

The disclosed security system can be implemented entirely in hardware for maximum security, entirely in software for ease of use, or a combination of both hardware and software components. In a hardware only configuration, a means of detecting which program has made a request to access the storage device and where that program is stored (originally loaded from) is needed. This may be accomplished by directly connecting to the computer's CPU, Memory, and/or System Bus. By keeping track of the memory allocation table for the computer, the security system can determine the storage location of a program requesting read or write access to the storage device. The stack pointer can identify which part of memory was being executed at the time of the request and then determine the program and its address from a table identifying each executing program and program thread, and which memory block it is presently in.

Since the disclosed security system can operate substantially independent of the programs or files under it is protecting, there is very little modification needed for existing programs to allow them to work with this security system. In fact, most applications should run without any modifications at all. Special programs like Windows operating system, and files like Windows Registry can require some modification to perform their system functions, but even these will operate, but possibly not entirely as intended. The computer's BIOS, ATA controller and drivers can be updated to provide the maximum benefit from the disclosed security system. While the security system can be implemented in software, it is also adaptable to an all hardware solution where the security system could not be circumvented without proper authorization. All random access memory used for tables or pointer information would be either in memory physically separated from computer memory and on a secure area of the storage device.

The disclosed security system can be easily standardized, since it adds only a single additional layer of abstraction to the filing system. Requiring the addition of being able to determine what program is initiating a read or write request of a specific long-term storage device. This can allow easy integration with the ATA controller and provide output compatible with present day hard drives. Hard drive design can remain substantially unchanged. The security system can also be implemented anywhere between the CPU of the computer and the Hard Drive physical platters, making the options for standardizing the security system nearly limitless. If the new Serial DMA standard takes hold, hard drives could include the disclosed security system on their control board. Such a serial hard drive would only need directory address information for the specific file being accessed and the directory address of the specific program trying to access that file to completely determine whether a "real" file or "alias" file should be accessed. This would essentially eliminate all overhead functions now performed by the computer CPU. This would also require a secure means of determining and sending the specific program's directory to the hard drive, which can be implemented in hardware on the computer if desired.

DRAWING FIGURES

FIG. 1A Example of a prior art computer system taken nearly in its entirety from U.S. Pat. No. 6,466,238 B1 connecting a Hard Drive to a Computer Motherboard.

FIG. 1B Alternate Directory Security Controller connecting a Hard Drive to a Computer Motherboard (drawing in part from U.S. Pat. No. 5,905,885).

Figure 2:
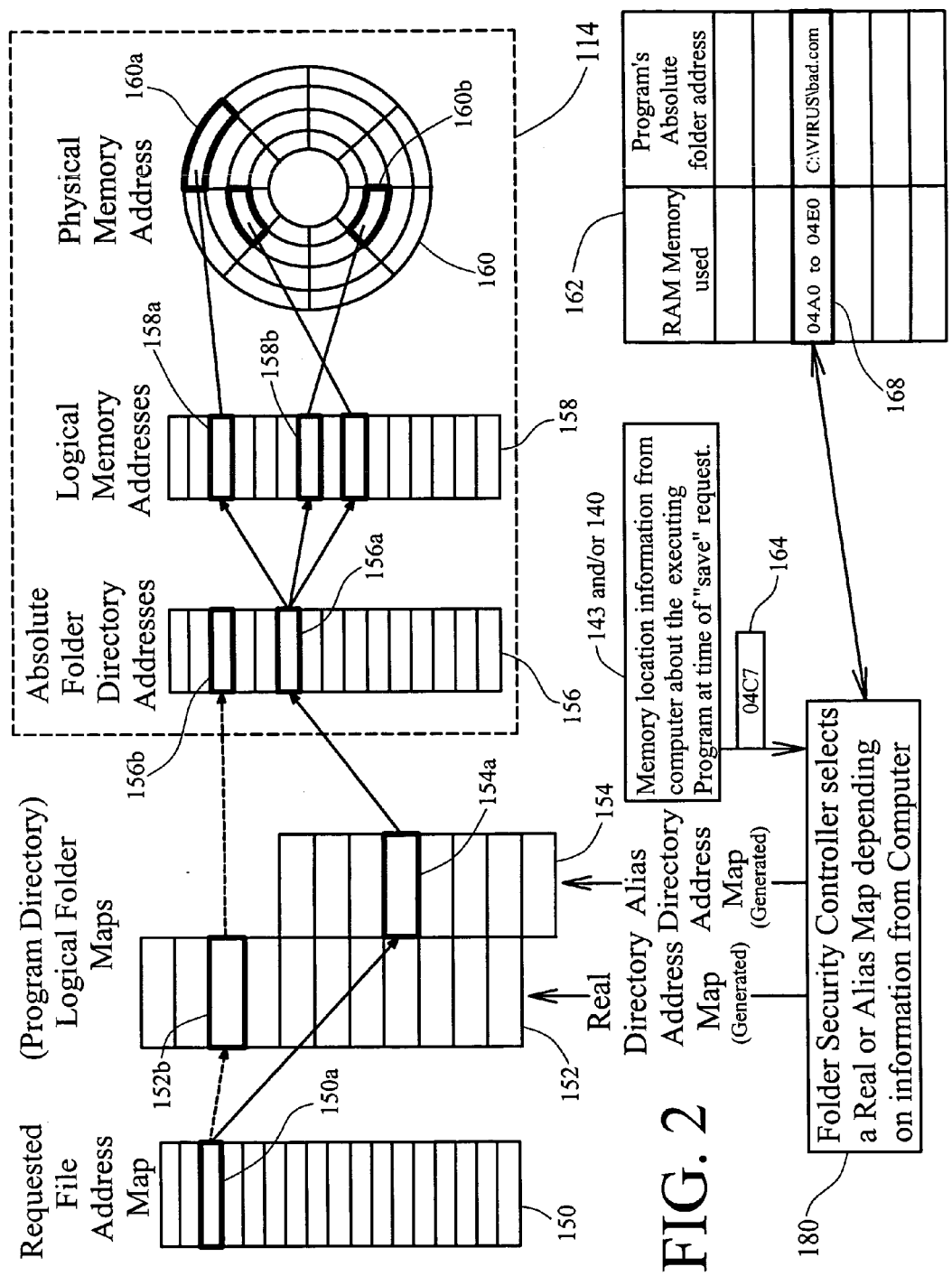

FIG. 2 Folder security system address mapping diagram.

FIG. 3 Alternate directory Controller connecting a Hard Drive to a Computer Motherboard through the CPU.

FIG. 4 Directory Controller mounted on motherboard for connecting to a Hard Drive.

5A Software and/or Hardware implemented Dynamic Associative Storage Security Device.

5B Hardware only implemented Dynamic Associative Storage Security Device.

Figure 6A:
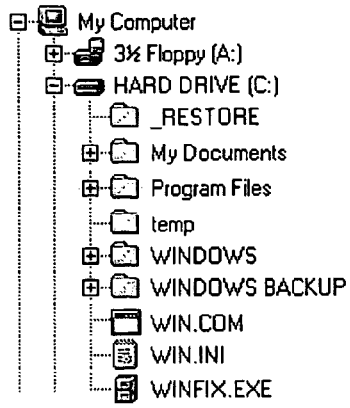

FIG. 6A Typical Hard Drive directory structure.

Figure 6B:
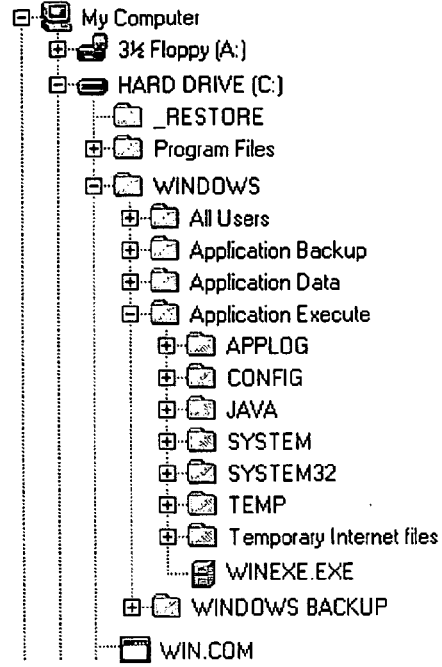

FIG. 6B WINDOWS directory structure.

Figure 6C:
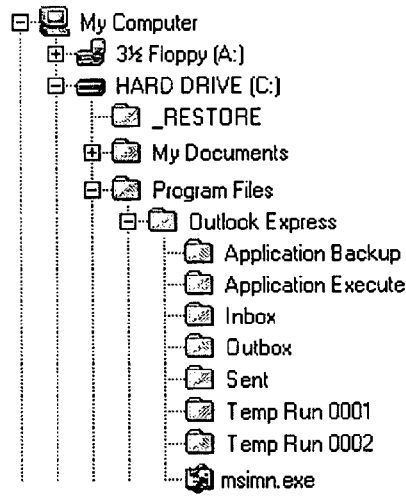

FIG. 6C Outlook Express directory structure.

Figure 6D:
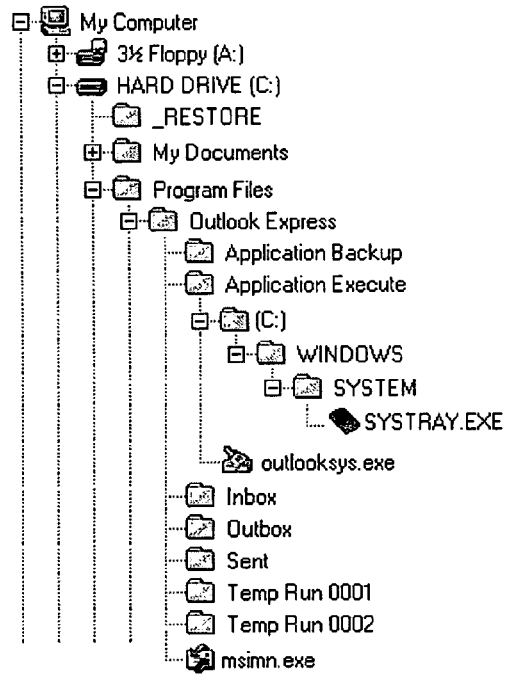

FIG. 6D Outlook Express directory structure when saving unauthorized files.

Figure 7A:
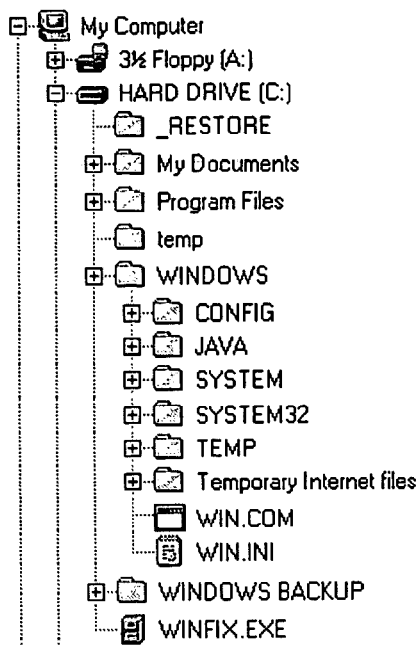

FIG. 7A WINDOWS directory structure using subfolders only folder security.

Figure 7B:
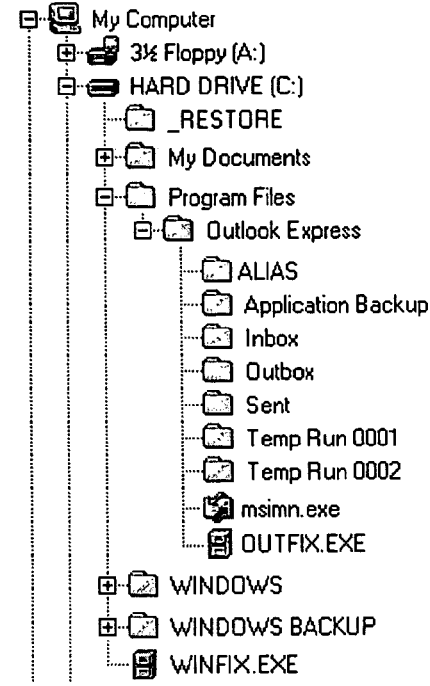

FIG. 7B Outlook Express directory structure using subfolders only folder security.

Figure 7C:
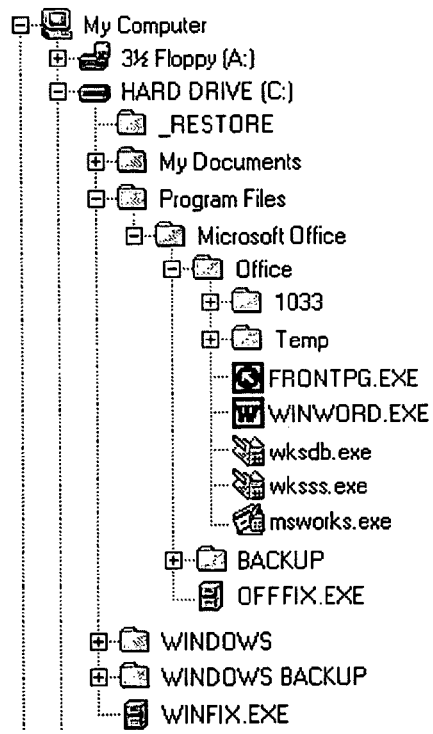

FIG. 7C Microsoft Office directory structure using subfolders only folder security.

Figures 8A, 8B:
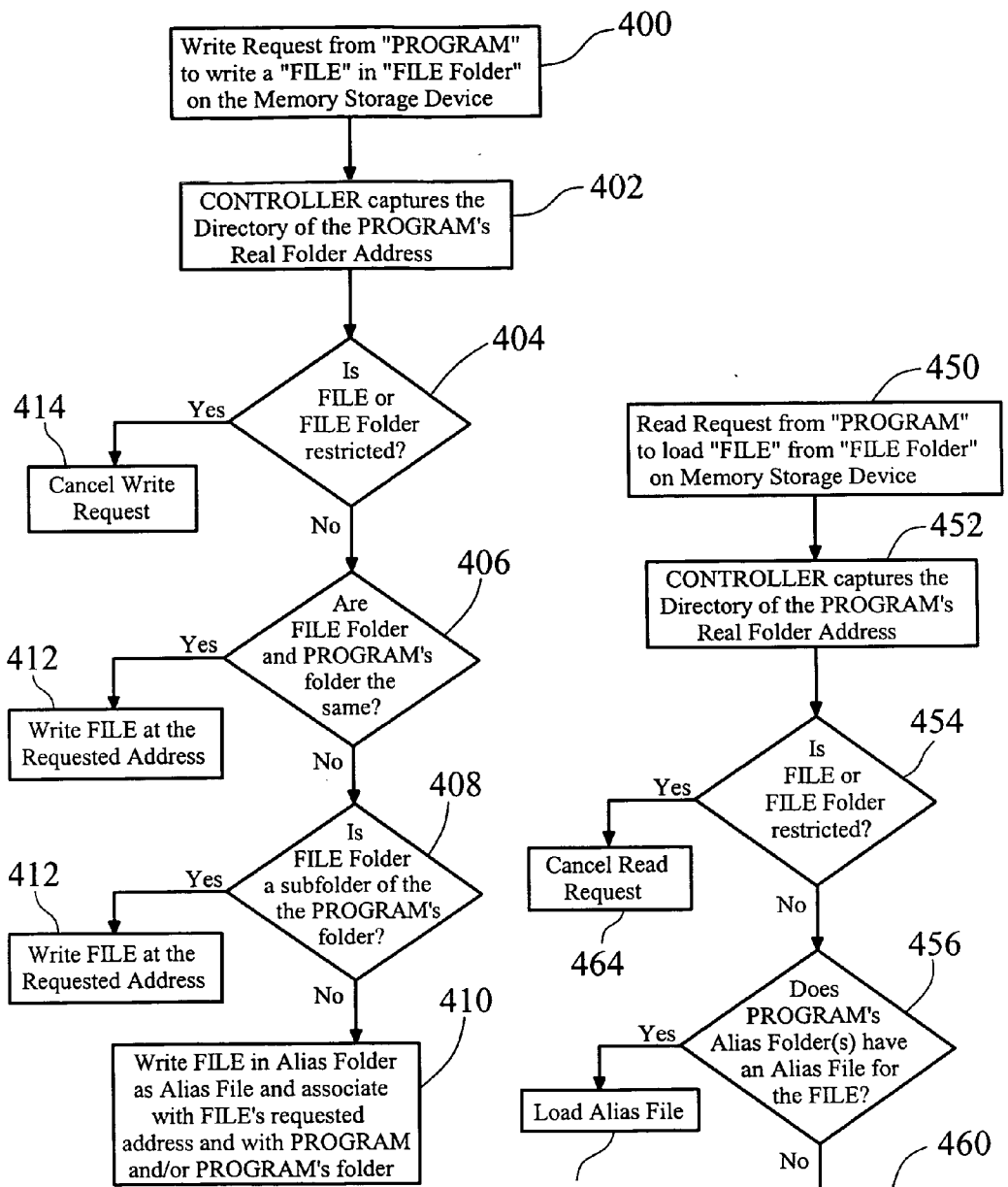

FIG. 8A Decision flowchart for writing a file, with unauthorized files saved to Alias Folder.

FIG. 8B Decision flowchart for loading a file, with unauthorized files loaded from Alias Folder.

Figure 9A:
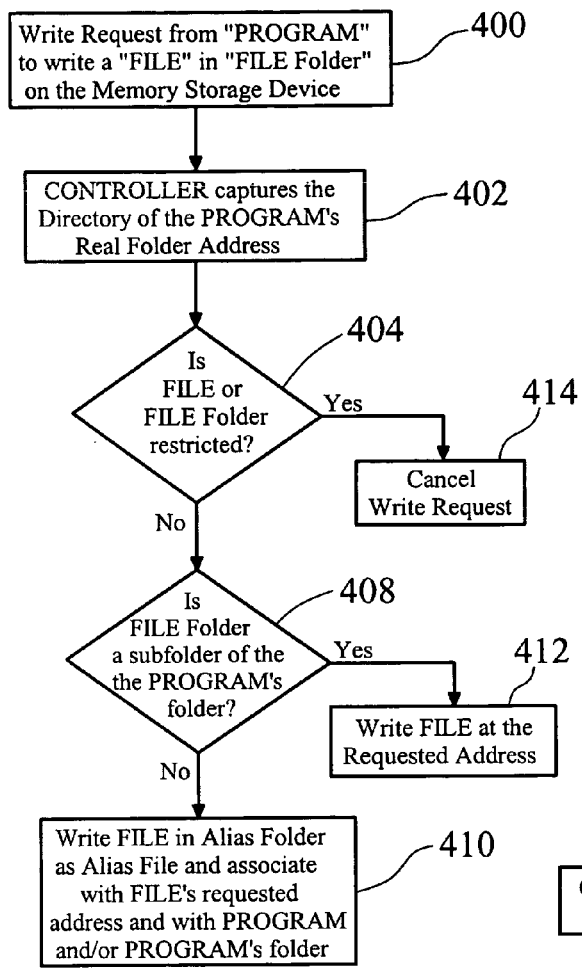

FIG. 9A Alternate decision flowchart for writing a file using subfolders only folder security.

Figure 9B:
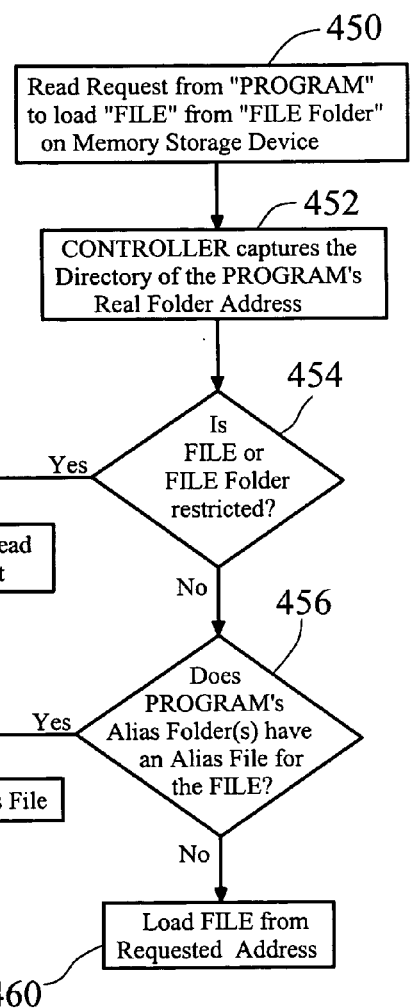

FIG. 9B Alternate decision flowchart for loading a file using subfolders only folder security.

Figures 10A, 10B:
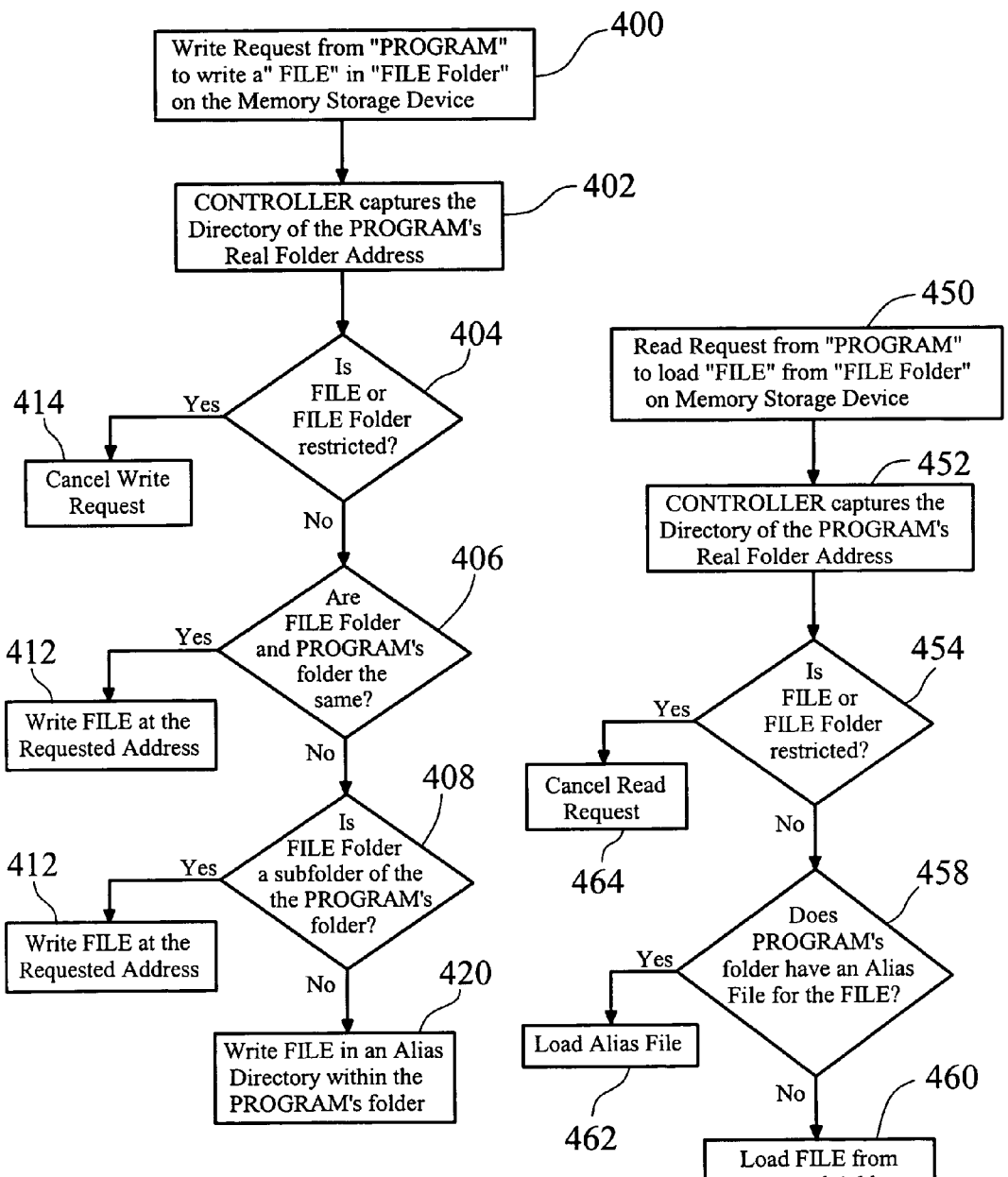

FIG. 10A Decision flowchart for writing a file, with unauthorized files saved to Alias Folder.

FIG. 10B Decision flowchart for loading a file, with unauthorized files loaded from Alias Folder.

Figure 11A:
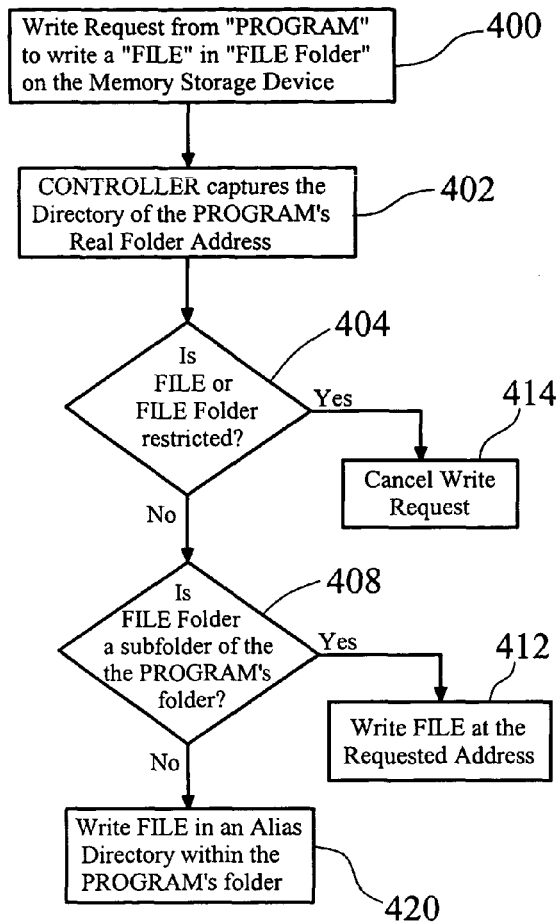

FIG. 11A Alternate decision flowchart for writing a file using subfolders only folder security.

Figure 11B:
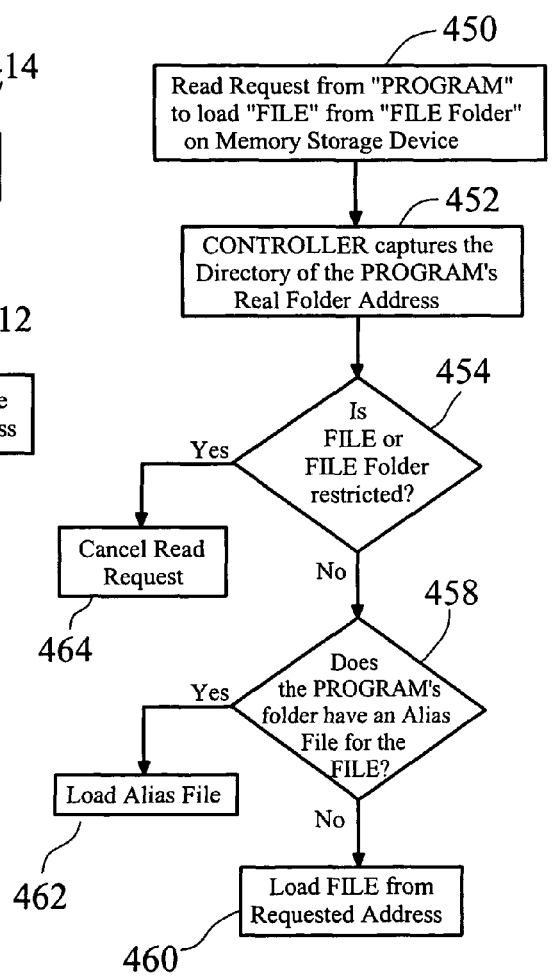

FIG. 11B Alternate decision flowchart for loading a file using subfolders only folder security.

Figure 12:
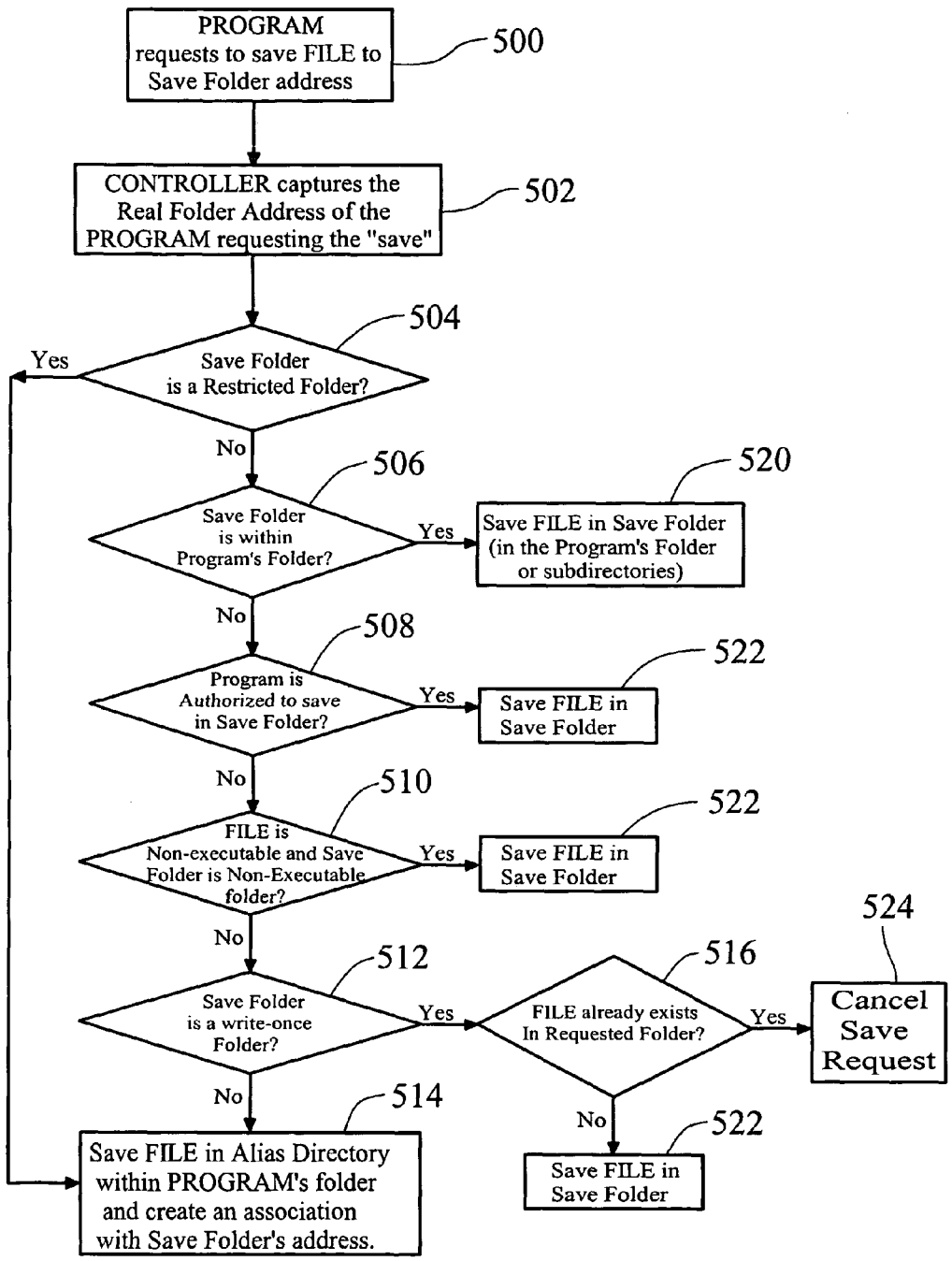

FIG. 12 Decision flowchart for saving a file with extra rules.

Figure 13:
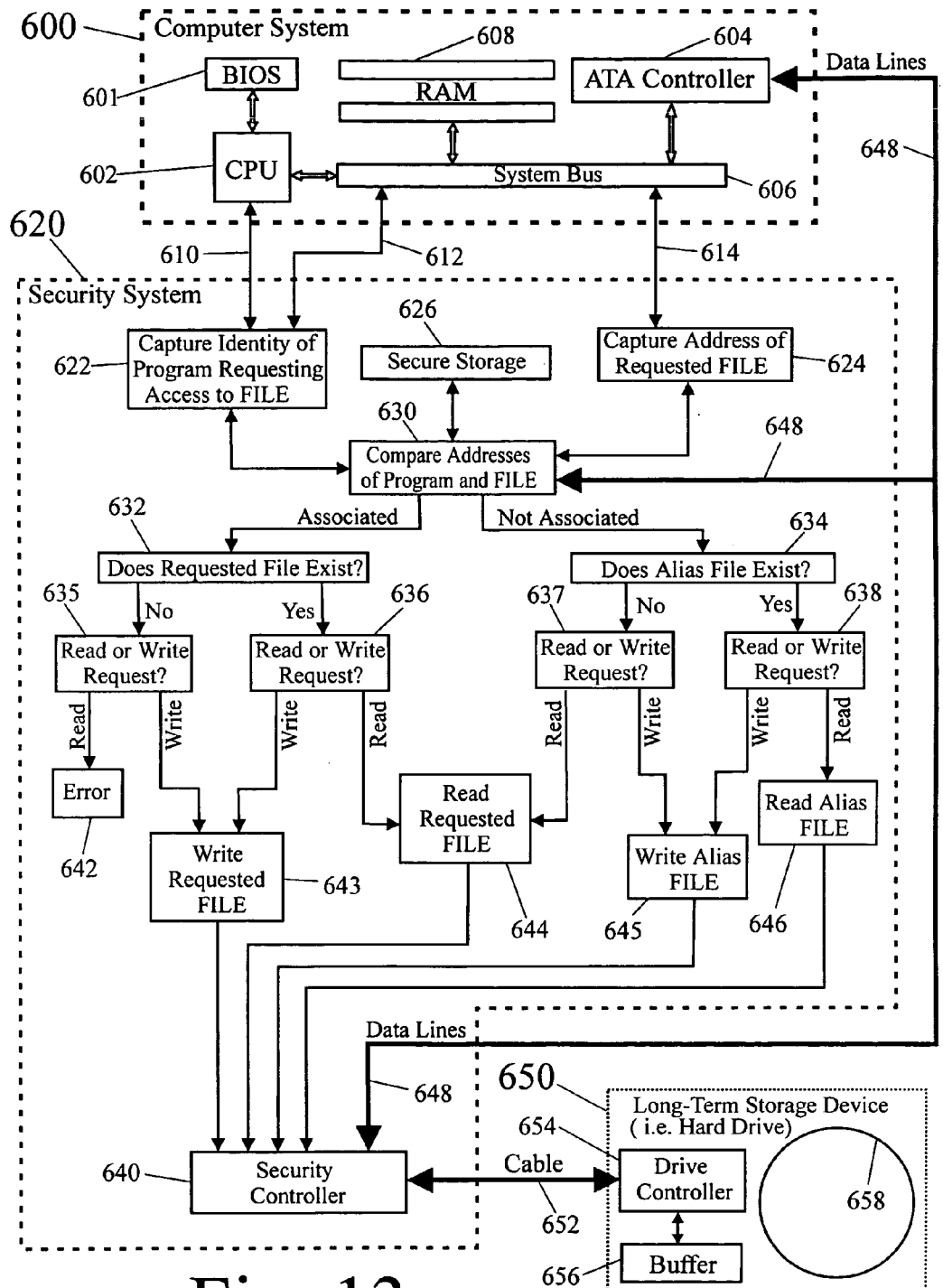

FIG. 13 Security system flowchart mounted between a computer and a hard drive.

Figure 14:
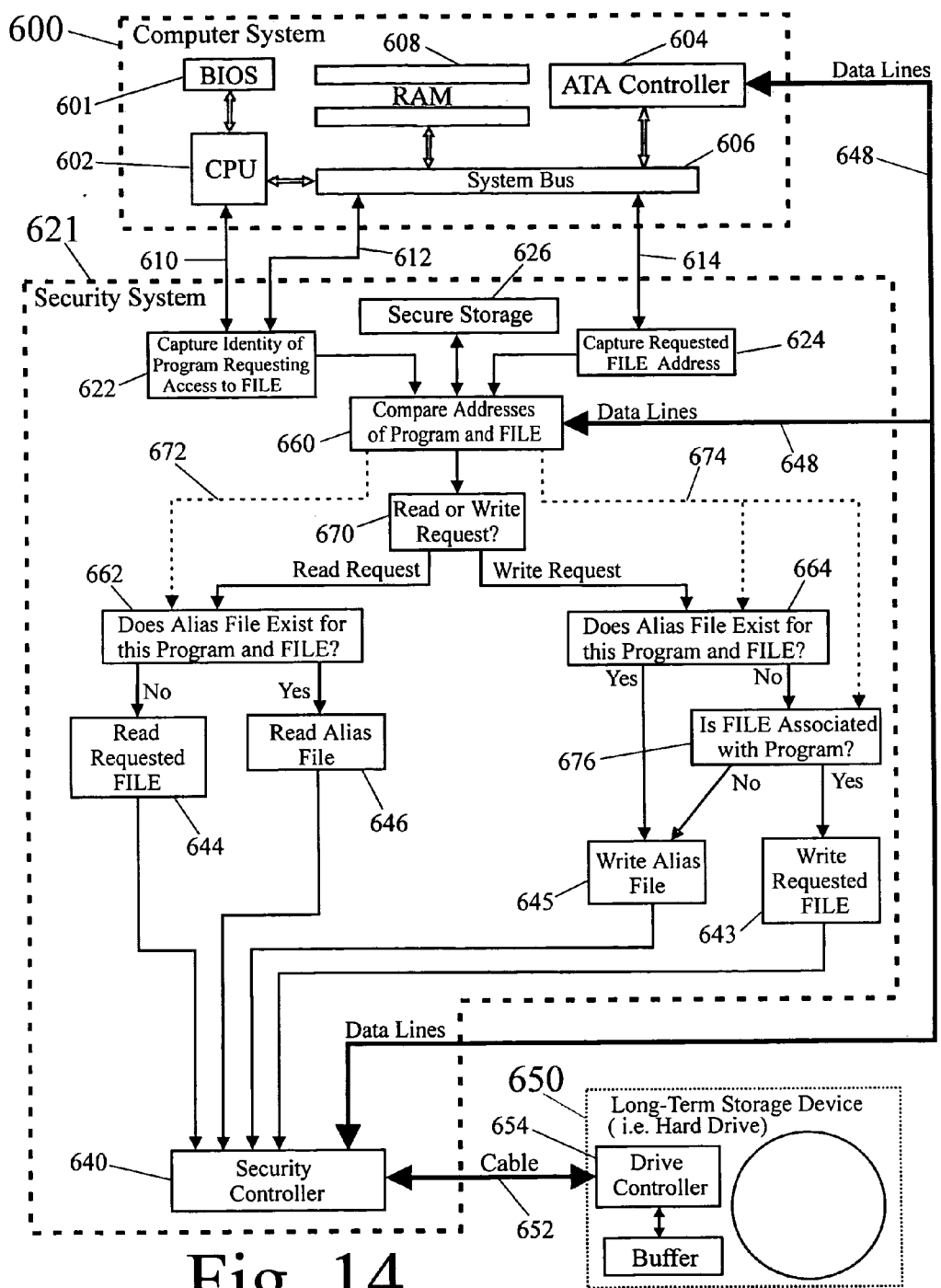

FIG. 14 Security system alternative flowchart mounted between a computer and a hard drive.

Figure 15:
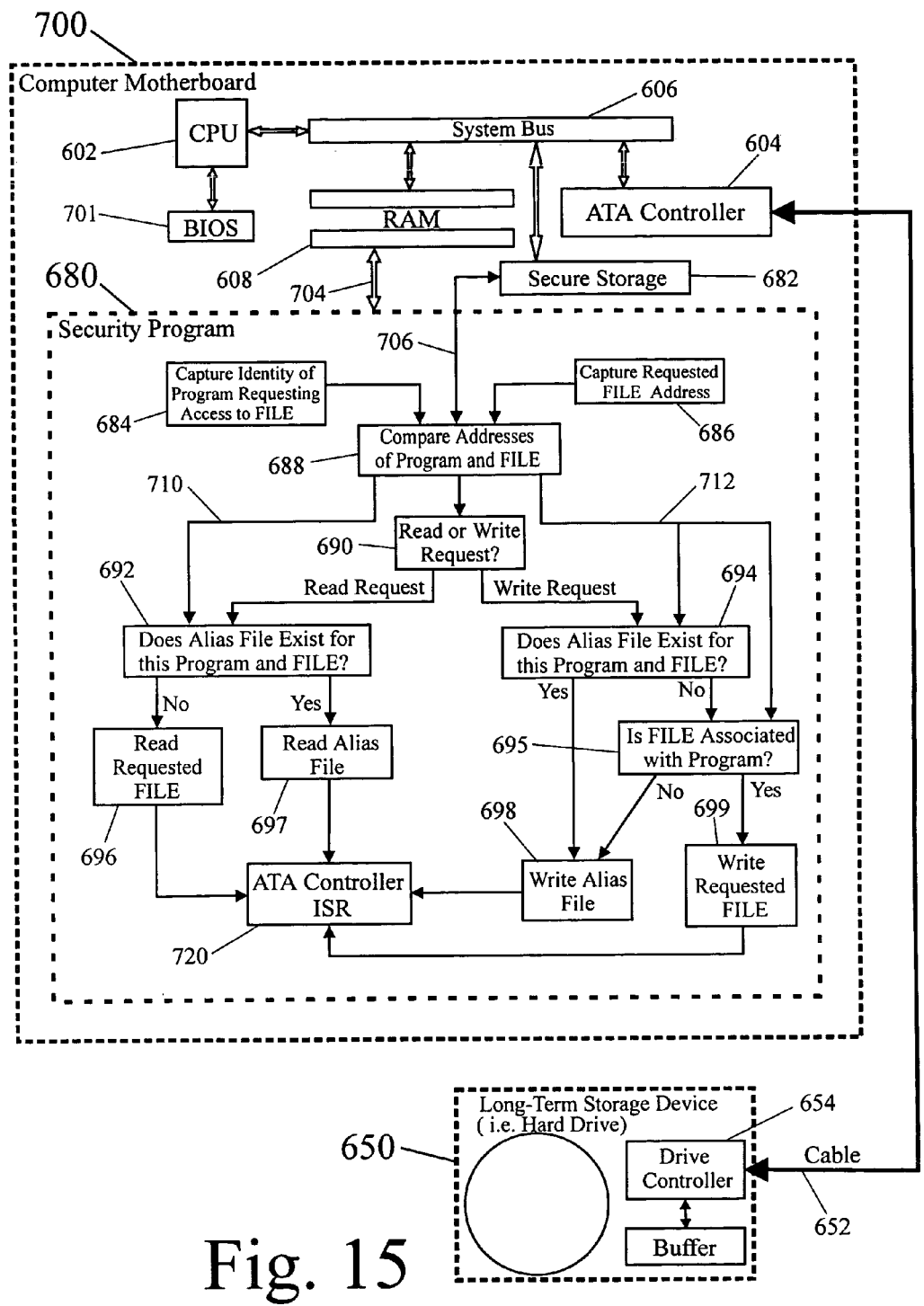

FIG. 15 Security system flowchart entirely within computer software and external secure storage.

Figure 16A:
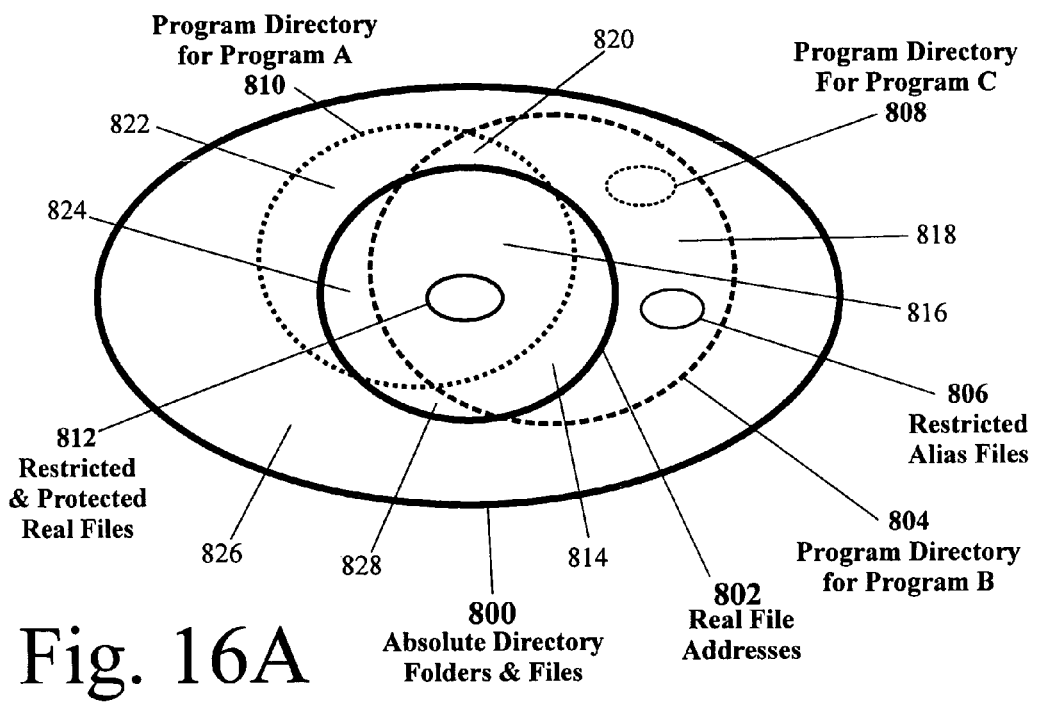

FIG. 16A Venn diagram of security system's Real, Alias and Absolute File organization for "read", "write" and "execute" requests.

Figure 16B:
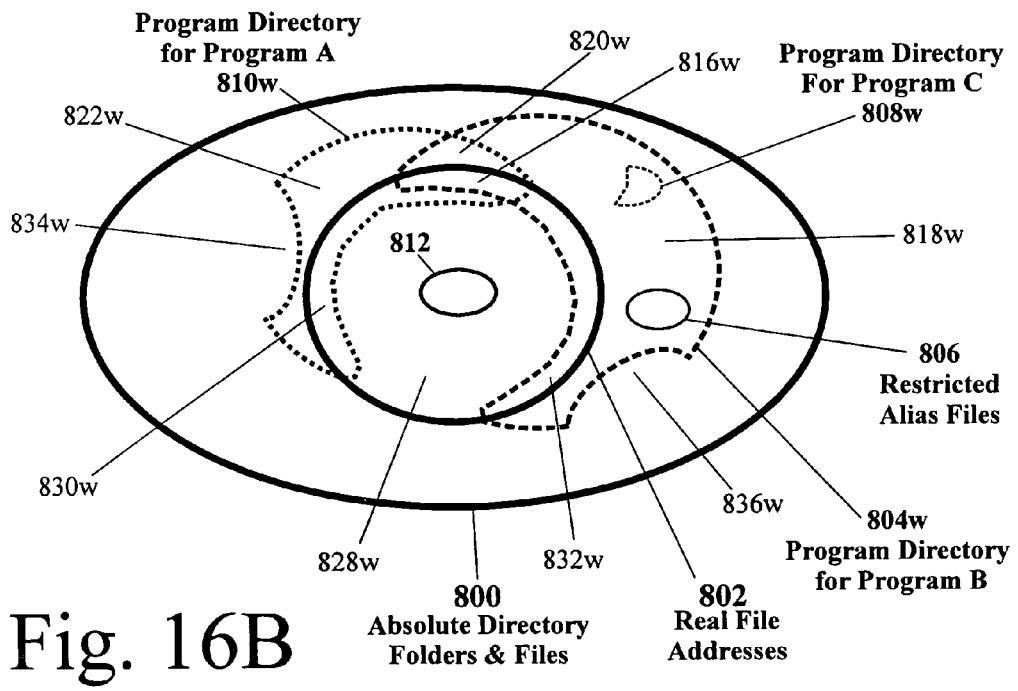

FIG. 16B Venn diagram of security system's Real, Alias and Absolute File organization for "write" and/or "execute" requests.

DETAILED DESCRIPTION OF THE PREFERRED EMBODIMENTS

The disclosed computer security control system comprises a directory security controller (also referred to as directory controller and security controller) that can be connected logically between the Central Processing Unit (CPU) of a computer and its long-term nonvolatile storage memory (i.e. hard drive, etc.). The security controller can exist external to the computer's operating system in hardware, and/or exist in software within the computer's operating system. The security controller may be integrated with a computer motherboard, where bios and ATA adaptor (IDE controller) work together to provide the security system with little, if any, modifications to current operating systems or hard drives. This is possible because the security controller acts like a hidden layer that neither the operating system nor the hard drive is aware of. Thus, nearly any type of long-term nonvolatile memory storage will work with this system and can comprise any of a number of different storage systems, including hard drives, CD-RWs, DVD-RWs, flash memory, tape drives, floppy drives, Zip drives, USB micro drives, network drives, web storage drives, wireless storage drives, etc. The disclosed directory controller (security controller) can allow all programs (applications, system threads, etc.) to operate normally, but limits where these programs can write files on the long-term storage device. If a program requests write access to a restricted area for that program, the security controller creates and alias folder(s) for files which that program tries to write. For example, if during an attempt to write a file, the directory security controller determines that the access requesting program is not authorized to overwrite the file requested, the directory controller can write the file into the same folder (directory) as the program (or other predetermined directory for unauthorized file writes—i.e. alias folders and files). The program still writes the file, and it appears to be located in the proper directory address from the program's point of view, but it is actually stored in at an alternative directory address (alias folder address). The file is actually written in a different directory location on the hard drive, and associated with the program's storage folder (storage directory address of program) and/or associated with the program itself. The place of storage of the alternative files (alias files) is determined by which program and/or program thread initiated the write request (save, save as, modify, rename, delete, etc.) of the file. When the same program tries to reload the same file it wrote earlier, the security controller first checks to see if that particular program has an alias file for the real file address (actual file address that the program requests). If the normal directory filing system is itself being used to associate alias files with the program writing them, then the security controller can first looks in the requesting program's own directory to see if an alias file exist for that particular program and real file address. If the alias file exists, the security controller will load that alias file, even if a real file exists at the real file address location where the program requests. Thus, a program can load a system file, alter the system file, write the system file to disk to apparently the same directory address, and then reload the altered system file from apparently the same address without every altering the original system file or effecting any other program using that file. From the program's point of view, the system file was altered, stored and retrieved from its normal folder address, but the original is still unaltered. The file appears to be in the correct directory (to that program), but is actually placed in a mapped directory (alias directory), so that the file being written (alias file) does not overwrite an existing (and possibly important) file it is not authorized to overwrite. These alias files that are created (written), can be written in the same directory as the program, so that the program can only write files within its own folder and/or subfolders. In this way programs are quarantined to their own folder directories. If the program is malicious, it can thus only damage itself.

When that program later requests the unauthorized file (alias file), either to load, alter and/or execute (run), the directory security controller first looks in the program's own folder to see if the requested file has been written there as an unauthorized file (alias file). If the file is there, the directory controller would load it instead of looking in the actual directory the program tried to access. In this way, programs can be restricted from writing to other program's folders without specific permission. Programs can still run normally even if they try to write and reload to illegal location. Notice that programs can still load, run and save (for its own use) other programs without restriction (unless specific restrictions are specified), so a program can still take advantage of existing programs and files on computer, but each of these programs is trapped within its own directory (or associated group) unless otherwise authorized. Similarly, a malicious program (virus, worm, etc.) can operate normally in this environment, but the malicious program cannot change anything lasting, since it cannot change other program's files on the hard drive (or other long-term storage). Thus, a virus can execute and do whatever it does, but when the computer has infected is turned off, or the program it infected is closed, the virus closes with it. Even if the a malicious program request a reboot, it does little more than turn itself off, since it can only "appear" to change files that are associated with the reboot process.

Overview

In the context of a computer system, the invention concerns document-management interactions among an operating system, one or more application programs, and a user-interface which allows users to view and enter data into the computer system. More particularly, the operating system takes advantage of normal interactions with application programs during access to basic read and write file functions (load, run, save, save as, delete, etc.) to present a common default storage folder called "My Documents" to the application programs. In addition, the operating system promotes further use of the "My Documents" folder at other file-access points in its graphical user interface. Another set of inventive features relate to using the "My Documents" folder in a network environment to facilitate the sharing of documents between users of different computer system.

Prior Art Computer System

FIG. 1A shows a prior art computer system 70 which can embody the invention. The following description of system 70 is intended to provide a brief, general description of suitable computer hardware and a suitable computing environment in which the invention can be implemented. This prior art FIG. 1A and the discussion of FIG. 1A comes nearly word-for-word from U.S. Pat. No. 6,466,238 B1 to Berry issued on Oct. 15, 2002. Although not required, the invention is described in the general context of computer-executable instructions, such as program modules, being executed by a computer, such as a personal computer. Generally, program modules include routines, programs, objects, components, data structures, and so forth, that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices linked through a communications network. In a distributed computing environment, program modules may be located in both local and remote memory storage devices.

More particularly, computer system 70 includes a general purpose computing device in the form of a computer 20, including a processing unit 21, a system memory 22, and a system bus 23 that operatively couples various system components including the system memory to processing unit 21. There may be only one or there may be more than one processing unit 21, such that the processor of computer 20 comprises a single central-processing unit (CPU), or a plurality of processing units, commonly referred to as a parallel processing environment. Computer 20 may be a conventional computer, a distributed computer, or any other type of computer. Thus, the invention is not limited to a particular computer.

System bus 23 may be any of several types of bus structures including a memory bus or memory controller, a peripheral bus, and a local bus using any of a variety of bus architectures. The system memory, which may also be referred to as simply the memory, includes a read only memory (ROM) 24, and a random access memory (RAM) 25. ROM 24 stores a basic input/output system (BIOS) 26 containing the basic routines that help to transfer information between elements within the computer 20, such as during start-up. Computer 20 further includes a hard disk drive 27 for reading from and writing to a hard disk platter within disk drive 27, a magnetic disk drive 28 for reading from or writing to a removable magnetic disk 29, and an optical disk drive 30 for reading from or writing to a removable optical disk 31 such as a CD ROM or other optical media. The invention can be operated in connection with any or all of these non-volatile storage systems, and is not limited to any particular type of memory storage.

Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for computer 20. It should be appreciated by those skilled in the art that any type of computer-readable media which can store data accessible by a computer, such as magnetic cassettes, flash memory cards, digital video disks, Bernoulli cartridges, random access memories (RAMs), read only memories (ROMs), and the like, may be used in the disclosed operating environment.

Hard drive 27, as well as the other long-term storage media, are accessed through BIOS 26 hardware routines. Different media (floppy, CD-RW, DVD+RW. etc.) have different drivers, and different protocols, and are often driven by the BIOS 26 programming. For example, computer system 20 can be designed to access hard drive 27 in the following way. When an application program 36 requests access to a file on hard drive 27 an interrupt service routine (ISR) in operating system 35 and/or BIOS 26 is activated. In older systems operating system 35 first checks the File Allocation Table (FAT, VFAT, FAT32, MFT) to locate the address of the clusters that contain the requested file, and creates a record in the file allocation table for the file if it is the first time it is being written. Control is then usually passes over to BIOS 26 which controls the details of reading or writing the file. The BIOS accesses the hard drive through hard drive interface 32, which can be an ATA Interface (IDE, EIDE, etc.), SCSI or other hard drive interface. After the BIOS is done reading or writing the file, control is returned to operating system 35, which then makes any changes needed to the File Allocation Table to include all the cluster information if a file was written. If hard drive 27 is has enhanced integrated drive electronics (EIDE) the disk controller is built into the drive itself. For the disclosed system all the hard drive software may be moved to the BIOS so that an Interrupt Request goes directly to the BIOS program that controls hard drive interface 32.

If operating system 35 is the Windows XP operating system, then all access to hard drive 27 normally go through the Application Programming Interface (API). When an application calls on the hard drive (through a software call, software interrupt service Request, or etc.), the API can be accessed. The API in turn calls DLL function(s) needed for the requested access function. Each drive access function (i.e. Save, Load, List, Run, etc.) normally has a separate API program to execute that function. The API provides this service and also protects users from each other and provides protection against an application damaging the API and other core services (i.e. kernal files KRNL386.EXE (for 16-bit windows programs) and KERNAL32.DLL (for 32-bit windows programs) and other control operations (Input/Output, Interrupts, Memory Management, etc.). Windows XP has additional layers to handle additional devices for file storage which include calling the Installable File System Manager to pass control to the proper File System Driver (NTFS, VFAT, CDFS, etc.). The File System Driver (FSD) then gets the disk location of the file's first cluster from the Master File Table (MFT) stored on hard drive 27. The IO Subsystem (IOS) assists the FSD with communication between the FSD and lower level device-specific drivers. The MFT provides the location data needed for the FSD to identify the clusters on the hard drive where the requested file is stored (or to be written). The MFT also contains the hierarchical relationship between all the data on the hard drive (i.e. file names, directory and subdirectory information). The Volume Tracking Driver (VTD) may be used if the file being accessed is on a removable drive (floppy, CD, DVD, etc.). Next the Type-Specific Driver (TSD) is called (which may be stored in BIOS 26)

Since the Master File Table (MFT) is stored on hard drive 27 and BIOS 26 can have complete control over the MFT, the disclosed security system (DASS system) can be implemented completely within BIOS 26. The way operating system 35 accesses the BIOS may need to be modified for proper operation with the BIOS, but in principle the operating system nor the applications need to know that the DASS system is mapping certain files to new alias addresses. Some care must be taken by the operating system, and/or other program, to not break certain rules governing DASS operation. For example, generally a program that creates a file (initially writes file to the drive) is the only program that is allowed to modify the file at a later time. If more than one program is to be used to modify certain files then each of those programs can be stored in the same folder (or subfolder) as the program that writes the file. This associates both the program writing the file and the programs allowed to modify the file with each other and the file itself. Alternatively, the file can be marked in some other identifiable way as being associated with all the programs that are allowed to modify that file.

A number of program modules may be stored on the hard disk 27, magnetic disk 29, optical disk 31, ROM 24, or RAM 25, including an operating system 35, one or more application programs 36, other program modules 37, and program data 38. Operating system 35 provides numerous basic functions and services to application programs 36 stored by system memory 22, hard-disk drive 27, and/or hard-disk drive 50. The invention, however, is not limited to a particular operating-system type or architecture. Indeed, the invention can be incorporated in any number of existing operating systems, such as, Microsoft Windows 95, Microsoft Windows NT 4.0, IBM OS/2 operating system, Apple Computer MacOS 7.0, etc.

DISCLOSED INVENTION

In FIG. 1B, we see a modern digital systems 101. The prior art portion of FIG. 1B and the following discussion of the prior art aspects of FIG. 1B are taken nearly word-for-word from the discussion of the prior art system seen in FIG. 1B of U.S. Pat. No. 5,905,885 to Richter issued on May 18, 1999. Digital systems 101 typically include multiple integrated circuits on multiple printed circuit boards. The system 101 is a desktop computer which includes two ATA-type disk drives 114 and 115 and two Personal Computer Memory Card International Association (PCMCIA) expansion slots or sockets 116 and 117. PCMCIA is a standard interface and specification to allow PCMCIA cards such as 122 and 123 to vary the capabilities of a computer system or other electronic equipment. The PCMCIA cards consist of a connector that interfaces to a printed circuit board that is approximately the size of a credit card. The main printed circuit board or motherboard 100 includes the central processing unit (CPU) 140, which is the heart of the computer system 101 and controls the operations of the system, and also the internal system memory 142. The CPU 140 is coupled to the system memory 142 and the other integrated circuits on the motherboard 100 by the core logic 143. As peripherals or subsystems such as the disk drives 114 and 115 are added to the system 101, interface boards such as the board 104 are coupled to the motherboard 100 and to the system bus 146. This interface board 104 is also coupled to the disk drives 114 and 115 by a cable 110 which allows the interface board 104 to communicate with the disk drives 114 and 115. The interface board 104 includes the ATA host adapter integrated circuit 108 which serves as the interface and controls communications between the disk drives 114 and 115 and the CPU system bus 146.

In systems of the prior art, as additional peripherals such as the PCMCIA expansion slots or sockets 116 and 117, are added to the system, an additional interface board 102 must be coupled to the motherboard 100 to serve as the interface and control communications between the PCMCIA expansion slots 116 and 117 and the bus 146. Bus 146 has a differing number of address and data lines as compared to the PCMCIA address and data line requirements. Data transfers across bus 146 are at a different rate than the data transfer to a PCMCIA card. Other control signals are also required at the PCMCIA interface in order to adapt to the various needs of differing PCMCIA cards that may be inserted. Thus the PCMCIA interface is very flexible and the PCMCIA adapter 106 is used to interface differing data and address line requirements having different transfer rates between the system bus 146 and PCMCIA cards 122 or 123. The interface boards 102 and 104 are typically coupled to the motherboard 100 by inserting them into receiving slots on the motherboard 100. Because there is limited space within the computer system case and the number of receiving slots on the motherboard 100 is also typically limited, only a finite number of interface boards can be coupled to the motherboard 100, thus restricting the number of peripherals which can be coupled to the computer system 101 at any one time.

hi FIG. 1B, a single cable 170 is coupled between the PCMCIA host adapter board 102 and the two PCMCIA expansion slots 116 and 117. Cable 170 carries signal lines to support two PCMCIA expansion slots 116 and 117. The cable 170 is coupled to the connector 133 and to the connector 172 on the PCMCIA expansion board 178. The connector 133 is coupled to the PCMCIA host adapter 106 by the busses 138 and 139. The connector 172 is coupled to a termination or buffering circuit 176 by the bus 174. The termination or buffering circuit 176 is coupled to the first PCMCIA expansion slot 116 by the bus 124 and to the second PCMCIA expansion slot 117 by the bus 125.

The disk drives 114 and 115 illustrated in FIG. 1B are ATA (Advanced Technology Attached) hard disk drives, but the disclosed security system is not restricted to any particular controller structure, and the security system can be used with other controller systems (i.e. Ultra ATA, USB, Apple DOS, etc.). The ATA controller is used here only as an example. ATA hard disk drives may also be commonly referred to as IDE (Integrated Drive Electronics) hard disk drives. ATA is a set of standards and specifications used for communications between disk drives and host central processing units which defines an integrated bus interface between disk drives and host CPUs and provides a common point of attachment for system manufacturers, system integrators and suppliers of intelligent peripherals. The ATA standard interface having 40 total lines, includes a three-bit address bus designated as DA0, DA1, and DA2 used for indexing drive registers; a 16 bit bidirectional data bus designated as DD0 through DD15; a data width format signal designated as IOCS16-indicating either an 8 or 16 data bit capability, a write strobe signal designated as DIOW-; a read strobe signal designated as DIOR-; an interrupt request signal INTRQ, a status signal I/O Channel Ready designated as IORDY, and host chip select 0 and 1 signal lines respectively designated as CS1FX- and CS3FX-. The two host chip select signal lines CS1FX- and CS3FX- which act similar to an address line, select access of either Command Block registers or Control Block registers within an attached ATA disk drive. Other signals present within the ATA standard interface that may be significant to the description of the present invention will be described below.

The disk drives 114 and 115 may be designated disk drive 0 and disk drive 1 by the ATA cable connection for the ATA standard interface signal CSEL (ground=drive 0, open=drive 1) or by setup switches or jumper wires within the disk drive electronics that are read upon reset. Only one of the disk drives 114 or 115 connected to the same ATA cable 110 can be accessed at any one time. The selection of whether disk drive 0 or disk drive 1 is to be accessed is controlled through use of the drive/head register which is embedded in each disk drive. Both disk drives 114 and 115 simultaneously respond to writes on the cable to the drive/head register, however only the selected drive will respond to writes to other registers therein. Bit 4 of each drive/head register, designated DRV, is used to select the drive that should be active to receive the other drive register accesses and is compared by the drive with its CSEL or switch/jumper configuration as drive 0 or drive 1. If the host CPU sets DRV to zero then drive 0 is selected and further register accesses are to drive 0 registers. If the host CPU sets DRV to one then drive 1 is selected and further register accesses are to drive 1 registers.

Accesses to the disk drives occur during read and write cycles. Note that during all ATA read or write cycles either a CS1FX- or CS3FX-signal becomes active. Activation of CS1FX- or CS3FX- is then followed by either DIOR-active low signal or DIOW-active low signal. If neither CS1FX- nor CS3FX- is active then no write or read operation is being performed to the disk drives regardless of the condition of other signals on the ATA cable 110 including DIOR- and DIOW. Generally, the disclosed storage security system will detect access to read or write to disk drives 114 and 115 before CS1FX or CS3FX is activated, either in software or hardware. Detection can occur when an application requests an interrupt to access one of the disk drives, or performs a call to a operating system subroutine that can access the disk drives. A program may also try to access the disk drive directly, in which case, if no other detection has occurred, the security system would identify the program requesting access either through CS1FX or CS3FX or other identifiable signal common to accessing the disk drives.

If a read or write host CPU transfer cycle to or from the ATA drive needs to be extended, then the ATA drive de-asserts the IORDY signal inactive low. This indicates that the selected hard disk drive needs further time to complete the present operation before any other operation may take place. Otherwise IORDY is pulled up to an active one or an active high level by a pullup resistor.

The ATA standard interface is not compatible with the PCMCIA standard interface in that a PCMCIA device cannot be coupled to a system through an ATA port, even if the differing connector types were not a problem. Correspondingly, a user cannot couple a standard ATA device, such as the disk drives 114 or 115 to a system through a PCMCIA port. However, there is a method of interface described by the ATA SFF (Advanced Technology Adapter Small Form Factor) committee to connect ATA devices packaged in a PCMCIA form factor to PCMCIA socket connectors. This allows an ATA disk drive to be mechanically arranged into a PCMCIA card form factor and designates how the ATA signal lines may be arranged within the card's PCMCIA connector. However, the ATA SFF interface to a PCMCIA socket connector does not support system identification of installed drives and will not work for devices other than ATA SFF packaged disk drives. Due to the limited applicability, the ATA SFF interface method is not supported in many machines which offer PCMCIA card support. For the reasons discussed above, it may be preferable to use the more flexible PCMCIA standard because it can interface to a wide variety of peripheral devices including a disk drive interface and because it simplifies the interface.

In FIG. 1B, the disclosed folder security system is added to the otherwise typical computer motherboard 100. Folder controllers 180 and 184 (disclosed security system) are added to the hard drive controller 104 and PCMCIA controller 102 respectfully. Both controllers 180 and 184 provide the same address mapping function during write and read functions, when writing and reading a specific file, respectfully. Controllers 180 and 184 determine (identify) the actual specific program and/or program thread requesting the write (save) or read (load) function, and then determines the storage folder address (directory address) where that specific program and/or program thread is stored (specific program storage directory address on one of the ATA DRIVEs or PCMCIA CARDs). This level of abstraction is placed between the real folder address requested by the specific program and the actual folder address (Absolute Folder Address) used by the storage device to store the specific file. Thus, neither the program requesting the write and read function nor hard drives 114 or 115 nor PCMCIA controller 178 need be aware of the Folder Controllers' (FC) actions, folder controllers 180 and 180 are substantially hidden logically from them. Folder controllers 180 and 184 provide a mapping function for the write and read functions, creating a bidirectional virtual directory map (Program Directory Address Map), which depends on the specific program's storage folder address and its relationship to the storage folder address of the specific file being accessed in storage memory (i.e. hard drive, floppy, CD-RW, PCMCIA card, etc.). If the specific file's folder address is within the specific program's storage folder (Absolute Folder Address) then no mapping is needed and the file is simply written, or read, to or from, the requested folder address. If the specific file's folder address is outside the specific program's storage folder (not in specific program's folder or subfolders and/or specific file not associated with specific program), then an alias folder address is created and/or accessed to write or read the specific file. Thus, whenever that specific program tries to read or write the specific file in the future, the alias version of the specific file (alias file) at the alias folder address will be used instead. Other programs, when trying to access exactly the same specific file and folder address (Real file Address), may not be directed to the specific program's alias file, but instead go to the original (real) specific file address, or its own alias folder address for the specific file or alias file. Thus, each program may create its own copy of a particular version of the specific file if it tries to write it outside that program's own folder directory (folder and/or subfolders), but retrieves its own copy of the saved alias file as if it were written in the folder requested by the program. Thus, to the program, everything appears normal. Note the hierarchical directory structure on most computers and used here to provide the hierarchical mapping of files and folders (real and alias), is purely convenience and other association scheme can be used to identify specific folder and specific file groups. Specific files written by a specific program could be marked as associated with that specific program, independent of where it is stored. This is much like the three character extension on file names used by programs to identify there own files. However, for this disclosed security system, files marked as associated with the specific program, can not be changed by other programs so they are securely and permanently associated with the specific program.

The only difficulty arises with this folder mapping system, when more than one program needs to modify and/or to access a particular file (executable or passive). In this case, one does not want each program to have its own copy of the file or program being written or loaded. This is easily controlled by simply placing programs that are going to use the same files in the same folder or directory (associated with each other). Then all the programs can access and change the same set of files. Another way to deal with multiple program access, is to create a controller program in the main folder and place the programs in subfolders within this main folder. Then the controller program in the main folder can be used by all the programs in its subfolders to control all saving and loading of files. In this way only one copy is made since the controller program is always the program doing the saving or loading. Another way to solve the problem of multiple program access is to designate a folder as NON-EXECUTABLE, where the folder controllers would disallow any file to be written that could be executed by the computer's operating system (i.e. .EXE, .BAT, .COM, etc.). A more secure way to do the same thing is to mark the NON-EXECUTABLE folder so that folder controllers 180 and 184 will allow loading of files within the folder, but not allow the computer CPU to actually execute the file as code.

An alternative arrangement for the folder security controllers 180 and 184 can be to replace them with folder security controller 190 and data controllers 198 and 199. The operation of controllers 190, 198 and 199 is the same as controllers 180 and 184 except the folder address location is mapped after leaving the standard computer ATA, PCMCIA, etc. controllers. Controllers 198 and 199 provide information to controller 190 which determines the mapped folder address to write the information to. This can be done on the motherboard by data lines 192, 194 and 196, as shown in FIG. 1B. Alternatively, data lines 194 and 196 may go to data controllers (not shown) within drives 114 and 115, and/or PCMCIA controller 178, respectfully. If this is done, the requested save (write) and load address(es) can be modified within hard drives 114 and/or 115, and/or within PCMCIA controller 178, with only the folder address of the program requesting the write or load needing to be sent to the hard drives and/or PCMCIA controller 178.

When a specific program makes a request to access (save, load, list, etc) a file or folder, a specific folder address and/or specific file address is sent to the hard drive controller 104. At the same time folder controller 180 receives a signal from the computer logic core that a program has requested access to hard drive 114 in this example. If the request is simply to list the contents of a folder, the folder controller 180 can list the contents of absolute folder directory 156 (see FIG. 2) or the alias folder map 154 contents depending on which program made the request. If the disk access request is to save, load, cut, copy, paste, modify or other commands requiring write access, then folder controller 180 identifies the specific program making the access request, and compares that program's folder address to the address of the specific folder or file being accessed. Note that several functions require write access to operate, such as, save, modify, paste, cut, move, delete, rename, and other commands. The folder security controller would be activated with all of these commands, including load commands, to determine and control which directories to write files in or load files from.

In FIG. 2, we see one possible way of setting up the data mapping scheme for folder controller 180 in FIG. 1B. (Folder controller 184 is constructed in a similar manner and would be called upon when a nonvolatile storage device is plugged into the PCMCIA slot. When other non-storage PCMCIA devices are plugged in, folder controller 184 would be inactive). Hard drive 114 is a standard (typical) hard drive operating under standard prior art protocols. For prior art computer systems, absolute folder directory map 156 is typically identical to requested folder directory map 150. However, with the addition of the directory security system, an additional logical folder map layer (i.e. maps 152 and 154) is added. Absolute directory map 156 is shown within hard drive 114 (long-term storage device) in FIG. 2, but could be stored elsewhere if desired. Map 156 can be stored on the physical platters 160 of the hard drive, or on protected nonvolatile memory within hard drive 156. Map 156 can also be stored in protected nonvolatile memory on the computer's motherboard or other secure location. A copy of map 156 can be transferred to the computers random access memory (RAM, see FIGS. 13-15) during operation, to allow the operating system and/or security controller 180 rapid access to its information. Request folder Address map 150 is the folder address map that programs running on the computer see and in prior art systems would essentially be absolute folder directory map 156. However, in this example, a logical folder maps 152 and 154 are placed between absolute folder map 156 and requested folder map 150. Depending on which "logical folder map" security controller 180 chooses, the file being written or loaded will be mapped differently. Folder controller 180 can be based entirely in hardware, entirely in software (using present day hardware), or a combination of both. Putting at least some functions of folder controller 180 in hardware will help secure its resistance to viruses, worms and other malicious programs. Folder controller 180 would also have its own dedicated memory space on the hard drive, or elsewhere, which only it can access. Folder controller 180 can also have dedicated RAM to store active program map 162, and other information that is not accessible to CPU 140. Controller 180 also is able to collect address information from the logic core (operating system, hardware logic, etc.) about the program memory block being executed in memory when the access to drive 114 or 115 was requested. Specifically, folder security controller 180 may use memory address information 164 from CPU 140 and core logic 143 to determine the program requesting access, by looking it up in directory map 162. The memory location information in 143 and/or 140 may also contain additional table information about previous program call addresses to determine what applications called for the execution of the program at address 164 (04C7). With this information, controller 180 generates either a real folder address map 152 and an alias folder address map 154 depending on the program making the access request and the folder address of the file being accessed and the type of access request made. From this address 164, the specific program's making the access request (load, write, etc.) can be determined. The Absolute Folder Address for the program (i.e. "C:\Virus\bad.com") can be determined by comparing address 164 with a list in RAM Memory blocks map 162 to determine the specific program (program entry 168 in this example), which made the access request. From entry 168, the security controller 180 can obtain the specific program's folder address ("C:\Virus\bad.com" in this example) to use in generating the alternative address map 154 (alias folder map) for that specific program and specific access request. Table 162 is continually updated as programs are moved around in memory.

Alternatively, controller 180 may simply keep track of the presently executing program and then using its directory address if it requests access (load, save, delete, modify, execute, etc.) to storage memory. Much of this information is already tracked by logic cores that provide multitasking operating systems. However, the actual processing needed, to determine the specific program's folder address, can be done all in software, all in hardware, or a combination of both. Once a Real map 152 and an alias map 154 are generated, the logical folder map is ready to be used by Security Controller 180 to select the correct absolute folder directory address from map 156. Map 156 is then used to map the access request to logical memory address map 158, which maps to the actual physical memory sectors on hard disk platter 160.

Hard drive 114 can be a standard prior art drive, but may contain folder security controller hardware for security that is more difficult to compromise. The physical memory disk 160 comprises memory storage cells (i.e. 160*a*, 160*b*, etc) within many tracks and sectors. Storage cells 160*a-b* are often called sectors. Logical memory map 158, lists memory cells (sectors) used for a given specific file and maps the file onto physical memory disk 160. Alternatively, map 158 may contain only the first sector for the specific file, with the second sector sequentially identified by the first sector, the second sector identifying the third sector and so on until the entire file is read or written. Absolute folder directory map 156 stores the relationship between the absolute directory structure and the listing of logical memory addresses in map 158. Both absolute directory map 156 and memory map 158 can be stored on disks 160 in a secure section of the disk. On a real hard drive and operating system, for example, the Windows NT File System (NTFS) used in Windows NT, Windows 2000 and Windows XP may comprise maps 156 and 158. Similarly, on another system Logic Address map 158 may be the FAT32 Allocation Table used in earlier Windows Operating Systems.

In FIG. 3, we see one example of a computer system using the disclosed invention. Prior art computer motherboard 230 is used along with its CPU 232, input-output bus (I/O) 234, and random access memory (RAM) 236. Hardware directory security controller 240 (security controller), and software directory security controller 245 can be used separately or together to provide security. That is, the security control system can be based entirely within hardware for absolute security, or completely in software operating on the computer, or any combination of both. The security controllers 240 is logically connected between computer CPU 232 and hard drive 250. Note that this is a logical connection not necessarily a physical one, since a hardware security controller can be placed on the system bus and control I/O 234 from there.

Computer 230 is shown in a very simplified form, comprising a CPU 232, a I/O controller, and a high-speed random access memory (RAM) 236. Non-volatile memory 250 is a hard drive in this example because it is presently the most common form of non-volatile storage for computers because of its relatively fast transfer speeds, and relatively large storage size. Security controller 240 can be designed for any storage device not just hard drives. Both volatile or non-volatile storage devices can be used, since the security controller operates above the awareness of the storage device, and only modifies the relationship of a file being written with respect to other directories or folders. Similarly, I/O controller 234 also does not need to be aware of the operation of security controller 240. For I/O 234, security controller 240 appears to "be" hard drive 250. The modification of files being written is coordinated by the security controller's ability to detect the original directory of the program and/or program thread that made the "write request" on hard drive 250. This directory information can be designed to come through data lines 238 from the I/O 234. Optionally, the "write" requesting program can be obtained directly from the CPU address lines to determine the address pointer's location at the time of the write request. In this way, the security controller can determine which program and/or program thread is operating in that memory space, and thus, the directory (folder) it resides in on hard drive 250. The tables for determining which program from the address pointer and for determining the directory for that program is created and stored within directory controller 240, and/or within a secure memory location on hard drive 250 and/or within secure memory on motherboard 270.

In FIG. 3, security controller 240 is shown physically between I/O 234 and drive 250 to illustrate the added logical layer of directory mapping. Data lines 242 connects hard drive 250 to security controller 240, and data lines 238 connect security controller 240 to hard drive I/O controller bus 234. Data lines 238 and 242 can use wired or wireless communication means in any of the many way of transmitting data between the components, including serial, parallel, and other data transfer protocols. For practical purposes this complete separation of the security controller 240 from motherboard 230, makes it possible to have security controller 240 to be physically part of hard drive 250. In such a case, the hard drive would be providing all the security control, but would require a connection to the motherboard (hard wire or software) to identify the program making a "write" request.

Alternatively software directory security controller 245 can be used to provide directory mapping for hard drive 250. Such software would need to be placed in a secure memory location such as part of the operating system's disk operating system (DOS), config.sys program, or other lower-level protected program. Through software, "write" requests would be processed and the correct "Rear" directory address sent to prior art I/O 234 and on to prior art disk drive 250. Software would also determine the folder address of the "write" requesting program so it can properly direct the file being written to the correct folder address. Hardware controller 240 would not need to exist in any substantial way. Of course, the directory security system can consist of a combination of hardware and software components to provide the level of security desired.

There are many other ways controller 240 and 245 can determine which program thread makes a "write" request. For a less secure system, program determination can all (or mostly) be done in software. The lower the level of software control for identifying the presently executing program, the more secure the system can be. Specific lower-level program(s) can be installed on the computer to manage all processes including Microsoft Windows (MS Windows), Lenix or other operating system, or built into the operating system itself. For the DOS and DOS based Windows operating systems, this control may be done by the lowest level program io.sys, or the next lowest msdos.sys however, such controls would typically be given to the program config.sys which normally can not be changed by the command line without updating the file on disk and rebooting. For non-DOS based Window other similar programs would be used to provide program execution identification. For example, in Windows NT the operating system kernel ntoskrnl.exe can be used to provide lower level program identification and program folder identification. Similar programs exist in the newer windows operating system that can be used to proved relatively secure identification of the presently executing program's nonvolatile storage folder (program's folder address on hard drive). Another alternative is to place the security controller within the hard drive controller itself so directory mapping (folder mapping) is done on the motherboard (see FIG. 5). For operating systems which use "Virtual Machines" to execute programs, a "write" request by a specific program can be identified by observing what program memory block was being fed to to the "Virtual Machine" at the time of the long-term storage access request. A "Virtual Machine" can use a hardware storage solution for memory block identification by storing the Application Programing Interface (API) files USER32.DLL, GDI32.DLL and KERNEL32.DLL in ROM, or other secure memory. Memory allocation can also be made secure by securing the Master File Table (MFT) in a protected memory location, where the operating system itself can not access it directly.

There are may ways security controller 240 can identify the folder address of the program thread currently being operated on. For the sake of time I will only discuss a few. First lets discuss CPU operation. Modern-CPUs use two or more cashes to store programs being executed. Level 1 and Level 2 cashes are often on the CPU chip itself. Thus, to determine which program thread is being executed at any given moment, the CPU can identify which memory block it is working on. This memory block information can then be sent to security controller 240 through the data/address bus 233, through I/O 234 and data connection 238. Controller 240 would keep a directory of programs loaded from memory 250 and their memory block location. When a "write" request is initiated (CPU addresses a specific memory location where the "writing" program resides), the security controller would determine which program thread made that request by identifying the presently executing program. Once the program thread is determined it is a simple matter to provide a file directory map to determine where the program's folder is located on disk 250. Several different directory tables may be maintained within security controller 240 or stored in a secure portion of drive 250 which only security controller 240 has access. An alternative way to determine the program making the "write" request is to hard wire CPU 232 to output a signal to security controller 240 through data line 239 whenever a "write" request is accessed by a program. Then security controller only needs to know which program thread is presently executing. Some software control is still needed to determine which program is being executed, but can be less than is needed for an I/O only control. Another alternative is to connect the security controller directly to the CPU's data and address bus 233 (see FIG. 4) so that it can actually control the multitasking of programs and program threads. If security controller 240 is controlling program multitasking then it can easily determine which program thread is currently being executed.

In FIG. 4, we see a computer system where the security control is done completely in hardware. The programs and operating systems being executed on motherboard 270, operate normally, and are for the most part oblivious to the effects of security controller 280. Folder address capture circuit 272 and input/output ports 234 are hardwired into the motherboard to monitor movement of memory blocks by the motherboard systems through their direct connection to the computer's system bus 233. Having everything hardwired means that software problems do not effect the security of security controller 280. However, programs must follow certain protocols to operate properly in this environment. The most important protocol, is that all program threads which write files to storage, should save these files into the same directory as the program or one of its subfolders. If a program tries to write files outside its own directory, the security controller will requires authorization for the program to write files in other folders. During installation of the program, the user can be given the option to allow permission to write in specific folders, but these permissions require verified user response, such as, a mouse click or keyboard stroke. This is to prevent sinister programs (malicious programs) from saving files into unassigned folders without the user's permission. If the write request for a file is not allowed, then security controller 280 will write the file in an alias directory, which the controller will load back to that program the next time the program tries to load that file even though the file is in a different alias directory. The controller recognizes which program is making the request and gives it back the files it has previously saved. The program thinks it is saving and loading the file to and from requested folder address, but is actually saving and loading from a secure alias folder. Another protocol is that multiple programs that write and load a particular file should all be located in the same folder or have a master program that can control the saving and loading for all the programs. This seamlessly allows multiple programs to share files and executable programs without opening their folder directories to the dangers of malicious programs.

For the system in FIG. 4, a solid state memory 290 is used for mass storage instead of a hard drive to show that this folder security system can be used with other long-term storage media. Just like with disk and tape drives, solid state memories can also be used to store information securely in a hierarchical filing structure. In this case, nonvolatile memory 290, could be a USB flash drive, or any other solid-state nonvolatile mass memory storage that uses a hierarchical directory structure. Memory storage 290 is connected to computer motherboard 270 by data line 282, security controller 280, and data lines 273 and 238. Motherboard 270 is essentially identical to motherboard 230 except for the addition of a hard wired program folder identifier 272. Folder identifier 272 provides hard wired access to information from the motherboard about the presently executing program, and may also have access to directory information on memory device 290 to determine whether the file being written is being saved in the folder or subfolders of the program actually making the write request. If the requested address is in the folder or subfolder of the requesting program, then the file can be written there to its real directory address. If not, then the security controller would map the file into a separate alias directory and create an Alias File there. The actual Absolute Directory chosen for the Alias file would depend on the program which requested access. For practical purposes this separate alias directory can be written into the requesting program's folder and include the full directory address of the real directory address of the requested file. Note that to other programs (applications) this alias directory may not appear at all (hidden). Thus, Alias files, in general, are only accessible to original requesting program or by a special program that can list all Files (Absolute Directory) on the long-term storage device. The security controller would map the "Real File Address" requested by the program to the appropriate alias files as if it were the "Real File Address". This file data can flow through data line(s) 238 from I/O bus 234 to security controller 280. Controller 280 can be physically mounted on motherboard 270, within solid state memory 290, or somewhere in-between. Security controller 280 can also have direct access to RAM memory 236 if desired, though I/O 234 provides this function also. Security controller 280 can also have direct access to CPU 232, to coordinate execution of programs and/or stop a process when a "write" command has been detected.

The reader should note that there is an almost unlimited number of ways the computer system in FIG. 4 can obtain directory address information about an executing program and can routed data between the CPU 232, RAM memory 236, and nonvolatile storage 290. Since the relevant data can be obtained from nearly any component connected to the motherboard's data bus, there exists many combinations of components that can be used to collect program directory information. Special tables can be created to match the random access memory (RAM) address of the program making the storage device access request, with the program's absolute directory address from where it was loaded (see table 162 in FIG. 2). With so many system components on modern day computer motherboards, many paths exist for obtain and transfer information needed by the security controller. Furthermore, additional components can be added and combined to provide the directory address of the program making the access request. Thus, the folder directory address of the presently executing program can be obtained and transmitted to nonvolatile memory in an almost endless number of ways.

Figure 5A:
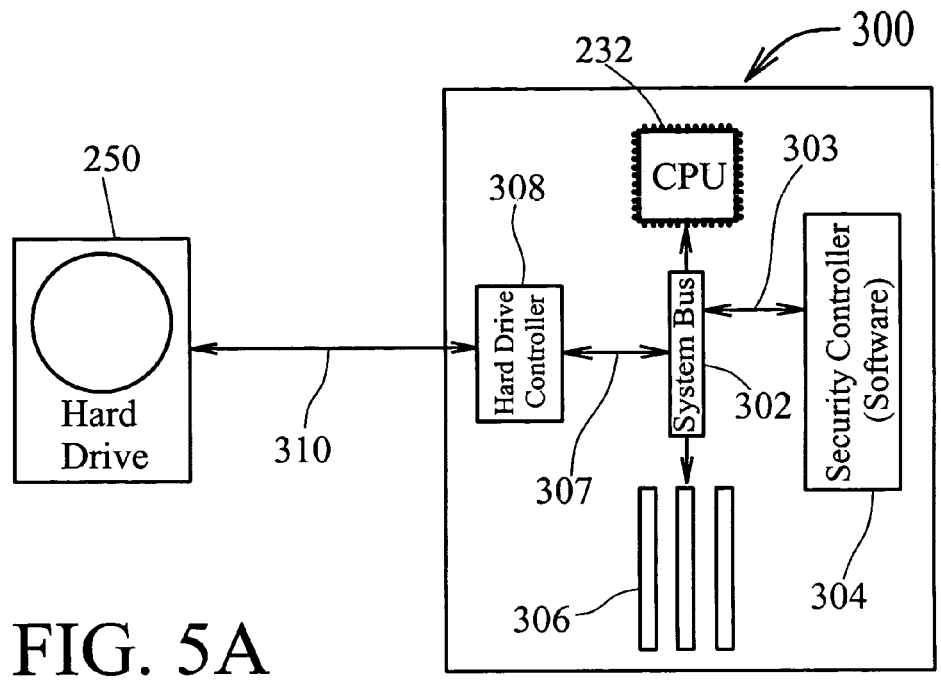
Figure 5B:
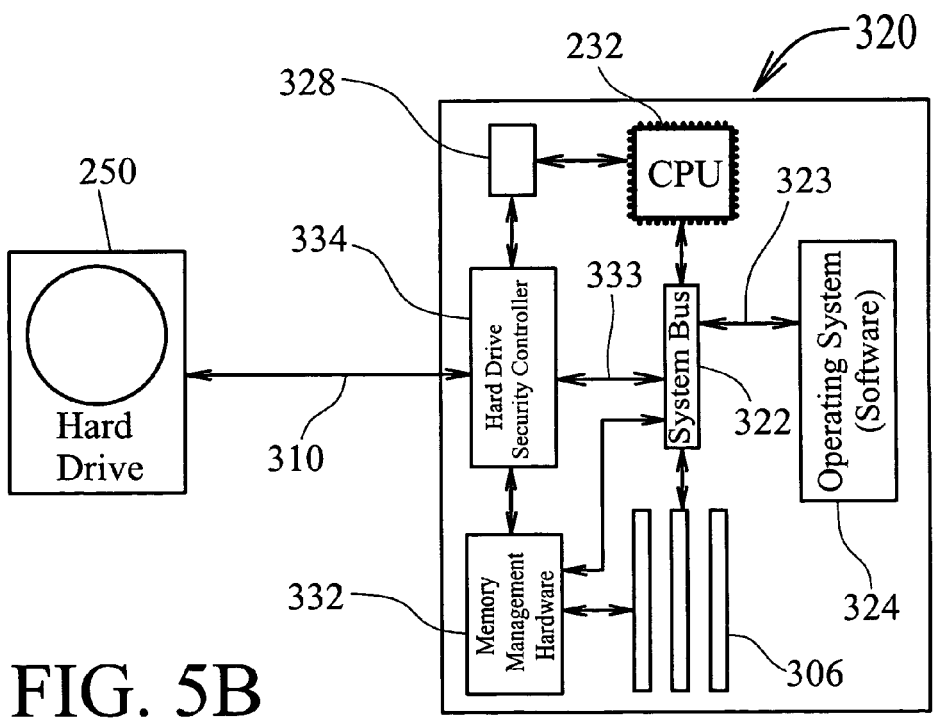

In FIGS. 5A and 5B, we show the disclosed computer security system designed into the motherboard of each system. In FIG. 5A, the entire directory based security system is done in software and motherboard 300 is essentially a prior art motherboard. In FIG. 5B, we see the other extreme where the entire directory based security system is configured in hardware and the operating system execution is essentially unchanged from prior art software configurations.

In FIG. 5A, we see computer motherboard 300, connected by hard drive cable 310 to a typical prior art hard drive 250. Motherboard 300 is also essentially prior art in this example with a hard drive controller 308 connected to cable 310 and to system bus 302 by data lines 307. As with most motherboards, system bus 302 is connected to other components, with only CPU 232 and RAM 306 shown in FIG. 5A. The entire folder security controller system is executed in software memory block 304 stored in RAM 306 through its connection 303 to system bus 302. Software 304 is shown separate from RAM 306, but in typical motherboards, can be in the same RAM 306 that operating systems and programs are stored. Software 304 can also be stored in ROM memory, or even as part of the BIOS memory for the motherboard. Security controller software 304 can also be loaded from hard drive 250 upon booting of motherboard 300 and organized as one of the operating systems lower level programs. Software 304 would provide identification of programs and their folder address on drive 250, which request access to hard drive controller 308. Software 304 would also maintain the directory structure on drive 250 and generate alias addresses for files that need them. All the security functions can be in hardware (ROM and/or BIOS and/or other hardware logic) to provide the maximum security. If the security functions operated, at least partially in software, then greater security can be implemented in a secure, lower-level operating system software component, such as, "io.sys", "config.sys", or be the lowest-level operating system component. It such software can protect itself from malicious programs by strict control over its own memory space.

In FIG. 5B, we see computer motherboard 320, connected to hard drive 250 by cable 310. Motherboard 320 is a modified design that includes a hard wired folder security system connected to system bus 322. Unlike motherboard 300, motherboard 320 implements all folder security in hardware instead of software and operating system 324 is essentially unchanged compared to prior art operating systems. This provides a more secure operating environment that a system with software components that can be corrupted. In this example, hard drive cable 310 connects to hard drive security controller 334, where controller 334 is integrated directly into the system bus 322. Controller 334 may also have other components such as, memory management hardware 332, and program folder identification hardware 328 to provide specific functions for controller 334. In this design, controller 334 includes the normal disk drive control circuits for driving hard drive 250. In many systems data lines 333 may be the only connection between controller 334 and the rest of the motherboard. However, in many instances it is advantageous to break up the work load and collect data from other components on the motherboard. A few examples of these other data and control paths are shown on motherboard 320. Folder identifier 328 can have direct access to CPU 232 and hard drive controller 334. Memory management hardware 332 can have access to RAM 306 and operating system 323 within it. Management hardware 332 can also have direct access to security controller 334 and system bus 322, and may also have access directly to the CPU and folder identifier 328. Hardware 332, can also be part of the motherboard BIOS and/or other ROM program. Data and control can thus be transferred between all the hardware systems as needed to protect the folder directory on drive 250. Folder identifier 328 and management hardware 332 help security controller 334 to identify the folder address on drive 250 of programs being executed by CPU 232. Specifically, identifier 328 and controller 332 can help determine the folder address of programs that request access to hard drive 250 for either saving, loading, listing, deleting, modifying, etc.

FIGS. 6A through 6D show a few possible "absolute" directory structures that could be generated by the disclosed folder security system. For these examples, programs are given full access to its own directory and subdirectories (folder and subfolders). In an alternative arrangement, FIGS. 7A-7D show similar programs, but arranged in a directory structure where the programs can only have full access to its folder's subdirectories. All programs in each example can load and execute any file or program in any folder on the disk drive (unless specifically marked as a restricted file or folder).

FIG. 6A shows a typical directory structure for a computer with a hard drive using a MS Windows based operating system (many folders and files not shown for reasons of space). Everything on the computer is logically collected in "My Computer" as the upper most "folder". This folder is actually a virtual folder (Alias Folder) and is not necessarily logically mapped on the hard drive as shown. For purposes of connecting to a network "My Computer" may use its "Computer Name" and "Workgroup name" to identify its directory folder for the folder security system. For example, if a network computer's name is "main" and is in workgroup "group1", then the MS Windows directory C:\WINDOWS on this "main" network computer, might look like the folder directory address: C:\Entire_Network\group1\main\C:\WINDOWS\ where "C:\Entire_Network" is your computer's "Entire Network" folder directory, "group1" is the work group name, "main" is the network computer's name, and "C:\WINDOWS\" is the directory in the network computer that is being accessed. The disclosed folder security system works just as well with network systems as it does with a single computer because the hierarchical structure for network folders is just an extension of the hierarchical structure for a single computer. This is because the security is based on confining programs to their own associated files (storage folder directory), not on stopping programs from executing. Thus a program run from a network computer or an Internet address can be executed from a protected directory, where any program within that directory folder is not allowed to write to any other folder on the protected computer storage device.

In FIG. 6A, we see a MS Windows folder directory with a root directory "HARD DRIVE (C:)" and several folders and files within this root directory. The folders "WINDOWS" and "WINDOWS BACKUP" are both within the root directory along with programs "WIN.COM", and "WINFIX.EXE" and other files and folders. To take advantage of the disclosed security system functions, this Windows program operates slightly differently than normal. The file "C:\WIN.COM" in the root directory is executed first. "C:\WIN.COM" is a small low-level program that provides basic file control and movement of information between subfolders within the root directory. "C:\WIN.COM" is a very secure program an may be restricted by the security controller from being overwritten even when requested from a file within the root directory. "C:\WIN.COM" may not have any disk drive read and write capabilities of its own, but can transfer those requests to other programs within the "C:\WINDOWS" directory. The "WINDOWS BACKUP" folder is an extra folder provide specifically for the disclosed security control system. The "WINDOWS BACKUP" folder may have restricted access where no unauthorized changes may be made to its folder, files or subdirectories. Additional restrictions can include on folder "WINDOWS BACKUP" so that only the program "WINFIX.COM" can access it. "WINFIX.COM" would be a simple program with the only purpose of reinstalling Windows operating system. The "WINDOWS BACKUP" folder may contain a complete copy of the "WINDOWS" directory (actual or compressed) so that "WINFIX.EXE" only needs to load the files in "WINDOWS BACKUP" and copy them to the "WINDOWS" folder. The Windows folder would contain essentially the Windows operating system that normal Windows OS would include. Windows OS would operate from the "WINDOWS" directory with only programs "C:\WINFIX.COM" and maybe the "C:\WIN.COM" and/or other root directory program able to modify files in the "WINDOWS" folder.

In FIG. 6B, we see a modified WINDOWS folder opened up to show its internal structure (many folders and files not shown for reasons of space). The folders, "All Users,", "Application Backup", "Application Data", and "Application Execute" are shown within the "WINDOWS" directory. The "WIN.COM" program is the only program shown in the "WINDOWS" directory, the rest of the files are not shown because they are further down on the list. The "C:\WINDOWS\WIN.COM" program in this example is similar to the "C:\WIN.COM" program shown in FIG. 6A and is only a small control program that loads and runs "C:\WINDOWS\Application Execute\WINEXE.EXE" which is the actual Windows OS. The "All Users" folder performs the same function as it does in present Windows operating systems. The "Application Backup" is a redundant backup within the "WINDOWS" directory that the program WIN.COM can access to restore lost files. Note that this not absolutely necessary since the "WINDOWS BACKUP" folder can restore everything. However, it is shown here because other programs may use this type of backup for their program applications.

The "Application Backup" folder may be made a "Non-Executable Folder" and/or a "Read-Only Folder" (which would not allow additional executable files, and/or files in general, to be written to it or allow any executable file to be run (executed) from that folder). This would provide an additional layer of protection for the "Application Backup" folder and similarly for the "WINDOWS BACKUP" folder's contents. Even if control of WIN.COM and/or WINEXE.EXE programs are lost to a malicious programs, damage to the "WINDOWS BACKUP" folder is prevented because the folder itself is designated a "Non-Executable Folder" and/or "Read-Only Folder" which the hard drive itself can refuse to write to without significant authorization from, and warnings to, the user.

In FIG. 6B, the "Application Data" folder can be used to store data for the WIN.COM program or other files. The "Application Execute" folder is used to hold the actual Windows operating system that is normally placed in the WINDOWS folder root. Here however, WINEXE.EXE is executed from the "Application Execute" folder so that all write disk access is limited to that folder. So that any malicious program that does find its way into the "Application Execute" folder can only modify that folder. The SYSTEM folder within the "Application Execute" folder can be marked as a secure folder that the folder security system will not change or add any files or folders within it without significant user involvement, such as, passwords, external device input (i.e. security device input, mouse click to confirm, keyboard confirmation, etc.), or other user authorization. Thus, folder security, prevents programs from outside the SYSTEM folder from changing it even if the C:\root directory is compromised or the WINDOWS directory the SYSTEM files can still be protected from being written to on the hard drive (or other memory storage device). The files within the SYSTEM folder however, may include the ability to change themselves, or one file within the SYSTEM folder can have the ability to modify files. Alternatively, the security system may restrict all modifications to the "WINDOWS" folder except for a particular subdirectory (i.e. folder "Application Data").

In FIG. 6B the TEMP folder can be a "restricted extension" folder, where only a particular type(s) of files are allowed. For example, temperary files that MS Windows may generate can have a particular file extension ".TEMP" and this can be the only file type that is written in the TEMP folder. Further, only certain MS Windows' program threads could be allowed to write to the TEMP folder (Protected Folder) to provide added security, so that unauthorized programs can change information within the TEMP folder even if they should get written into the TEMP folder. Notice that these types of folder restrictions are even more useful for security when the rest of the nonvolatile memory is secured according to which program thread initiates the write request.

In FIG. 6C we see the Outlook Express program "C:\Program Files\Outlook Express\msimn.exe" in its normal location within the "Outlook Express" folder. However, the "msimn.exe" program could be only a control program that then runs the actual Outlook Express program "outlooksys.exe" in the "Application Execute" folder. The "Application Execute" folder would contain the programs, files and any changeable files within it The "Outlook Express" folder can comprise folders "Application Backup", "Application Execute", "Inbox", "Outbox", "Sent" and temporary folders for running downloaded executable files that enter through an email. A simplified Internet Explorer or Netscape program could be saved in the Temporary folders Temp Run 0001, Temp Run 0002, etc. which would open and execute the needed programs and control files needed to open email attachment or programs. The Temp folders themselves can be marked as a Safe-Folder where that folder takes responsibly for all programs accessed through a program executed from in the Safe-Folder. The folder security controller would use the Temp folder (Safe-Folder) as the default folder and writing all files to it, independent of which program under the Temp folders execution tree makes the write request. For example, when "Temp Run 0001" is created it is marked by the security system as a Safe-Folder, and an email and its attachment(s) are written to the folder. The management program in the "Temp Run 0001" folder is executed by Outlook Express, and this management program reads the email and attached files and determines which programs need to be executed to view the email and attachments, and executes those programs. The Folder security system at this point identifies the "Temp Run 0001" as being the program that is taking responsibility for these other programs executed by the management program.

Thus, if one of these other programs tries to write a file to a storage drive directory other than the "Temp Run 0001" folder, it will be mapped back to the "Temp Run 0001" and placed in an alias folder. Which will be accessible by all the programs executed during the use of the "Temp Run 0001" folder. The "Inbox", "Outbox", "Sent", etc. folders can be designated as Non-Executable Folders which can store email in user files, which need to be loaded into another program for viewing or moved to another directory (i.e. Temp Run 0001) for execution.

In FIG. 6D, we see the "Application Execute" folder expanded to show the alias directory "C:\Program Files\Outlook Express\Application Execute\C:\WINDOWS\SYSTEM\" for the file SYSTRAY.EXE. SYSTRAY.EXE has been written onto the storage device by the outlooksys.exe program. The C:\WINDOWS\SYSTEM\SYSTRAY.EXE directory within the "Application Execute" folder is identical to the real address of where the outlooksys.exe program tried to write the file SYSTRAY.EXE, but was mapped to the shown alias file address (C:\Program Files\Outlook Express\Application execute\C:\WINDOWS\SYSTEM\SYSTRAY.EXE). This embedding of the original file address being saved as a folder hierarchy, is one way such information can be stored so that when the same program outlooksys.exe tries to reload the real program C:\WINDOWS\SYSTEM\SYSTRAY.EXE, it can instead load and/or execute the alias file: C:\Program Files\Outlook Express\Application Execute\C:\WINDOWS\SYSTEM\SYSTRAY.EXE.

In FIGS. 7A through 7C, we see folder directories which use the disclosed folder security system. In these folder arrangements, programs executed from a specific folder can only write to subfolders of the specific folder. For example, In FIG. 7A, the program file WIN.COM, in the WINDOWS folder, is executed from the windows folder and can only write to subfolders of the WINDOWS' folder (i.e. CONFIG, SYSTEM, etc.). By limiting write authorization to only the program's subfolders, the program itself is automatically protected by the folder security system. That is the program file cannot write onto itself or anything other file in the root folder WINDOWS. Thus, WIN.COM in FIG. 7A can actually be the MS Windows program and can be run from the WINDOWS folder and remain protected. This simplifies the folder arrangement compared to that in FIG. 6A, which requires a separate MS Windows program WINEXE.EXE, to be executed by a control program WIN.COM, to protect the operation of windows. By not allowing programs to write to their own folder (only subfolders), this means a malicious program would need to get into the "C:\" directory (root directory) to effect WIN.COM or WINFIX.EXE. If WINFIX-.EXE is placed in the root directory and made a Read-Only File, and the WINDOWS BACKUP folder is made a Read-Only Folder, then external programs can not damage the Windows backup system. The hard drive folder security protects these files and folder, requiring user authorization. Obtrusive WARNINGS can pop-up on the computer screen if any program tries to write onto the WINFIX.EXE program or to the WINDOWS BACKUP folder. Such as:
    "WARNING!!!!

The following program *[Full Program Address]* is requesting to rewrite the program WINFIX.EXE. This should never be done unless you are actually reinstalling the Microsoft Windows 98 operating system.

Do you want to WRITE-OVER the existing file WINFIX-.EXE?" YES NO (If You are NOT Reinstalling WINDOWS 98 from CD Select NO)

At startup, the WINFIX.EXE in each of the examples in FIGS. 7A-7C, can check MS Windows (WINDOWS folder) for any errors. If errors exist, or if extra files are in the WINDOWS folder, then WINFIX.EXE can load the backup files out of the Read-only folder WINDOWS BACKUP, and write them into the WINDOWS folder. Note that the folder security system does not hinder loading or executing of files in general, unless specific restrictions are applied to the program making the access request, the file being requested and/or their folders.

In FIG. 7A, the TEMP folder in the WINDOWS directory can be used to store operational files for all the programs within MS Windows. This can include files saved from programs in the SYSTEM or other subfolder of the WINDOWS folder. In order for this to occur, the program WIN.COM can be prompted by the other programs to save the files. Another alternative is to make the TEMP folder a Restricted-Folder that will only except files of a specific type and/or by specific programs in specific folders. This adds another level of security to the "TEMP" folder by restricting file type, files and folders that can write to it.

In FIG. 7B we see a folder structure for the program MS Outlook Express. The "Outlook Express" folder is a subfolder of the Program Files folder, and contains the programs and folders necessary for its operation. The program msimn.exe is the main program file for MS Outlook Express an is located in the "Outlook Express" folder. Msimn.exe is able to write to all the subfolders in the "Outlook Express" folder so that it can manage email boxes and open emails and attachments in "Safe-Folders" (i.e. Temp Run 0001, Temp Run 0002, Temp Run 0003, etc.) where any write request by programs within the email or attachment, or programs executed by the email or attachment will map back to the original Safe-Folder as an alias file.

In FIG. 7B, the "ALIAS" folder in the "Outlook Express" folder is another example of how alias files can be saved. In this case, an "ALIAS" folder is created in the same directory as the program making a restricted write access request. Then all alias files would be stored in the "ALIAS" folder. For example, if for some reason a malicious program gained control of the program "msimn.exe" in the "Outlook Express" folder it, could try to write to "C:\WINDOWS\WIN.COM" and gain control of Windows. However, the folder security system would recognize that the program "msimn.exe" in the "C:\Program Files\Outlook Express\" folder is the program making the write access request. Then because file address "C:\WINDOWS\WIN.COM" is not within a subfolder of the "C:\Program Files\Outlook Express\" folder, they folder security system would map the file "C:\WINDOWS\WIN.COM" to an alias folder where it can be retrieved by the "msimn.exe" program when needed by accessing the originally used file name "C:\WINDOWS\WIN.COM". An example of such an alias address for this alias file might be as follows:
    "C:\Progam Files\Outlook Express\ALIAS\C:\WINDOWS\WIN.COM".

Other ways of identifying the necessary parameters for the long-term memory security system, comprising: 1) the folder of the program that requested the write access, and 2) the originally requested file address. The folder containing the program information is needed so that correct alias folder is used with that particular program or folder. The original file address is needed so that when the program attempts to reload a specific file it saved, the security controller can identify that specific file from other alias files saved. Thus, the complete original file address is needed to recover the correct file.

The program file OUTFIX.EXE is located in the Outlook Express folder and has special permission to rewrite the msimn.exe file if it should become corrupted on the storage device. Special error correcting data in storage device controlled memory can be used to determine if the data within the file has been corrupted, if it has been corrupted, then OUTFIX.EXE can then have authorization to correct the problem by copying the backup msimn.exe file (not shown) in the Application Backup folder. The OUTFIX.EXE program has normal permission to write onto all the subdirectories (subfolders) in the "Outlook Express" folder. But, in this example normally cannot write to the "Outlook Express" folder directly.

In FIG. 7C we see the folder "Microsoft Office" in the "Program Files" directory. Within the microsoft Office" folder is the "Office" folder that contains all the programs used in this suite of programs. The programs "FRONTPG.EXE" (FrontPage), WINWORD.EXE" (MS Word), "wksdb.exe" (Works Database), "wksss.exe" (Works Spreadsheet), "msworks.exe" (Works Word Processor), could all be placed in their own subfolder with a master controller program in the "Office" folder. However, this is not necessary, since in this example, these programs cannot write (save, rename, cut, delete, etc.) any information to the "Office" folder (security controller limits writing files to only subfolders of programs). All these programs, however can write to the subfolders, "1003" and "Temp" (additional folders and files not shown for reasons of space). Thus, all the programs can share files by simply storing them in one of these subfolders where they can all write and load files to. Some restrictions can be used on specific files or folders to prevent problems between programs and also provide added security.

In FIG. 7C, the "Microsoft Office" folder contains a "BACKUP" folder and a "OFFFIX.EXE" program. The "OFFFIX.EXE" program would be executed to repair a damaged Office" directory and/or files, and be able to completely restore all the files in the "Office" folder by copying them from the "BACKUP" folder. The "BACKUP" folder and a "OFFFIX.EXE" program could be designated as a Read-Only Folder and File, respectfully, to protect this data. External user authentication may be required to reload and/or change information within this folder and file combination. Further, the "BACKUP" folder and a "OFFFIX.EXE" program could be made a write-once type of folder and file so there is even another level of security these folders and programs. Notice that the "BACKUP" folder can easily be placed anywhere on in the "Microsoft Office" directory (folder), since it can be loaded and copied by program "OFFFIX.EXE" because its files would be in a subdirectory of "Microsoft Office". For security, all backup folders may be made "read only" by the security controller after initial installation of the Office Program and placed in the root directory to limit its exposure to malicious programs.

Flow Charts

In FIGS. 8A through 11B, we see eight logic charts shown as examples of the logic flow chart for a folder security system. On the writing mode decision flow charts (see FIGS. 8A, 9A, 10A, 11A), we see initial logic boxes 400 and 402, decision boxes 404, 406, and 408, and ending boxes 410, 412, 414 and 420. On the loading mode decision flow charts (see FIGS. 8B, 9B, 10B, and 11B), we see initial logic boxes 450 and 452, decision boxes 454, 456 and 458, and ending boxes 460, 462 and 464. In these examples, the flow charts use folders (directory addresses) to describe the hierarchical relationship between files (data and programs) because it is a common hierarchical structure within modern computer storage devices (i.e. hard drives). The folder or directory structure itself is not what is important. What is important is the File's association with the write requesting program (and/or program's address) and the requested directory address for writing the File. With these two pieces of information associated with the File, the security system can determine whether to load the requested file, or another Alias file. For example, the next time the same Program tries to load the File from its requested address the security system can determine if an Alias File exists for the requested File. If the Program has written (saved) that File previously, that saved File will be accessed by the security system, irrespective of whether it is a Real File or an Alias File. In general, it is desirable to also provide some form of hierarchical structure for this Program/File association, but not necessary for providing security for the storage device, it is sufficient that the files written by a particular program can be kept separated from the files written by another program.

In FIGS. 8A, 9A, 10A and 11A, logic box 400 is the initiating box, which starts the flow chart logic, and can simply comprise a software program executing on the computer requesting access to a memory storage device (i.e. hard drive 114 in FIG. 2) to write and/or modify data or any other action that requests to change data on the memory storage device (write request). When a write request is initiated, box 400 sends a signal to logic box 402 activating it. Logic boxes 400 and/or 402 can comprise a hardware and/or software components (i.e. security controller 180 in FIG. 2, controllers 240 and 245 in FIG. 3, etc.) within a computer and/or memory storage device. Logic box 400 is activated when the software program executing on the computer requests to write or modify (write request) a file or folder on the memory storage device. This write request is detected by logic box 402 and box 402 determines the requesting program's directory address in non-volatile memory (long-term memory), wherever it was originally loaded from. The location of the requesting program's directory address can be nearly anywhere, such as, on the C: Drive of the computer, other computer hard drives, a network drive, another network computer, a USB drive, from an Internet location, etc. Logic box 402 need only determine if the program's directory address is located specifically on a folder within the protected memory storage device. If the requesting program is from outside the protected memory (i.e. a network drive, Internet location) the security system logic 402 may decide to not allow any writing at all, since all attempt to write will result in alias files back to the originating storage device where the write requesting program was loaded from. Alternatively, such write requests may, depending on the program's permissions, be redirected to an Alias safe-folder or other less restrictive folders on the protected memory storage device. Each of the write access flow charts use these first two logic blocks to acquire information needed for the decision boxes further in the flow charts.

Write related decision boxes 404, 406, and 408 are all yes/no decision boxes where a single condition is tested. Box 404 tests to see if the file being written or the folder it is being written to, is restricted from receiving it. If either the File or the Folder is restricted in some way from receiving write access, a "Yes" output results and the ending box 414 is activated, which cancels the write request, or can jump to ending box 410 if desired to save the file in an alias folder, depending on the user's selected preferences. If neither the File nor the Folder is restricted, box 404 outputs a "No" signal which activates decision box 406 in FIGS. 8A and 10A, and activates decision box 408 in FIGS. 9A and 11A. Decision box 406 tests to see if the File is being written to the same folder as the program making the write request. If the File is being written to the program's storage folder, box 406 produces a "Yes" output which activates ending box 412 which writes the File at the requested address. If box 406 produces a "No", then box 408 is activated. Decision box 408 test to see if the File being written is going in a subdirectory (subfolder) of the storage folder of the write requesting program. If the File is being written to a subfolder (one or more levels down from the program's folder, but still within the program's directory address) of the program's folder, then a "Yes" output results, and box 412 is activated, which writes the File to the requested address in the subfolder. If the File is to be written somewhere other than one of the program's subfolders, an output of "No" results and ending box 410 is activated in these examples, and writes an Alias File into an Alias folder somewhere on the memory storage device, and associated the File's requested storage address (real directory address including File name) and either the program that initiated the write request, and/or the folder address of the program that initiated the write request with the Alias File. Note that decision boxes 404, 406, and 408 can output to additional control boxes than those shown here and can actually go to other decision boxes for more complex control of the writing of files to the memory storage device. Also, boxes 406 and 408 can be easily combined into a single decision box as seen in FIGS. 8A and 10A, but are separated there to show that either could be used alone in the decision flow chart if desire. For example, box 408 is used alone in FIGS. 9A and 11A. Similarly, box 406 could be used alone in its own decision flow chart.

In FIGS. 8B, 9B, 10B and 11B, we see logic box 450 is the initiating box which starts the flow chart logic, and comprises simply a software program on a computer and/or a hardware component within the security device which can detect a request for access to a memory storage device (i.e. hard drive 114 in FIG. 2) to load, read, list and/or execute (read request) a file and/or folder (where no change is made to data on the storage device). When a load request is initiated, a is signal is sent to logic box 452 to activate it. Logic box 452 can comprise a hardware and/or a software component(s) (i.e. security controller 180 in FIG. 2, controllers 240 and 245 in FIG. 3, etc.) within a computer and/or memory storage device. Logic box 452 is activated when the software program executing on the computer requests to load or list (load request) the file on the memory storage device. This load request is detected by logic box 452 and box 452 determines the requesting program's "absolute" directory address in storage, wherever it is located. The location of the program's directory address can be on a C: Dive, a network drives, a USB drive, from Internet locations, etc. Logic box 452 determine specifically the program's directory address and if it is located on a folder within the protected memory storage device.

For programs originating outside the protected storage device, an address must be used for the program's location. This address can be described in a number of ways, but must be identified in a consistent way, so that the same program is identified as having the same address location each time it is accessed. This consistency is needed so that Alias Files and Alias Folders are associated the same way each time they are accessed, whether reading or writing. In this way, an alias file stored by one program, can be correctly read later by the same program. For example, an Internet address can be described using its full domain address with each file and program having a unique domain address. An Internet address can also be described using the domain's IP number plus the folder address within the domain. Both ways can work, but only one way should be used on any one computer so that the mapping of Alias Files remains the same each time that Alias File (for a specific Program) is accessed. For local networks, the same is true, and the address naming system should be applied consistently for address identification purposes. For purposes of reduced complexity, the disclosed security system could use Windows addressing conventions to uniquely identify a file no matter where it is located on the Internet or local net systems.

Files and or Folder may have specific restrictions place on them by the security system. These restrictions can take many forms, and a few are discussed in the "MODES of OPERATION" section. Under normal operation, the security system will allow nearly any File to be loaded (read) and/or executed without restriction. Even so, programs are trapped within their own directory (hierarchical position) by the "write request" security logic within the security system and function similar to that seen in FIGS. 8A, 9A, 10A, 11A, and 12. Each of the load (read) access flow charts discussed here will use these first two logic blocks 450 and 452 to acquire information needed for the decision boxes further down the flow charts.

Load (read) related decision boxes 454, 466, and 458 are all yes/no decision boxes where specific condition(s) are tested. Box 454 tests to see if the program accessing the file being loaded (or the folder it is being loaded from), is restricted from retrieving it. If the File or Folder is restricted from retrieving it, a "Yes" output results and the ending box 464 is activated, which cancels the load request, or activates other decision boxes depending on the user's selected preferences. If there is no restriction on the File or Folder, box 464 outputs a "No" signal which activates decision box 456 in FIGS. 8B and 9B, and activates decision box 458 in FIGS. 10B and 11B.

Decision box 456 tests to see if the File being loaded by the requesting program has an Alias Folder and Alias File associated with it for that specific Real File Address. If the File being loaded has both an Alias Folder address and an Alias File for that requesting program, then box 456 produces a "Yes" output, which activates ending box 462, which loads the Alias File from the Program's Alias Folder address. If the requested File does not have an Alias File in the Program's Alias Folder, then box 456 outputs a "No", which activates box 460, which loads the requested File from its real address (requested address). Alternatively, the Alias folder can be eliminated if information about the requesting program's address and requested File's address is associated with the Alias File so that it can be retrieved if it exists. This is easily done by marking an Alias File so it can be identified from the original and saving it in the requested folder directory. Such an Alias File must also include its association with the requesting program so that it can be identified as belonging to that program when being loaded. A table including this information can be used to provide these search and retrieve function to load the correct file.

Decision box 458 is very similar to decision box 456 in that both tests determine if the File being loaded has an Alias File that was previously written by the requesting program. However, box 458 specifically looks for the Alias File in the Program's folder directory. Since the Alias File is stored in the Program's folder directory it is thereby associated with that particular program making the request, but can also be associated with other programs within the same folder. The Alias File must also include retrievable information about its originally requested address (real address) so that decision box 458 can identify that particular Alias File as associated with the file being requested. This way the Alias File is associated with both the requesting program's directory address and the File's requested storage address (real folder address including File name). If the directory structure includes both the requesting program's directory address and the File's requested storage address, then all the information needed can be placed in the directory address of the File. This however can result in very long directory addresses which could cause problems. Thus, an alternate table (note that the directory structure is also stored as a table) containing all this information needed for any particular Alias File, comprising the Alias File's full absolute directory address, the Alias File's full real (requested) directory address, and the requesting program's absolute directory address. Thus, from the computers point of view, it loads a file from a real directory address, but that file can be an Alias File or a Real File, depending on whether it is associated or not associated with the file being requested. Note that decision boxes 454, 456, and 458 can output to different boxes than those shown here and can actually go to other decision boxes for more complex control of the writing of files to the memory storage device. Notice, boxes 456 and 458 can be easily used together to load Alias Files from the Program's folder, and/or from a separate Alias Folder, depending on predetermined criteria when written to storage. The flow charts in FIGS. 8A, 9A, 10A, and 11A, would have to be modified to provide this Alias File separation. For example, when writing to a restricted folder, it may be desirable to places such File write requests in a more secure Alias Folder by themselves, away from even its own access requesting program's folder.

In FIG. 12, we see a flow chart of a folder security system that could be used in systems similar to those seen in FIGS. 1B, 2, 3, 4, 5A, 5B, 6A-D and 7A-C. Additional decision boxes are placed in this flowchart to show that many different modes and functions can be added to the basic flow charts seen in FIGS. 8A-11B. In FIG. 12, operation of the folders security system starts when in box 500, a "PROGRAM" makes a request to save (write access) a "FILE" to a specific "Save Folder". The term "save" is used here to mean any memory storage access where data on the storage device is changed in any way. Then in box 502, the folder security controller (i.e. controller 180 in FIG. 1B) captures the absolute folder address of the "PROGRAM" which actually made the request to save the "FILE". This step is shown more clearly in FIG. 2 where controller 180 gets memory address 164 of the PROGRAM's request to save the "FILE" and uses that address to look up the PROGRAM's absolute folder address in program listing 162 on the storage device. The address information (i.e. listing 168) is then used in decision boxes 506, and 508 to determine which path to take. Decision boxes 504, 508, 510, 512, and 516 may be decided without the need for the PROGRAM's folder address information. Decision box 508 may or may not need the PROGRAM's address information depending on how authorization to save in a folder is stored on the storage device. If the authorization information is stored in the Save Folder, the PROGRAM's folder address is not needed. However, if authorization information is stored in the PROGRAM's folder then the PROGRAM's folder address would be needed. The first decision box is box 504, which checks to see if the folder being saved to is restricted in any way. Box 504 can have other logical paths that cancel the save request entirely if the proper criteria is met. In this example box 504 checks to see if the "Save Folder" has a special restriction on saving. If it does, then one goes to box 514 and the FILE is saved in an Alias Directory, that is preferably in the PROGRAM's own folder or subfolder. If the "Save Folder" is not restricted, they system then goes to box 506 to compare it to the "PROGRAM's Folder" to see if the "Save Folder" address is within, or is the same as, the "PROGRAM's Folder" address. If the "FILE" being saved is in the "PROGRAM's Folder" then the system goes to box 520 and writes the "FILE" in the "Save Folder". If the "Save Folder" is outside the "PROGRAM's Folder" then the system goes to box 508 to see if the PROGRAM is authorized to save in that folder. If it is authorized then the system goes to box 522 and writes the "FILE" into the "Save Folder". If it is not authorized then the system goes to box 510. In box 510 the "Save Folder" is checked to see if it is a Non-Executable type of folder. If it is a Non-Executable folder and the FILE being saved is a Non-Executable file, then the system goes to box 522 and saves the FILE in the "Save Folder". If the Save Folder or the FILE is not Non-Executable, then the system goes to box 512. In box 512 the "Save Folder" is checked to see if it is marked as a "Write-once" folder. If it is, then the system goes to box 516 and checks to see if the FILE already exists. If the FILE exists then the "Save Request" is canceled in box 524. If the FILE does not exist in the "Save Folder", then it is saved in the "Save Folder" in box 522. If the "Save Folder" is not a "Write-Once" folder the system continues on to box 514, where the FILE is saved in an "Alias Directory" within the PROGRAM's own folder or subfolder. More decision boxes could have been used to provide additional types, or modes, of folder operations, but this example gives the reader a good idea of the types of logic schematics that are possible. Other possible decision modes are discussed in the section "MODES of OPERATION".

In FIGS. 13 and 14, we see a security system 620 connected between computer 600 and long-term storage device 650 (i.e. hard drive). Computer 600 and hard drive 650 can be standard present day systems. Hard drive 650 has a standard construction, with a drive controller circuit board 654 that uses a buffer memory 656 to allow delayed reading an writing to hard disc platters 658. No modifications are needed to hard drive 650 and it stores files as it would on any other computer system. The computer system comprises a ROM BIOS 601, a central processing unit 602, an ATA hard drive controller 604, a system bus 606, and a random access memory 608. More components are used in a real computer, but these suffice for our discussion.

In FIG. 13, we see security system 620 connected between computer 600 and hard drive 650, with data designed to pass through the security system as it moves to and from hard drive 650 and computer 600. Data lines 648 transport data to and from security system 620 and computer 600, while data lines 652 transport file data to and from security system 620 and hard drive 650. In some designs all the data needed by the security system can be sent through standard ATA data lines 648, but in this design, some security data is collected directly from CPU 602 and system bus 606. Data lines 610, 612 and 614 can transport data to and from CPU 602, system bus 606, or other components on the computer. Generally data lines 610, 612 and 614 will be one-way, transmitting data from the computer to capture circuits 622 and 624. Circuit 622 is designed to determine the identity of the Program that initiated access (requested access) to hard drive 650. Circuit 622 may also determine the directory address of the program through control circuit 630 and secure storage 626. Circuit 624 is designed to identify the File being requested by the Program.

Secure data can be stored in secure storage 626 during file loading or operation, can be used by logic box 630 to help establish and to double check directory address information on the Program and Requested File coming from circuits 622 and 624. Memory 626 can comprise a USB microdrive that would plug into an empty USB port on Computer system 600.

Such a microdrive can also include an Encryption Certificate to provide further security for hard drive 650 by encrypting everything stored on the hard drive. In this case, the computer would use the USB Microdrive, with its encryption key, by inserting it into a USB port to unlock the hard drive and allow the computer to operate. A simple password encryption could also be used to prevent any other system other than the disclosed security system from writing directly to the hard-drive. The encryption can assure that malicious programs can not take back door routes to hack the DASS system components stored on the hard drive. Storage memory 626 may also store call tables for situations where a first application calls a second application to request access to hard drive 650. In such a case, it may be desirable to identify the first application as the access requesting program, even though the second (or third) application actually requests the hard drive access. This way applications can be associated not only with the requesting program, but also programs driving the requesting program. In most cases, applications will call subroutines within Windows OS (in RAM 608), Interrupt Service Requests and/or motherboard BIOS 601 functions to access the hard drive. These subroutines have known locations and logic block 622 can capture the program that initiates (calls) these subroutines to identify the actual program making the request to access hard drive 650. In this way, logic system 622 identifies the original application that requested access through the BIOS and Windows to access the File. In these cases, actual access requests to those locations in the BIOS or Window's routines can be considered the access request and logic 622 would capture the identity of the initiating program. Along with this information, logic block 624 captures the full FILE Address that the Program requested (Requested File Address or Real File Address). Both logic blocks 622 and 624 send their information to logic block 630, which compares the program's storage address with the Files requested address location and determines if the two are associated with each other. An association exists if the FILE Address is within the Requesting Program's folder address (Program and File have the same directory on hard drive 650), or if association tags marking the Program and/or the File as being associated to the same group. The comparing circuit 630 outputs either an association between the Program and the Requested File, or the lack of that association. The logic path going to circuit 632 if they are associated, and circuit 634 if they are not associated.

If the Requested File is associated with the Program, then the logic in box 632 determines if the Requested File exists on hard drive 650 at the requested address. If the request was to "write" the File, then logic circuits 635, 636 and 643 activate activates security controller 640 to write the Requested File to hard drive 650. If the requested access was to "read" the Requested File, and the Requested File does not exist at the requested directory address, then logic circuit 635 gives an error, denying the access request. If the Requested File does exist at the requested directory address, then logic circuit 636 sends a signal through circuits 644 and controller 640 to read the File from hard drive 650.

If the Requested File is not associated with the Program, then the security system in box 634 determines if an Alias File exists on hard drive 650 for that particular Program, Requested File, and the requested address. If no such Alias File exists, then the logic moves to circuit 637 where the system reads the Requested File if access was for reading (circuit 644), or writes the Alias File if access was for writing (645). If the Alias File exists, then the logic moves to circuit 638 where the system reads the Alias File if access was for reading (circuit 646), or writes over the existing Alias File if access was for writing (circuit 645). Signals are sent to security controller 640 to perform the correct storage of the File onto hard drive 650.

In a real world design, security system 620 can be combined on a computer mother board 600 to provide a ergonomic system that connects to hard drive 650 through a standard IDE cable 652. In this way, it is easy to allow the security system access to such information as the Selector Information, Page Directory Table, Page Table, Page Frame, Call Tables, Descriptor Table, Interrupt Vector Table (IVT), Stack, Heap, Logical addresses, Linear addresses, Physical addresses, virtual addresses, alias addresses and/or other memory allocation and program information. Secure storage 626 can store this information about programs and file as the files are read and written to hard drive 650. In most cases a software interrupt request will be used to execute a interrupt service routine (ISR) and initiate access to hard drive 650. If there is a conflict between the information on the computer and information on storage 626, the security system can signal an error. Thus, security for the system boils down to how secure RAM memory allocation is and how secure Virtual Memory allocation is. Since virtual memory would normally be stored on the hard drive itself, the security system can have complete control over this also. In general, memory allocation can be handled by the BIOS, Operating system, and/or CPU, along with various protected tables, so that it cannot be circumvented. However, programs can still cause violations (page fault, stack overflow, General Protection Faults, etc.), but generally these will only cause that program to shut down, which in the case of the disclosed security system merely removes the offending program from operation. And once the program stops executing (for computer systems with the disclosed storage security) the program no longer has influence over the computer system. Programs are trapped within their own associated group (folder) on the hard drive, and restricted from modifying the start up menu (in Windows OS) without specific authorization.

In FIG. 14, we see a flow chart of a Security System 621, which performs essentially the same function as Security System 620, but with a slightly different logic pattern. These Security systems show the simplest logic patterns, and many other decision boxes can be added to the flow chart to obtain additional function and modes (see "MODES of OPERATION" section). Security System 621 is shown here as one of the many alternate configurations for the disclosed security system for mapping a "Real FILE Access Request" (read or write) to an Absolute File Address (either a Real FILE Address (FILE) or to an alternate Alias File Address (Alias File)).

In FIG. 14, security system 621 is logically connected to computer system 600 by communication lines 610, 612 and/or 614. One or more of these lines can provide critical data to the security controller to determine whether an alias file or real file should be accessed. Normally, most or all of the information would be transferred over one or more of the I/O bus lines 612 and 614. However, a direct connection through line 610 can be used to connect directly to CPU 602. Line 610 allows memory address information to be directly gather from the CPU. In this way, security system 621 can directly and securely keep track of system memory allocation for comparison with the memory allocation table(s) kept by computer system 600. If their is a difference between these two memory allocation tables, the security system can use its own secure memory allocation table, or use error correction control logic to decide on a correct course of action, or simply signal an error and shut down the offending program. The security system's memory allocation table can be stored in secure storage 626 on the security device itself or at another location. Storage 626 can be internal memory storage or a removable memory device such as a USB Flash memory stick or card. If a memory card or stick is used, it may include a security CERT to provide an access key and/or encryption security for hard drive 650 at the same time. Capture Identity box 622 can send collected allocation table information directly to memory storage 626 or send it through additional logic, such as, logic box 660. Capture identity box 624 is designed to watch system bus operations and detect a request for access to hard drive 650, and capture the Real FILE Address of the file being accessed. Information from both identity boxes 622 and 624 is sent to decision box 660, so that box 660 can produce information that decision boxes 670, 662, 664 and 676 need to correctly determine their course of action.

Decision box 660 can provide several functions, comprising retrieving, sending and storing data between identity capture boxes 622 and 624, secure storage 626 and/or data lines 648. Box 660 uses these information components to provide specific information for decision boxes 662, 664, 670, and 676, so that, security system 621 can provide the correct response to the access request. This information is shown graphically as transferred through data paths 672 and 674. In an actual system, boxes 662, 664, 670, and 676 could simply check "data locations" in storage 626, which are updated by decision box 660. These "data locations" would contain the information it needs to make its decision(s). Box 660 can keep track of all data going to hard drive 650 through data lines 648. Thus, when specific file data information is observed on data lines 648, along with a specific Program Requesting Access, and a specific Requested File Address, security system 621 can compare this with data on hard drive 650 and/or storage 626, to determine what action should be taken.

In FIG. 14, logic box 660 sends control to decision box 670 after it has finished processing the access request. Decision box 670 simply determines whether a read or write request was made by the accessing program. Often this information can be determined by the software interrupt that was used by the application. Depending on which function is being accessed, box 670 will send control to either box 662 or 664. For "Read Requests" (load, list, etc.) box 670 sends control to decision box 662. For "Write Requests" (save, save as, rename, delete, etc.) box 670 sends control to decision box 664. This effectively separates the security system logic into two separate paths, on for "Read Requests" and one for "Write Requests".

For "Read Requests", decision box 662 determines if an Alias File exists for the specific FILE being accessed and the specific Program making the "read Request". To determine this, directory information on hard drive 650, or a copy of this information in Secure Storage 626, is accessed, and box 662 determines if that specific Program has an Alias File for that specific "Real" FILE. In no Alias File exists, then box 662 sends control to logic box 644, which tells security controller 640 that it should "read" the requested "Real" FILE. If an Alias File exists for the requested FILE and Program, then box 662 sends control to logic box 646, which tells security controller 640 that it should "read" the Alias File corresponding to the requested FILE and Program.

For "Write Requests", decision box 664 determines if an Alias File exists for the specific FILE being accessed and the specific Program making the "Write Request". To determine this, directory information on hard drive 650, or a copy of this information in Secure Storage 626, is accessed, and box 664 determines if that specific Program has an Alias File for that specific FILE ("Real" File) that was requested by the Program. If the Alias File exists, then box 664 sends control to logic box 645, which tells security controller 640 that it should "write" to that Alias File which corresponds to the requested FILE and Program. If the Alias File does not exists for that specific FILE and Program combination, then box 664 sends control to logic box 676. Logic box 676 then determines if the requested FILE is associated with the Program, and/or that Program's Associated Group, making the access request. If the FILE is associated with the Requesting Program and/or its Associated Group, then box 676 sends control to logic box 643, which instructs security controller 640 to access the FILE at the requested FILE Address. If the FILE is not associated with the Program (requested address is outside the Program's Associated Group), then control is transferred to logic box 645, which tells security controller 640 that it should "write" (save, save as, etc.) to an Alias File for that specific FILE and Requesting Program combination. The Alias File is marked in some way so that it is associated with the access Requesting Program and/or the Program's Associated Group. Association between the Program and the Alias File can take many forms. For example, the association may comprise simply writing the Alias File in the same folder (or one of its subfolders-subdirectories) as the Requesting Program. Another way to provide association between the Program and the Alias File is to mark the Alias File, in some way, as it is written so that it is associated with the Program that originally wrote it. A data file within the Alias File itself, or a table containing the association between files and programs can be used. The Alias File may also be marked as being associated with other programs if desired, or marked as associated with both programs and folders depending on the desired structure and security for that program group.

Security controller 640 takes all the information coming to it from logic boxes 643, 644, 645, 646, and data lines 648 to determine what course of action to take. Controller 640 may also access data within storage 626 or hard drive 650 if needed to assure that there is not a security error from bad information. Security Controller 640, maintains complete control over information on hard drive 650 so that information on drive 650 is secure. Note that logic boxes 643, 644, 645, 646 performed the same function they do in FIG. 13. These boxes simple provide the proper procedure for accessing information in that particular way. Security controller 640 receives these instructions from boxes 643, 644, 645, 646 and further combines them with data from the computer bus 606 and/or ATA Controller 604 and sends and receives information over cable 652 connected to hard drive 650.

The Security Systems in FIGS. 13 and 14 are shown completely separated from both the Computer system 600 and hard drive 650. Many other alternate configurations are possible and as we will see next FIG. 15, the entire DASS system can be programmed into software.

In FIG. 15, we see an alternate security system program 680 (DASS—Dynamic Associative Storage Security) done completely in software. In this configuration, CPU 602 can preform all the logic and security control functions shown within security systems 680. The logic in security program 680 provides identical functions as the hardware logic and/or software logic in security system 621 (see FIG. 14). Logic for Security Program 680 is shown in FIG. 15 being accomplished completely in software either in BIOS 701, RAM 608 and/or secure storage 682. Additional memory locations can also be added to the ones shown here. Besides the basic logic shown in security program 680, the security program may also handling additional logic for controlling modes of operation for folders and files (see MODES of OPERATION) and other functions for the security system. Most or all of these controls can be programmed into ROM BIOS 701 because of the relative simplicity of the mapping scheme for real and alias files, and the relative availability of memory allocation information on modern computer systems. Security Program 680 may also have additional controls programmed into the operating system running on computer system 700. BIOS 701 can contain all the program logic seen within security system program 680, though some modifications may be needed to for present day operating systems to properly implement all their operational characteristics. For future operating systems, actions that violate the security system's most basic security protocols would be rewritten so that the security system 680 would not need exceptions to its rules for misbehaved operating systems. BIOS 701 can also contain software for controlling memory allocation tables to assure that memory allocation is not violated by any program and to also track the transfer of a program from one memory space in RAM and/or Virtual Memory to another. The BIOS can also contain programs to manage file allocation tables (FAT32, VFAT, MFT, CDFS, NTFS, etc.) at the lowest level, so that no other programs can tamper with information stored on these files stored on hard drive 650. BIOS 701 may also contain the interrupts service requests (ISR) to detect hard drive access requests for managing the mapping of file addresses from a Real File address to an Alias File address, before the actual file data is transferred to ATA Controller 604 and ultimately to hard drive 650 over data lines 648. Thus, security system program 680 can operate as a hidden logical layer between present interrupt requests that access the hard drive and ATA controller 604.

Programs and applications normally will not need to be aware of security program 680 residing logically between them and ATA controller 604. Even the computer's operating system can remain separated from security program 680, with the security system filtering all access requests before they get to the operating system and/or ATA Controller 604. Generally, the security system would have a portion of itself operating in RAM memory 608 (Windows XP presently loads BIOS programs into RAM memory for execution). But eventually a full hardware and/or ROM BIOS motherboard solution can transition into the market place to provide total file directory security. Even with a portion of security system 680 operating as software within RAM 608, present computer operating systems handle memory allocation information very securely with very little chance for viruses or other malicious programs to take control of the system at this level. Adding the DASS system to the hard drive security makes it even less likely for a malicious program to subvert the system because these programs can no longer corrupt important directories and files on hard drive 650.

In FIG. 16A, we see a Venn diagram of one way Alias Directories can be organized by the disclosed security system. The area inside Absolute Directory ring 800, represents all files and directories on a particular long-term storage device (hard drive) and comprises "Real", "Alias" and "Phantom" Files and Folders on that storage device. The area inside Real Files ring 802, represents all "Real" Files on the hard drive. Real Files 802 are a subset of Absolute Files within ring 800 with the real files contained entirely within Absolute Files 800. The area within Absolute Directory 800, but outside Real Files ring 802, represent the Alias Files 826 presently on the hard drive. During operation of the computer system containing the hard drive, both Alias Files 826 and Real Files 802 are generally changing, since the files are being written and deleted from the drive on a regular basis. In this Venn diagram the area of Alias Files 826 is considerably larger than the Real Files 802. In a real computer system, the number of Alias files will generally be much less than the number of Real files for well behaved programs. However, viruses and other malicious programs may begin creating large numbers of Alias Files causing Alias files to outnumber Real files. The security system for the hard drive being protected, can easily detect this large increase in Alias Files and flag the program as possibly being a malicious program. Other suspicious activity can also be easily detected, such as, a large number of attempts to delete or modify files not associated with that program, and/or creation of Alias Files of specific important programs (i.e. System Files, Registry Files). For the disclosed security system these activities is easily detected because the security system allows malicious programs to be executed to see what they will "try" to do, not some pattern of machine code commands. This allows identification of specific behavior independent of how the malicious program may be programmed to do these activities. Thus the security system focuses on the end result of the malicious program activity and not the actual program structure. This is only possible with the disclosed security system, because it allows malicious programs to be executed.

In FIG. 16A, we also see three Alias Directories rings 810, 804, 808 and for Programs A, B, and C, respectfully. The area within these rings represent the files that are accessible to their respective program. The Alias Directories discussed here could also be called "Program Directories" since each program, and/or program group, would have its own unique Alias Directory. For example, the area within Alias Directory ring 810 represents all the programs accessible by Program A. Files outside ring 810 cannot be accessed (read, written and/or listed) by Program A in this particular example. As always exceptions may be granted to specific programs that allow full access to the Absolute Directory 800. Alias Directory 810 comprises both Real Files and Alias Files. The Real Files for directory 810 are represented by the area formed by the intersection of ring 810 and ring 802. The Alias Files for directory 810 are represented by area 822, which is both within ring 810 and outside Real File ring 802. Real Files not accessible by directory 810 are represented by area 814, which are within ring 802 and outside ring 810. Similarly, Alias Directory 804 represents all the programs accessible by Program B. Files outside ring 804 cannot be accessed (read, written and/or listed) by Program B in this particular example. Alias Directory 804 comprises both Real Files and Alias Files. The Real Files for directory 804 are represented by the area formed by the intersection of ring 804 and Real File ring 802. The Alias Files for directory 804 are represented by area 818, which is both within ring 804 and outside ring 802. Real Files not accessible by directory 804 are represented by area 824, which are within ring 802 and outside ring 804. Many other Alias Directories can exist on the hard drive that are not shown in FIG. 16A.

In FIG. 16A, three specialty groups 806, 808 and 812 are also shown. These groups are examples of a few specific Modes of Operation and how they might be organized on a hard drive. There are many other specialty groupings that are possible, but these three should be sufficient to disclose what is possible. A more comprehensive list of possible modes can be found in the "MODES of OPERATION" section.

Restricted Real Files 812, represents a subset of all Real Files 802, and are protected and/or Restricted under a special Modes of Operation by the security system. Restricted Files 812, may be accessed only by a predetermined set of Programs and/or Programs within specific directories. This mode is generally reserved for very important files and programs that the user does not want changed and/or copied.

Restricted Alias Files 806, represents files that are not accessible to Program B because they are copies of a restricted file (such as those within ring 812) or other reason. This special type of file may not even include the full file, but only the File Name and other security information to allow the security system to identify malicious behavior.

Alias Directory 808, represents the files accessible to an Alias Program C. Notice that directory 808 is entirely outside the set of Real Files 802, thus Program C must be an Alias File. This does not violate the integrity of the security system, since the only way directory 808 can be created is by Program B (or other program in its associated group) trying to write it to an non-associated directory on the hard drive. Thus, Program C's directory 808 is even more restricted than Program B's directory 804 and cannot even access any real files in ring 802. Normally, even Alias Files are allowed access (read only) to Real Files 802, but in this example, Program C (Alias directory 808) is completely restricted to its own folder within Alias Files 818 of Program B. If Program C were allowed normal access by the security system, Real files accessible to directory 804 could also be accessible to Program C, or could include access to all Real Files in 802 if no Alias Files of its own had been created.

Looking at Alias Directory 810 for Program A, we see Alias Files 822 included in directory 810 and Real Files 814 excluded from directory 810. This is normal for the security system, since programs that have an Alias File for requested Real File no longer can access the Real File. Thus, Real Files 814 can be the portion of all Real Files 802 that Program A has attempted to overwrite but instead created an Alias File in area 822. Area 822 will generally include a greater number of Alias files than the number of Real Files in area 814 that have been restricted from access by Program A. This is because, Program A can write to non-associated directories with file names that do not already exist. This simply creates a new Alias File without stopping access to a Real File with the same file name. A similar situation exists for Alias Directory 804 for Program B, where Real Files in area 824 have been excluded from access by Program B, because they have corresponding Alias Files in Alias File area 818.

Depending on how the programs are related to each other many combinations of Modes and permissions are possible. In the example in FIG. 16A, we see that Alias Directories 804 and 810 overlap creating three distinct types of Files represented by the areas 816, 820 and 828. Real Files in area 816 within the intersection of rings 802, 804 and 810 and the exclusion of restricted files 812, represent Real Files that both Programs A and B can still access. The Alias File area 820, represents Alias Files that both Programs A and B can access. This can be accomplished by placing Programs A and B in the same directory (or program group), and/or by providing a common Alias Folder for certain Alias Files. The Real File area 828, represents Real Files that neither Program A nor B can access. This restricted access to area 828 can be the result of many reasons, such as, both Programs have written Alias Files for those Real Files, and/or the files have been restricted in some other way from being accessed by both Programs A and B.

In FIG. 16A, all access permissions (read, write and list permissions) are shown by the Alias Directories 804, 808, and 810. Normally, the security system greatly restricts "write" permissions compared to "read" permissions so, a Venn diagram of "write" access for Programs A, B and C would look quite different than they do in FIG. 16A, since "read" access is considerably less constrained than "write" access (see FIG. 16B).

In FIG. 16B, we see a Venn diagram for the same long-term storage device (hard drive) seen in FIG. 16A. Again, the file areas for Programs A, B, and C are shown graphically. However, in FIG. 16B, only the "write" access for Programs A, B and C are shown by areas 810w, 804w, and 808w, respectfully. The disclosed security system provides different directories for each program, and also allows different Program Directories for each "read" and "write" function as well. Both the Real and/or Alias Directory files can be different, depending on the "read" or "write" function. What this means is that the directory structure changes dynamically, depending on three components: 1) the Program which is trying to access the FILE, 2) whether that Program is trying to "read" or "write" to that FILE, and 3) the where the FILE being access is located on the hard drive. Further dependencies may be placed on the type of access requested, for example, a "Save As" may have a different "Program Directory (different "Alias File Directory" and/or different accessible "Real File Directory") than a "Save" command even with all other components the same. Similarly, a "List" (directory listing) and/or "run" (execute) commands may provide a different "Program Directory" (both Real and/or Alias) than a "Load" command, etc.

In FIG. 16B, Real File 802 and Absolute Directory 800 are the same as in FIG. 16A. These groups of files represent files actually exist on the long-term storage device, and therefore only change when files are added or removed from them. Similarly, Restricted Real Files 812 and Restricted Alias Files 806 generally do not become unrestricted for "write" functions. Thus, File areas 812 and 806 remain unchanged in this example. Program Directories 810w, 804w, and 808w for Programs A, B, and C, respectfully, however, have changed significantly.

For Program A, Program Directory 810w comprises Alias Files 822w and Real Files 830w. Alias files 822w being the files within Program directory 810w which are outside Real File area 802. Real Files 830w being the Files within Program Directory 810w which are inside Real File area 802. Notice that Program Directory 810w no longer includes the majority of Real Files 802. This is because, during a "write" request, only those Real Files associated with Program A can be directly written as a Real file. All other "write" requests end up being written as Alias Files in this example. For example, Real File area 830w may comprise the directory and subdirectories where Program A is stored on the long-term storage device. Files that are attempted to be written outside these directories end up creating new Alias Files in Alias File area 822w. Besides the reduced scope of Real Files 802 that are available to be written by Program A, the available Alias Files may also be reduced. Alias Files 834w, which where part of Program Directory 810 in FIG. 16A, are no longer included in Alias Files 822w of Program Directory 810w. Alias Files 834w can be files that, for some reason are not allowed to be written to. For example, Alias Files 834w may be "Protected Files" that Program A, within the program group creating Directory 810w, is not allowed to write onto, or the files may be in a "write once" folder that does not allow rewriting. Also notice that Alias Files 818w, within Program Directory 804w for Program B, also is missing Alias Files 836w, which were in Program Directory 804 in FIG. 16A. Program Directory 808w, for Program C, is also missing some alias files that where in Program Directory 808 in FIG. 16A, but are not available for "write" requests in FIG. 16B.

In FIG. 16B, the overlap of files accessible by Program A and Program B is shown by areas 816w for Real Files and 820w for Alias Files. Real Files 816w are "Real" files that both Programs A and B can write to. There are many types of files that might comprise "Real" files 816w, such as: 1) files 816w could be located in the same folder directory as Programs A and B which would allow them to share files within their directory, 2) files 816w could be special files or registers that both programs use, 3) files 816w could be files that allow access by programs from multiple programs and/or program groups, 4) files 816w could be files written by a fourth program, which is in the same program group as Programs A and B (and C), where Programs A and B are allowed access to the files written by the fourth program, 5) etc. In a similarly way, Alias Files 820w are "write" accessible by both Programs A and B. There are many types of files that might comprise "Alias" files 820w, such as: 1) files 820w could be located in the same Alias folder directory for both Programs A and B which would allow them to share files within that directory, 2) files 820w could be files that allow access by programs from multiple programs and/or program groups, 3) files 820w could be files written by a fourth program, which is in the same program group as Programs A and B (and C), where Programs A and B are allowed access to the files written by the fourth program, 4) etc. Finally, Real Files 828w, which are not write" accessible by either Programs A, B, or C, are shown here to distinguish them from Restricted and Protected Mode Files in are 812, to clarify that other types of files may not have "write" access privileges. Generally, Real Files 828w will be files that other programs have write privileges to, but can also be files that are in Locked-File Mode, Read-Only Mode, other file mode.

The Registry

One portion of modern operating systems that may require modification is the controller program that modifies the Registry Files in Windows operating systems. This controller program can be replaced with a BIOS loaded program to provide security for the Registry. Since the Registry is essentially a hierarchical arranged storage table, it can be protected by the same Dynamic Associative Security technology presented here to protect long-term storage devices. The Registry is essentially a long-term storage device (storing data within a set of files). The difference would be that, for the Registry, individual data entries within the Registry would be protected instead of individual files within a directory system. The protection method would be substantially the same, with a Registry Security System identifying the specific program requesting access to the Registry and identifying the specific entry within the Registry that is being updated or created. Such a Registry Security System would only allow a program to modifying data within the portion of the Registry that is associated with itself (that is, data originally recorded in the Registry by the program or during the program's installation). Additional security may be applied when creating a new program's entry in the Registry so that the user may have to give their approval before additional program's can have access to the Registry. Once created, however, the program can be allowed to update and modify its own data without further intervention by the user. This limits the number of decisions the user must make during normal operation of their computer.

OPERATIONAL DESCRIPTION

FIGS. 1B, 2, 3, 4, 5A, 5B, 6D, 8A Through 11B

Programs running on a computer system using the disclosed folder security system should follow a few operational protocols to insure that their software does not have any problem operating with the folder security controller. The disclosed security system does not prevent any program from loading or executing any file or program unless other folder restrictions are added or alias files which take priority over the original files. Generally any program can load and run any other program on the system. Only during requests for saving a file or program does it become important to make sure the program follows a few simple rules. If a program tries to write files outside its own directory, the security controller will write the file in an alias folder within its directory or somewhere else in association with that program and/or its folder. The program will be able to use this alias file just like it was the real thing. The only problem comes when another program needs to access this same alias program. Thus as a general rule, programs that need to share files with other programs should be set up at the time the programs are installed. The user then has the option to prevent saving in the folder, in which case the file will be written as an alias file which that program can load again during use. Another protocol is that multiple programs that write and load a particular file should be all located in the same folder or have a master program that can control the saving and loading for all the programs.

MODES OF OPERATION

The disclosed security system works by setting up specific rules, or modes, for each file, folder and/or subfolder in a hierarchically arranged storage device (i.e. hard drive, CD-RW, etc.) Many of these modes are based on the security system being able to determine which program (or program thread) is making a request to access the storage device. All of these modes, except for "Locked-Folders" and "Locked-Files" can write and load files with and/or without user intervention. The Locked-Folder and Locked-Files always requires external user authorization to modify. The following modes, are examples of some of the possible modes that the disclosed folder security system could use. Note that these folder and file modes are separate from other filing functions and do not necessarily effect Windows directory and File permissions or other security functions presently used on Windows operating systems.

1) Write-Restricted Mode—Generally all folders are write-restricted under the disclosed folder security system (unless other parameters are set), so that only programs executed from within a specific folder can write to non-alias files in that specific folder and/or its subfolders. Thus, folders using this mode can only be written to (saved, modified, renamed, etc.) by programs stored within that folder directory. Even if a program within a write-restricted folder tries to write the file in a different folder it cannot (unless it is given authorization). Instead, attempts to write a file outside the program's own folder results in alias folder and/or file being written within the program's write-restricted folder, where the alias folder is associated with the program's folder directory address or program itself. This general restriction can be modified, for example, by one or more additional modes listed below. This type of folder may also require external authorization to access (external authorization, key access, biometrics, etc.).

2) Load-Restricted Mode—Generally all folders allow "load access" (load, list, run, etc.) from any other folder under the disclosed folder security system. However, a Load-Restricted folder may restrict loading to specific programs and/or specific folders that are allowed to load the files. Specific restrictions can also be made, such as, only restricting loading of files, but can allow listing of file names within the folder. This type of folder may also require external authorization to access (external authorization, key access, biometrics, etc.).

3) Restricted-Folder Mode—A folder that restricts files and/or subfolders within it from being loaded, updated, written, deleted and/or otherwise changed. Where only programs executed from within specific folder(s) are allowed access to the restricted folder and/or its files. Restriction may be base on a list of authorized folder(s), and/or a list of unauthorized folder(s). This type of folder may also require external authorization to access.

4) Protected-Folder Mode—A folder that protects files and/or subfolders within it from being loaded, updated, written, deleted and/or otherwise changed. Where only specific executable file(s) (programs) can have access to the protected folder and the files within it. Access may be base on a list of authorized file(s) (allow), and/or a list of unauthorized folder(s) (disallow). This type of folder may also require external authorization to access.

5) Locked-Folder Mode—Marked folders that restrict the files and/or subfolders within it from being updated (overwritten), saved, renamed, deleted and/or otherwise changed without special authorization. Even programs executed from within the Locked-Folder can be denied access or permissions to the folder. Folders under this mode may also be a restricted or protected folder.

6) Restricted-File Mode—Marked files that are restricted from being open and/or written to, except by programs executed from specific authorized folders. Files can be marked by file extension or other means to denote the folder locations that may access it. This type of marked file may also require external authorization to access.

7) Protected-File Mode—Marked files that are protected from being open and/or written to, except by specific authorized program files. This type of marked file may also require external authorization to access.

8) Locked-File Mode—Marked files that are restricted from being updated (overwritten), saved, renamed, deleted and/or otherwise changed without special authorization. Even programs executed from their own folder can be denied access or permissions to the Locked-file. Files marked for this mode can also be a restricted or protected file.

9) Restricted-Extension Folder Mode—A folders that accepts only certain file type(s), or file extensions, to be written in it, or its subfolders. Files are also restricted from being renamed to a different file type, or file extension, that are not accepted by the folder. This type of folder may also restrict moving, or copying, the file to another location (changing its directory address). This type of folder may also require external authorization to access.

10) Non-Executable Folder Mode—A type of "Restricted-Extension Folder", where only non-executable files are writeable to the folder and/or modifiable within the folder. Directly executable program files such as those with extensions: .COM, .EXE, SYS, .BAT, .DLL, HTML, etc. are not allowed to be written to this type of folder, renamed to those extensions and/or executed from this type of folder even if such a file should somehow get in the folder. Other interpreted programs may be allowed (but do not have to be allowed), which are actually executed by a different program stored in a different folder on the storage device. The normal "My Documents" folder in the MS Windows environment is an example of a folder that would benefit from being a Non-Executable Folder, by eliminating the chance that a program could execute from "My Documents" folder and delete files. Note that personal files such as word processor documents and spreadsheets can save and update to this type of directory without restriction, except to modify an existing document it is customary to request authorization. This way personal files cannot be overwritten without the users authorization. When overwriting a file in his type of folder the user is normally prompted for external authorization before proceeding.

11) Read-Only Folder—A type of "Restricted Folder", where files can only be read from the long-term memory. Access is restricted from writing or modifying anything within a "Read-Only Folder". This type of folder may or may not include the ability to execute programs depending on what is desired. This folder type is significantly different than a "Non-Executable Folder" where files may actually be written to the folder, by additional permissions to the folder or other folders, and also by programs executing from a parent folder ("Non-Executable Folder" a subfolder of program folder).

12) Write-Once Folder Mode—where the contents of the folder are never to be changed and/or deleted. Files can only be written and then loaded, no updating is allowed except with special authorization.

13) Locked-Files Mode—Marked files that the security controller will not allow to be changed or deleted without special authorization. Locked-Files may also be a Protected-File and/or a Restricted-File.

14) Safe-Folder Mode—A folders that is set up to take all operating risk for a program by marking itself so that the folder security controller will use the Safe-Folder address to store all write requests (save, cut, delete, rename, paste, modify, etc.) from that program and any program, software interrupt and/or sub-programs called by the program in the Safe-Folder. Thus, the Safe-Folder creates a map of the hierarchical order of programs, where all the programs executed subordinate to that program in the Safe-Folder are associated with it, so that the subordinate programs also write only to that Safe-Folder (folder, or subfolders). For example, a first program executed from a Safe-Folder can call and execute a second program in another folder, which then can call and execute a third program (and so on). The first, second, third, etc. programs, may then be commanded to write a file somewhere on the storage device, but the folder security controller would create an alias for these files in the Safe-Folder of the first program. Thus, as long as the first program is executing, any program operating under it would always be mapped back to the Safe-Folder of the first program when writing to the storage device. Associating the first, second, and third programs together can cause problems when the programs are not uniquely used. That is, certain Windows routines (and other programs) can be accessed by more than one program. Thus the security system (or controller) can monitor certain key programs to determine which program is currently accessing them when a write request is detected. Thus, with the original Safe-Folder program (first program) the security controller can Map the write request to the first program's folder (Safe-Folder). When loading a file (list, open, run, etc.), the same hierarchical program structure is used with the above mentioned first, second, third, etc. programs. As with writing data to the hard drive, loading also considers the folder address of the first program. The security controller first looks to see if there exists an alias file for the requested file. If the alias file exist, it is loaded. If the alias file does not exist, then the security controller tries to load the file at the original (real) folder address. If no file exists at either location, an error signal occurs.

15) Registry Protected Mode—Registry is locked and an alias registry created at computer startup. Alias Registry may be modified during computer operation, but reverts back to the real registry when rebooted.

16) System Protected Mode—This mode may include a key lock or security authorization to activate and deactivate. For example, when a keyed lock is set to System Protect, an all hardware security controller could be used to lock all system files, all system folders, all folders and/or all Files on a particular storage device. Such a system can use alias folders and/or alias files when writing to the storage device for the designated files and folders. All original files and/or folders remain unchanged, but could be authorized by user if set up that way. System settings can be changed during computer operation with alias files and/or folders holding the new information, but such information can become obsolete when the computer is rebooted. The security system may add a special character to the beginning of each alias file written (copy of the original) to identify from the original file. In this way, alias files can be stored in their original directory, making them easy to fine by the user and reduces the number or folder directories. User files, such as, Word documents, databases, etc. can be set up to only write with authorization from the user (clicking SAVE on the monitor), modifying an existing user file can require two conformation windows. The modify file function may also be suspended during this operational mode if desired. Cleanup procedure at shutdown and/or startup can delete these temporary alias files and folders. Alternatively, alias files may be kept until user decides to reset the system. This last function would operate much like a backup program, providing the user with a means to restore their system to working order. However, the System Protected Mode provides even greater security since at the hard drive level the computer would be unable to modify existing original files.

17) Registry-Restricted Mode—Programs can only modify or write entries in the registry associated with that program. This requires the security system to control registry modification, so that programs can not change registry settings for any program other than itself.

18) Temporary-Folder Mode—This mode is similar to the System Protect Mode in that one or more specific folders can be marked so that files within those folder can not be over written. Alias files would be created for all files and subfolders written to that specific Temporary folder. These alias files may all be placed in a single temporary folder even if they were originally directed to different folder. Then when the computer is shut-down or rebooted, these alias folders and files (temporary folders and files) can be deleted when the system is restarted. The temporary Files and folders are treat as if they were the real file until the system is shut off or until a predetermined time or date.

19) Temporary-File Mode—This mode is similar to the Temporary-Folder Mode except individual files can be selected which can not be modified. Instead the security system would create alias files for each file which would operate as if it were the original file until the computer was shut-down or rebooted.

20) Time-Dependent Mode—This mode is similar to the Temporary-Folder and File modes, but allows a specific amount of time where the folder is available to be changed. This feature allows the user to authorize the time-dependent mode one time during the installation of a program being installed, which then gives permission for that folder to be modified for a predetermined amount of time by other programs. Thus a single authorization by the user then allows changes and additions to the folder without causing any alias files to be created even if they normally would.

21) User-Defined Mode—Folders may have other user defined rules for specific folders, subfolders and/or files, 22) Combined Modes—The above function modes can be combined to create the desired access and/or restrictions (see FIG. 12 for example).

OPERATIONAL DESCRIPTION

In FIG. 1B, we see a modified prior art computer with a folder security system for both ATA Hard Drives 114 and 115, and PCMCIA controller 178. Computer system 101 operates like a normal prior art computer until a request is made to access hard drives 114 or 115, or PCMCIA cards 122 or 123. When the access request is made, the folder security controllers 180 and 184 traps the request and determines if the access request needs to be mapped to an alias folder address. Controller 180 communicates over lines 182 with ATA controller 108 to change an access request address if needed. Similarly, controller 184 communicates over lines 186 with PCMCIA controller 106 to change the folder address access to the PCMCIA cards if they are storage devices. The folder controllers 180 and 184 communicate through bus lines 146, logic core 143 and CPU 140 to determine if an alias folder map is needed during storage device access. The logic core 143 can be used to determine which program requests access to the storage devices (hard drives 114 and 115, and storage devices 122 and 123).

Alternatively, the folder controller system 190 can be placed between the hard drive driver 108 and/or between PCMCIA driver 106, to control the folder access of programs operating on mother board 100. Folder controller 190 would control I/O controllers 199 on cable 110 and 198 on cable 170 for changing the file access requests mid-stream. Folder controller 190 would map any address changes needed after the file access request had already been sent (appeared to have been sent) to the hard drives. Note that the I/O controllers 198 and 199 can be placed in PCMCIA controller 178, and hard drives 114 and 115, respectfully to provide alias folder mapping.

In FIG. 2, a DASS data mapping scheme is shown for folder controller 180 in FIG. 1B. (Folder controller 184 is operated in a similar manner when a nonvolatile storage device is plugged into the PCMCIA slot). Request folder Address map 150 in prior art systems would essentially be the same folder as absolute folder directory map 156. The distinction between requested and absolute folders is a result of the intermediate logical folder maps 152 and 154 (Program Directory for a specific Program and specific Access Request). Logical folder maps 152 and 154 are placed between absolute folder map 156 and requested folder map 150. Depending on which "logical folder map" security controller 180 chooses, and the content generated for the "logical folder maps", the file being written or loaded will be mapped differently.

In the example in FIG. 2, an access request by a Program is made to "read", "write" or "execute" a file at address 150a from hard drive 114. When this occurs, security controller 180 is signaled that and access request has been made and may then acquire the memory address of the Program which called the access routine. By determining the memory block being executed at the time of the access request, or other system information that can be used to determine which program actually made the access request, the Program can be identified. In this example, security controller 180 acquires memory address 164 of the last executed command before the access request, which is hexadecimal number "04C7". Controller 180 then compares this number with table 162, which can be generated as programs are moved in and out of RAM memory (and virtual memory). Controller 180 determines that address 164 is in the memory block range of entry 168, and retrieves that program's absolute folder address (its address in address map 156), which in this case is C:\VIRUS\bad.com (a malicious program). Controller 180 compares this address to the requested file address 150*a*. If file address 150*a* is within folder "C:\VIRUS\" and/or one of its subfolders, then the Real Folder Address Map 152 is selected, which is the same as on absolute folder map 156, and file 150*a* is mapped to 154*b* and then to 156*b* which is the same address as 150*a*, which are all "real" files. Notice that Real Directory Map 152, is usually a subset of all the "Real" files on hard drive 114 ("real" portion of absolute directory 156). Map 152 represents a list of allowed "Real" files that the specific requesting program is allowed access to for that specific access request. For different requesting programs and/or different access requests map 152 may contain completely different allowable files. From address map 156 the actual physical memory is accessed through logical memory map 158 in the typical ways used by standard hard drives. If however, file address 150*a* is outside the folder "C:\VIRUS\" and/or outside its subdirectories (subfolders), and/or not associated with the "bad.com" program, then alias folder Address Map 154 is selected to map the requested file address 150*a* into the "bad.com" program's real folder address "C:\VIRUS\" (or another directory associated with the folder "C:\VIRUS\" or the program "C:\VIRUS\bad.com"). For example, if the File being accessed by address 150*a* is "C:\WINDOWS\WIN.COM", then the generated file address 154*a* may be "C:\VIRUS\C:\WINDOWS\WIN.COM" Notice that the complete requested address 150*a* is included in the directory, this is to allow the computer to find the file again when the same requested file address is requested by the same program.

There are many other ways of associating the "C:\WINDOWS\WIN.COM" file written by the bad.com program with the "C:\VIRUS\" directory and/or the program "bad.com". For example, the file folder directory address C:\VIRUS\bad_com\C:\WINDOWS\WIN.COM could be used to not only associate the file with the directory "C:\VIRUS" but also with the program that saved it (bad.com). Another way to associate the written file with the program's directory would be to place them all in an alias folder such as "C:\ALIAS\" and then simply have the security controller check the alias folder before looking in the real folder address. For example, program "C:\VIRUS\bad.com" can load and write the requested program "C:\WINDOWS\WIN.COM", but the request to write (save, paste, delete, cut, modify, etc. will be redirect by folder controller 180. The generated directory address "C:\ALIAS\C:\VIRUS\C:\WINDOWS\WIN.COM" can be used as the alias write location. After this alias file is written, both the save and load commands will access the alias file version from then on. Thus, to the malicious program bad.com, it appears that it is taking over the WIN.COM program from windows, but in reality it is only manipulate files and folders in its own directory (C:\VIRUS\) and/or subdirectories.

Alternatively, other ways of storing alias files can be used as long as the method used is consistent for both saving and loading the files. For example, the Alias File Address C:\ALIAS\C:\VIRUS\bad_com\/C:\WINDOWS\WIN.COM could be used to write the requested file WIN.COM and associate it with the initiating program's file address "C:\VIRUS\bad_com\" (and/or folder address C:\VIRUS\). The Alias File Address also contains the Real File Address "C:\WINDOWS\WIN.COM" requested by program "C:\VIRUS\bad_com\" and are associated with that particular Alias File being written. Note that the typical folder hierarchical structure is used to write these files in the C:\ALIAS folder, but could just as easily be placed in a differently organized table as long as the program saving the file (i.e. C:\VIRUS\bad.com) and/or the folder directory of the program (i.e. C:\VIRUS\) is associated with the file and its requested address 150*a* (i.e. C:\WINDOWS\WIN.COM) for later access. The "\/" separator between the program address and the write request address is one possibility. However, a single "\", as is normal for directory addresses, can be used without losing the ability to distinguish where the program directory ends and the file directory begins. The occurrence of "C:\" makes a good separator in itself, since the colon ":" is not presently a legal character in directories. Also, all alias addresses can be put in the programs own directory in a standardized manner so that each folders aliases are easily identifiable to the security system. All of the above methods of saving alias versions of "C:\WINDOWS\WIN.COM" will have no effect on the real "C:\WINDOWS\WIN.COM" and thus, do not effect Microsoft Windows operation in any way, even if the virus is executed repeatedly. Once real address map 152 and alias address map 154 are generated, the file can be written, loaded or executed just like any other file on atypical hard drive. With alias address 154*a* being stored on drive 114 at its absolute directory address 156*a* and real address 152*b* at its absolute directory address 156*b*. This effectively prevents viruses from ever writing themselves onto important files, and than, when the computer is rebooted, being loaded into memory for execution by the operating system. In this example, file address 154*a* and 156*a* are the same, but additional mapping can be included for such things as: 1) Restricted-Folders and subdirectories for restricting loading and/or saving of files even from its own directory, 2) Restrict-Files from being updated without authorization, 3) Non-Executable Folders for non-executable files which will except written files from all (except restricted) folders and programs provided which are non-executable files and/or may, 4) Locked-folders where files can be written and/or loaded from an authorized list of folders and/or programs not in its folder of subfolder, 5) Write-Once folders where the contents are never to be changed and/or deleted, files can only be written and then loaded, no updating is allowed, 6) Safe-Folder where a folder is set up to take all operating risk for other programs by marking itself so that the security controller will use its folder as the programs address for all programs executed from executable files from that folder, 7) other user defined rules for specific folders, subfolders and/or files, 8) combinations of the previous function modes (see FIG. 12 for example of some).

Folder controller 180, in FIG. 2, determines which logical folder map (Program Directory, see FIGS. 16A and 16B) to use, either generated real address map 152 or a generated alias address map 154, depending on information from logic core 143 about the specific access requesting program and the type of access request being made. This information can also be obtained directly from CPU 140 or other hardwired monitoring system on motherboard 100, if desired, but is also easily captured by software means. Specifically, the computers lower level operating system functions can be programmed to provide security controller 180 with the needed information to determine the folder address of the program requesting access of the hard drive. Security controller 180 itself can also be part of the computers operating system (i.e. MS Windows, Linex, Apple OS, Unix, etc.).

Often times more than one file needs to be written at a time, and modern operating systems will cache the files needing to be written to drive 114. In these cases, information about the folder address of each program requesting the write command must be associated with the file being written. Thus, as the disk drive controller 108 gets around to saving the file, security controller 180 can determine its Logical Folder Address with the folder address of the program requesting to write that specific file. In Windows, this caching of files is done by the SmartDrive program "SMARTDRV.SYS". To insure that each disk access request is matched with the correct program, the SmartDrive program could keep track of that information, or the folder security controller 180 could manage this information, or managed by another component or software program in the computer's system.

To retrieve data from platter 160 the same process is reversed with data accessed in the same way it was written. The data address selected by real map 152, or alias map 154 is used to move file data from platter 160 into computer memory. As long as the program accessing the file (or data), is the same program that requested to write the file, the same logical folder map (152 or 154) is used and the program is unaffected by the folder security controller 180. If however, a second program attempts to access this same file, it may be directed to a different alias version of the file, or only be able to load the file, but not be able to change it (write access), depending on the permissions for that directory and/or file. This second program can use the same requested file address as the first program to try and load the real file at that the requested address. However, if the second program has written an alias file with the same requested file address and this requested file address is outside its directory, then it will load its own alias version of the file (if it exists) instead of either the first program's re-written version (alias file) or the real file version. In this way, each program can use the same "requested file address" and modify that file for its own use, without changing the original real file for other programs. If it is desired for more than one program to have access to the same file, these programs can be given permission in many ways. One way to give multiple programs permission to modify a file is to have a specific permissions setting the security system recognizes that allows it. Another way is simply to place the programs in a common folder so all the programs needing access to the file(s) placed in that common folder and/or subfolder(s) are associated with each other.

In FIG. 3, we see a prior art computer motherboard 230 connected to a hard drive 250 through folder security controller 240. During operation, CPU operates on program threads doing various functions. When a request to access hard drive 250 is detected by security software 245 (in RAM or Virtual Memory), it uses its resources to determine which program actually made the access request and also determine the storage folder address for that program thread on hard drive 250. Alternatively, information about which program thread has made a disk access request can be done through a hardwired connection 239 with CPU 232 or system bus 233. With this information, security controller software 245 can send sufficient information through the I/O driver 234 to allow security controller 240 the ability to redirect the access request to a different folder if necessary. From the requesting program's perspective, they appear to be accessing the real folder address, but may in fact be accessing an alias folder address. It is possible to eliminate controller 240 all together if security controller software 245 does the mapping of access requests so that I/O 234 only sees the folder address that security software 245 wants it to see. To do this, security software 245 must intercept any request for access to hard drive 250 and change the accessed directory address as needed.

In FIG. 4, we see a folder security system 280 connecting solid state memory 290 to prior art motherboard 270 with a hard wired connection to memory block movement and addresses being executed by CPU 232. The folder security in this design is all in hardware, with no software components involved in the determining the folder addresses mapping required. RAM within security controller 280 and secure memory space within memory 290 can be used to store folder address information on programs currently executing on motherboard 270. When an access request to solid state memory is made, folder identifier 272 captures the directory address of the program making that request and sends it to security controller 280. Controller 280 then compares this program directory address with the requested directory address to determine which folder to access, either the real folder or an alias folder. Security controller 280 can access memory 290 directly to determine if an alias file exists without any additional assistance from motherboard 270. Security controller 280 may also be given the power to take control of motherboard 270 through folder identifier 272 and/or I/O 234 if needed. Solid state memory 290 is shown as an example, and can be any memory storage device, such as, a hard drive, CD-RW, DVD-RW, etc.

In FIG. 5A, we see another alternative arrangement for some of the components on a motherboard 300. In this design all folder security operations is done in software in low level security program software group 304, which can be in RAM 306 or in Virtual Memory on hard drive 250. The security controller software 304 would have control over the operating system being executed on motherboard 300 so that it can intercept and map any request to access the hard drive controller 308, both writing and loading.

In FIG. 5B, we see another alternative arrangement for some of the components on a motherboard 320. In this design the security is hardwired into motherboard 320, much like the system seen in FIG. 3. In this design, some or all of the security components (folder identifier 328, security controller 334 (which may include the hard drive I/O), and memory management hardware 332, may be needed. Management hardware 332 can also provide the program folder identification function that folder identifier 328 is used for. Similarly, hard drive security controller can take over the functions of management hardware 332 and/or folder identifier 328 with its connection to system bus 322. When a program requests access to hard drive 250, a signal can be sent to folder identifier 328, security controller 334, and/or management hardware 332. This combination of security hardware, then determines the access requesting program's storage folder address (likely on hard drive 250, but not necessarily) to use in determining if an alias file and/or alias folder needs to be loaded, created and/or modified, or if the actual access address itself (real address) can be used.

In FIG. 6D, we see an example of what might happen should a malicious program take control of the program "outlooksys.exe" in the "Outlook Express" folder. In this case, the malicious program tries to write the file: "C:\WINDOWS\SYSTEM\SYSTRAY.EXE" on the storage device. The folder security identifies the program making the request as: "C:\Program Files\Outlook Express\Application Execute\outlooksys.exe". Recognizing that the outlooksys.exe program is trying to write outside its own directory, it checks to see if the program, and/or program folder, has permission to write to that folder and file. The security system discovers that it does not have permission to write there. Next, the folder security system can check to see if the folder "C:\WINDOWS\SYSTEM\ is a special folder that could allow writing of the file, such as, a non-executable folder, or write-once folder, save-folder, locked-folder, etc., which might allow a file to be written. In this case, the SYSTRAY.EXE is an important executable file that would probably be write protected as well as its folder "SYSTEM" being read-only and have other restrictions to provide multiple layers of protection for this program. Once the folder security determines that there is no authorization to save at the "C:\WINDOWS\SYSTEM\SYSTRAY.EXE" location it creates an alias directory "C:\WINDOWS\SYSTEM\" in the "Application Execute" folder, and places the SYSTRAY.EXE file in it. This new "SYSTRAY.EXE" program is stuck in the "C:\Program Files\Outlook Express\Application Execute\C:\WINDOWS\SYSTEM\" directory where it can do damage only to itself should it ever be executed. The real "C:\WINDOWS\SYSTEM\SYSTRAY.EXE" file is safe and secure in its protected directory. Note that the folders "C:", "WINDOWS", "SYSTEM" in the "Application Execute" folder were created at the time of the file "SYSTRAY.EXE" being saved.

In FIGS. 8A through 11B, we see several flow chart schematics showing a few of the logical decision making processes that are possible with the disclosed folder security system. FIGS. 8A and 8B focus on writing files to and loading files from the PROGRAM's folder and/or its subfolders. FIGS. 9A and 9B focus on writing and loading files to and from only subdirectories of the PROGRAM's storage folder. FIGS. 10A-B show slightly modified versions of FIGS. 8A-B where a specific folder address (i.e. The PROGRAM's folder address and/or subdirectories) is used for writing "Alias Files" to. FIGS. 11A-B show slightly modified versions of FIGS. 9A-B where a specific folder address (i.e. The PROGRAM's folder address and/or subdirectories) is used for writing and loading "Alias Files".

The Registry

Newer versions of Microsoft Windows™ uses a hierarchical database called "the registry". The registry comprises three primary files: user.dat, system.dat, and policy.pol. These files work together to provide a central repository of settings for Windows. Most Windows™ based programs use one or more of these registry files to store setting information. While this simplifies the operating system and makes it more adaptable, it also creates a security risk since the registry also contains information needed to start other Windows-based applications, user specific information and Windows™ operating system configuration values. If any program can change data within these registry files, then malicious program can easily damage the system. With the added security provided by the disclosed security system, additional security can be provided to the registry by limiting access to line items within the registry according to what program thread has requested modification. If the registry is set-up with the same hierarchical structure as the real folder address map, then permission to change registry items can be given only to the program thread that created that particular registry item and/or other program threads within the same real and/or absolute folder address as the program thread that created the registry item. In this way, the registry entries are protected in the same hierarchical structure as the programs. That is, programs that are hierarchically related can also modify each others registry item information depending on their hierarchical position. Programs in subfolders of a primary program's folder can have its registry item information modified by the primary program and/or/or not other program in its folder, but the subfolder programs generally cannot modify the registry item information created by the primary program. The disclosed security system can directly control the registry files so that each program thread and/or folder location can only have authorization to modify specific registry information associated with that program thread and/or folder. Because the disclosed security system will be "aware" of the program and program's storage folder address making the request to modify the registry, the disclosed security system can restrict modifications to the original registry to those line items that are associated with a specific program and/or a specific folder. Each program and/or program group can have its own Registry. The Registry may also be treated like any other file, where any program trying to write to it simply writes an Alias File for the Registry. Then that program will use its own copy (Alias File) of the Registry for its own information. This protects the "Real" Registry, which would be set up by Windows™, and generally would not need to be modifies unless the user wanted a program to be specifically in the main Windows Registry.

Directory Listing

The DASS system would treat listing of directory information on the long-term storage device in substantially the same way that files are treated during Reading, Writing and Executing files. Individual programs would see the apparent "Real" directory arrangement. Where "Real" is used to define the directory addresses that the applications and operating system make requests to, and would generally not include the "Alias" directories (files and/or folders). Real File Addresses that do have Alias Files would list the Real File Address, but read and write to the Alias File Address. Thus the "Real" directory structure is what the computer perceives as the actual directory structure. The "Program Directory" defines the actual File Directory structure for that particular program, and is different for each program and file requested. The Program Directory includes both the Real Files and Alias File Addresses available to that program (see FIGS. 16A and 16B). The Program's directory arrangement is included in the absolute directory defined on the long-term storage device directory structure itself. To the storage device, the "Program Directory" structure is just portion of the "Absolute Directory" structure, but the computer operating system and applications may never see this "Program Directory" structure when listing Files, only the pre-mapped directory structure we are calling the "Real Directory". The "Program Directory" is generated when an access request to the long-term storage device is initiated. The Program Directory" provides the proper mapping of "Real File Addresses" to their "Alias File Addresses", it is the directory the program uses, but never sees during listing. All "Alias Files" can be hidden from all programs (applications) if desired. However, a special application(s) designed to access the full "Absolute Directory" on the long-term storage device can be useful to allow the user to see exactly what is on their long-term storage device.

One or more applications may be used to access both the "Real" and the "Alias" directory structure (the absolute directory). For example, Windows' "Windows Explorer" program could be designed to show the full "Absolute" directory on the long-term storage device (storage devices actual directory structure). Windows Explorer could also be designed to show "Phantom Files". "Phantom Files" might not even exist, they would just show the apparent location ("Real" directory address) of "Alias Files" with relationship to a specific program or folder. These "phantom Files" would be shown an "Alias File" at its "Real" directory address for a specific program (much like a shortcut file in Windows). Several phantom Files can exist in the same folder with the same file name, but each from a different program that created its "Alias File". If Windows Explorer would show all these, there would be three distinctly different types of files shown in its directory listing. For example, the listing below shows three "Real" files (C:\WINDOWS\WIN.COM, C:\Virus\virus.exe, and C:\Worm\worm.exe), two "Alias" files (C:\Virus\ALIAS\C:\WINDOWS\$WIN.COM, and C:\Worm\ALIAS\C:\WINDOWS\$WIN.COM), and two "Phantom" files (C:\WINDOWS\#WIN.COM, and C:\WINDOWS\#WIN.COM).

Installation of Programs

Under the DASS system, there exists many ways of handling installation of a program and its associated files. Generally, any program can create a "new" folder for placement of files in, and that folder would then be associated with that program or group of programs. This association could be as simply marking the folder so that it is identified as being part of that associated group. This association may also be incorporated into an "Alias Folder" if the program creating it is on the long-term storage device itself. Because of the hierarchical structure of the security system, any program stored in this newly created folder can have "Real" write access in this folder. However, outside this folder it may only write alias files. If the program creating the new folder is outside the protected storage device, such as on a CD-ROM disk, then the new folder may or may not be association to the original program depending on what is desired. The new folder can simply be a new "Real" folder and operate like any other

| File Directory Address | File Type |
| --- | --- |
| C:\WINDOWS\WIN.COM | ("Real" file) |
| C:\WINDOWS\#WIN.COM | ("Phantom" file for "Alias" file: C:\Virus\ALIAS\C:\WINDOWS\$WIN.COM |
| C:\WINDOWS\#WIN.COM | ("Phantom" file for "Alias" file C:\Virus\ALIAS\C:\WINDOWS\$WIN.COM |
| C:\Virus\virus.exe | ("Real" file) |
| C:\Virus\ALIAS\C:\WINDOWS\$WIN.COM | ("Alias" file for C:\WINDOWS\WIN.COM written by program C:\Virus\virus.exe) |
| C:\Worm\worm.exe | ("Real" file) |
| C:\Worm\ALIAS\C:\WINDOWS\$WIN.COM | ("Alias" file for C:\WINDOWS\WIN.COM written by program C:\Worm\worm.exe) |

The use of "#" and "$" signs is one way that the user could be informed of the type of file they were looking at (the "#" sign identifying "Phantom" files and the "$" identify "Alias" files). In our modern icon oriented computers, "Phantom" and "Alias" files may use different File Icons to signify the difference. Notice that the full address of the original "Real" file (C:\WINDOWS\WIN.COM) is contained within the address of the alias files, and allows the "Phantom" files to be generated as shown. This association of the "Alias" file with the "Real" File address) does not have to be contained in the directory information itself as shown above, but can be incorporated into the file ($WIN.COM) itself or stored on a separate table. During operation, when the program "C:\Virus\virus.exe" tried to read, write or execute real file "C:\WINDOWS\WIN.COM" the DASS would first look in the "ALIAS" folder of the program's directory (C:\Virus\ALIAS\) to see if an alias file exists for "C:\WINDOWS\WIN.COM". If the alias file exist, then the security system will read, write or execute the alias file "C:\Virus\ALIAS\C:\WINDOWS\$WIN.COM". If the alias file does not exist, then the security system would read, or execute the real file "C:\WINDOWS\WIN.COM" or write the alias file "C:\Virus\ALIAS\C:\WINDOWS\$WIN.COM".

Notice that during listing, a file will be listed as existing if either the "Real File" or the "Alias File" exists. During general operation the "Alias File" will be accessed for read and write requests if it exists. If the Alias File is accidently deleted or damaged, access control can be returned to the "Real File". Similarly, if the "Real File" is deleted or damaged, programs with an "Alias File" for that "Real File" will continue to operate normally, since the it doesn't have to use the "Real File" any more.

folder under DASS, and only allow programs within that new folder to modify and create files within that new folder. Any write requests by the installer outside the new folder can be mapped to an alias folder and file within the new folder. In this way, new "Real" folders can be created anywhere on the long-term storage device (unless otherwise restricted) for placement of new files and/or applications.

During the installation process of a new application, requests may be generated to update Windows' system files, such as DLL, DRV, EXE, and other files. Because of the way the DASS system operates, attempts to modify any of these existing files will simply result in an "Alias" file being generated within the new folder created for the new application. Then during operation of the new application, these alias files will be accessed instead of the original DLL, DRV, EXE, etc. files. In this way, each program gets the files it modified and saved, while other programs can get their files they modified and saved, even if the file's requested address and name are the same. The Registry files may be among the restricted files the installer tries to update. The DASS system would normally just create a new Registry that the new application would use for its own purposes, but the user may elect to allow the program to modify the "Real" or original Registry if desire.

Throughout this patent, prior art Windows' hierarchical directory structure (i.e. Windows' folder and subfolders directory structure) has been used as one example to define the framework for an Alias File directory structure, which can be fashioned directly into folder structure itself to associate specific files with the program which wrote them. The use of alias folders within the storage directory of the program that "wrote" the file accomplishes this goal in a way that is intuitive to people familiar with the hierarchical filing system used in present day computer systems (i.e. folder and subfolder hierarchical arrangement). The hierarchical directory structure provides the needed association between a specific file being written, the specific file's originally requested directory address and the directory address of the program writing it, such a system is only one example of how these three sets of information (i.e. saved file directory, requested file directory, and requesting program directory) can be associated with a file and each other on a long-term storage device.

One way we have shown for creating, identify and retrieving alias files is to make the alias file's directory equal to the requesting program's directory plus the full originally requested directory address. This way all the needed information is stored in the hierarchical directory arrangement itself. The alias file can be quickly found once the program's storage address and the requested file address is known. However, in present day FAT32 file allocation systems there is limited space for long directory addresses. Thus, other ways of tabling this information can be used besides the directory address system to store the information. Instead, the name of the saved file and its real directory can be mapped by a new table, which would include the requested file directory address and requesting program absolute (and/or real) directory address, and define their proper hierarchical order. Thus the security system can access this new table to determine which file to access depending on the program requesting this access and the hierarchical relationship between the program requesting access and the file it is attempting to access. The new table may be part of an existing file table, such as NTFS (New Technology File System), or a separate table by itself. The disclosed security system could add the requesting program's identity and the original "Real File Address" information to the existing NTFS directory so that the disclosed security system could quickly obtain this information during operation of an access request.

Alternative hierarchical structures can be used by incorporating the requested file address and requesting program's storage address within the file itself in such a way that the files can be sorted quickly according to the requesting program, and/or requested file address. For example, an alias file may be saved in the requested folder address, but a special character is added to the file name to identify that particular file as an alias file (for example all alias file names could start with "a~"). The alias file could be placed in the same directory folder as the original real folder address. Another alternative would be to put all the alias files in a separate directory (for example "\alias\" within the requested file directory. Thus, all the alias files for a specific file would be within the same folder. If several programs attempt to replace the original file, there may be several alias files within the specific files folder. Each alias file would need to include information on the program which caused the file's creation. This program information may comprise a program identifier from a table of program information, the program's full storage address, etc. For this example we will use the program's full storage address as the information we use to identify the program from other programs. When the program requests access to the specific file, the security system must determine which alias file to select (or real file). To do this, the security system searches for the alias file having the program information that matches the requesting program's full directory address. If no such alias file matches (program does not have an alias file for that file), then the security system reads the real file (if read requested) or writes the alias file (if write requested) including the requesting program's full directory address information. Thus, all three pieces of information of an alias file are stored within the storage structure: 1) alias files are identified from real files by the addition of a special character(s) to the alias file names, 2) File Address—alias file is stored in same directory as real file so that the directory address and file name itself provide this information, 3) Identity of requesting program and/or program's storage directory—this information is associated with the alias file by storing this information within the file itself.

Besides controlling the file allocation tables on the long-term storage device, the disclosed security system can also control the flow of information between the computer and the long-term storage device (hard drive). For example, the security system can manage multiple access requests at one time by keeping track of the directory of the program making each file or folder request and managing the requests concurrently as needed. Alternatively, the disclosed security system could simply operate the hard drive in "exclusive mode" where only one program can access the hard drive an any one time, thus eliminating any error in associating the accessed file with the wrong requesting program directory.

RAMIFICATIONS, AND SCOPE

The power of the disclosed invention results from its ability to redirect the actions of a particular program depending on where that particular program is stored in a hierarchical structured long-term storage device. This ability to redirect actions is especially useful when used to redirect a "read request" and/or a "write request" according to the requesting program's storage folder address. By including the ability to redirect the "read and write requests" to alias folders dependent on the program doing the requesting, the disclosed security system has a powerful means for organizing the way files are stored, handled and retrieved, without significantly altering the way the applications read, write and execute its own files. Once the actions (read, write, execute, etc.) of each program and program thread are logically controlled according to where that program or program thread is stored, many different modes of controlling the storage of files and folders are possible. Through this simple action of using an executable program's non-volatile storage location to accordingly redirect that program's actions (read, write, execute, etc.), a computer system can limit unauthorized programs (malicious programs) to a particular folder and substantially prevent it from damaging files in other folders. This redirecting does not have to significantly effect the ability of the executable program to operate normally, because from that program's perspective, the files it "writes" are the same as the ones it "reads", even though the files' absolute address location (alias folder address) may be quite different than the file address it requested. Modes of redirecting files can include the ability to separately identify files written by a particular program, from files written at the same location by a different program. Thus, there is the ability for programs to operate normally without interfering with other programs on the non-volatile storage device.

Although the above description of the invention contains many specifications, these should not be viewed as limiting the scope of the invention. Instead, the above description should be considered illustrations of some of the presently preferred embodiments of this invention. For example, all the examples shown in this patent have subfolders inheriting its properties and rights to be written to form its mother folder. However, this top down hierarchical construction can just as easily be reversed with the subfolders being protected from modification and the higher order folders being writeable by programs executed in its subfolders. Thus, even though the filing relationship is the standard top down hierarchy, the ability to write to folders can operate from bottom up. In such a folder security system, all programs could write to the root directory, but not to subfolders of the access requesting program's folder. This inverting of the access priority allows several programs to easily access the same higher order folder. For example, if the directory in FIG. 7C had an inverted access priority, the programs "FRONTPG.EXE" (FrontPage), WINWORD.EXE" (MS Word), "wksdb.exe" (Works Database), "wksss.exe" (Works Spreadsheet), "msworks.exe" (Works Word Processor), could all be placed in their own subfolder in the "Office" folder. Each program could write files into the "Office" folder, the "Microsoft Office" folder, the "Program Files" folder, and the "C:\" folder. But they would not be able to write to any of their subfolders, such as, folders "1033" and "Temp" shown in the "Office" folder. Thus, important program files could be place in subfolders of the program directory to protect them. While programs that need to be shared could be placed in higher order folders, such as, the "Microsoft Office" and/or "Office" folders. To protect files in these higher order folders, the folders can be Non-Executable Folders and/or have other restrictions (see "MODES OF OPERATION" under the "OPERATIONAL DESCRIPTION" portion of this patent) so that no executable files are allowed to be saved, renamed, renamed to, loaded and/or executed within the folder.

Also, the way the files and folders are arranged to provide security is nearly limitless. For example, alias files can be placed in nearly in any directory folder desired, but the alias folder still needs to be associated with the hierarchical position of the program that saved it and the alias file still needs to be associated with the originally requested directory address of the file. However, notice that alias folders and files are not needed at all on a properly organized folder system for the operating system and other applications (programs). The alias folders are only needed to accommodate programs that operate outside the predetermined rules needed for a folder security system (depends on which folder modes and restrictions are used). Provided each program thread only writes to its own folder directory or subdirectory, no conflicts are created an no alias folders or files are needed. However, since there will be programs that don't match every possible mode that a user may select, the alias folders in most cases will be useful. Also notice that the disclosed modes for files and folders need not effect the directory and file permissions normally used by Windows. The disclosed security system works substantially behind the scenes from Windows perspective so that Windows is essentially oblivious to the disclosed security system and file content and permissions are not changed (except possibly for special files such as the Registry).

Finally, there are many ways the program requesting access to the long-term storage device can be identified. For "Virtual Machine" operating systems such as used in Windows XP, the Security System can "watch" the Graphic User Interface (GUI) to determine the Program being executed at the time the access request was initiated. Also, many configurations of File and Folder Modes are allowed by the disclosed Security System. These Modes can be put in a table for known Programs so that during installation the program and its files and folders are setup and operate properly under the disclosed Security System (i.e. DASS).

Thus, the scope of this invention should not be limited to the above examples but should be determined from the following claims.

I claim:

1. A method of managing access requests from a plurality of computer software programs executing on a computer to read and/or write to a long-term storage device by using a hardware security controller logically connected between the computer and the long-term storage device, comprising the steps of:
   a) identifying a computer software program making a write request to write a specific file to a specific file directory address on the long-term storage device, and/or identifying a program directory address where the computer software program is stored, wherein an original version of the specific file may, or may not, already exist at the specific file directory address;
   b) using the identity of the computer software program and/or its program directory address to determine if the computer software program and/or program directory address has a predetermined association with said specific file and/or the specific file directory address;
   c) redirecting said write request, if and only if, said predetermined association does not exist between said computer software program and/or program directory address and said specific file and/or specific file directory address, wherein the specific file is written as an alias file that is physically separate from the original version of the specific file stored at the specific file directory address, and
   d) writing said specific file at said specific file directory address, if and only if, said predetermined association does exist between said computer software program and/or program director address and said specific file and/or specific file directory address, wherein steps c) and
   d) are interchangeable in execution order.

2. The method in claim 1, wherein redirecting said write request further comprises:
   redirecting said write request from a second program not associated with said computer software program to a second alias file which is physically separate from said specific file, said specific file directory address, said alias file and/or said alias folder even if the specific file directory address and specific file's name requested are the same for both programs.

3. The method in claim 1, wherein, said write request from said computer software program is a software interrupt request and/or a program call.

4. A method of managing access requests from a plurality of computer software programs to read and/or write to a long-term storage device by using a hardware security device interposed between the computer and the long-term storage device, comprising the steps of:
   a) identifying a computer software program making a read request to read a specific file at a specific directory address on the long-term storage device, wherein said computer software program is not associated with said specific file;
   b) determining if said computer software program has an alias file associated with both said computer software program and said specific file and/or specific file directory address on said long-term storage device, wherein said alias file is physically separate from said specific file requested;
   c) reading said alias file, if and only if, said alias file exists for that specific program and specific file combination as determined by step b), and
   d) reading said specific file at said specific directory address, if and only if, said alias file does not exist on said long-term storage device for that said specific file at said specific directory address, wherein steps c) and d) are interchangeable in execution order.

5. The method in claim 4, wherein redirecting said read request further comprises:
redirecting said read request from a second program not associated with said computer software program to a second alias file which is physically separate from said specific file, said specific directory address, said alias file and/or said alias folder even if the specific directory address and specific file's name requested are the same for both programs.

6. The method in claim 4, wherein,
said read request from said computer software program is a software interrupt request and/or a program call.

7. A memory storage security system for use with a computer and a nonvolatile memory storage device, comprising:
a) a security controller defined on the memory storage security system and in operational connection between said computer and said nonvolatile memory storage device, wherein the nonvolatile memory storage device is organized in a hierarchical folder structure of stored files;
b) a detecting means defined on the security controller for detecting an access request to read and/or write a specific file by a specific program executing on said computer; wherein said specific program is stored at a first hierarchical folder address on the nonvolatile memory storage device, wherein said specific program is requesting said specific file at a second hierarchical folder address on the nonvolatile memory storage device;
c) an identifying means defined on the security controller and responsive to the detecting means and designed to identify the first hierarchical folder address of the specific program being executed at the time of the access request for said specific file and identifying the second hierarchical folder address requested for the specific file;
d) an associating means defined on the security controller and responsive to said detecting means and said identifying means for identifying a group of associated files and/or folders for that specific combination of first and second hierarchical folder addresses;
e) a comparing means defined on said security controller and responsive to the detecting means, the identifying means, and the associating means and designed to compare the first hierarchical folder address with the second hierarchical folder address;
f) a writing means defined on said memory storage security system for writing and/or modifying said specific file on the nonvolatile memory storage device;
g) wherein if the second hierarchical folder address is within said group of associated files and/or folders the specific file is written and/or modified by said writing means at the second hierarchical folder address, and
h) wherein if the second hierarchical folder address is not within said group of associated files and/or folders then an alias file is written and/or modified by said writing means at an alias hierarchical folder address, wherein the alias file is physically different than the specific file at said second hierarchical folder address; wherein the alias file is associated with the specific program and the specific file.

8. In the memory storage security system in claim 7, wherein said group of associated files and/or folders comprise the first hierarchical folder where the specific program is stored and/or its sub-folders.

9. In the memory storage security system in claim 7,
wherein said group of associated files and/or folders comprise the folder of the alias hierarchical folder address and/or its subfolders.

10. In the memory storage security system in claim 7, further including
an accessing means defined on said memory storage security system for accessing said specific file and said alias file from the nonvolatile memory storage device;
wherein the identifying means is further designed for identifying the program being executed at the time of the access request for the specific file and identifying the first and second hierarchical folder addresses for the specific program and specific file respectfully, and
wherein if the alias file exists at the alias hierarchical folder address for the specific program and the specific file combination then the accessing means accesses the alias file from the alias hierarchical folder address, and
wherein if the alias file does not exist at the alias hierarchical folder address for the specific program and the specific file combination then the accessing means accesses the specific file at the second hierarchical folder address.

11. In the memory storage security system in claim 7,
wherein the detecting means is further designed to detect a request to write to an original registry within a operating system of the computer;
wherein each entry in the original registry is hierarchically organized;
wherein if the entry in the original registry is associated with the program making the request then the program is allowed to update that entry in the original registry;
wherein if the entry in the original registry is not associated with the program making the write request then a new registry is created for the program with the entry included, whereby the original registry remains unchanged;
Wherein when the program is executed again the new registry is used to assign settings to the program instead of the original registry.

12. In the memory storage security system in claim 7,
wherein the associating means defines said specific file as not associated with the specific program if said specific file was not originally written at the request of the specific program and/or a second program called by the specific program.

13. The memory storage security system in claim 12,
further including a mapping means defined by said security controller for mapping the access request to an alias file address if said associative means determines that the specific file at the second hierarchical folder address is not associated with the specific and/or the second program.

14. The memory storage security system in claim 10,
wherein said association means is responsive to a hierarchical directory structure for storing said computer file, wherein said hierarchical directory structure itself defines the association between the computer program and the computer file.

15. The memory storage security system in claim 7,
wherein said associating means defines the association between said specific file and said specific program by writing said alias file within the specific program's own storage folder directory and/or its subdirectories on said nonvolatile memory storage device.

16. The memory storage security system in claim 7,
wherein, when said specific program requests read access to said second file said mapping means redirects the read

67 request to said alias file if said alias file exist, but directs the read request to said second file if said alias file does not exist.

17. The method in claim 1, further including the steps:
   e) identifying the computer software program as it makes a read request to read the specific file at the specific file directory address on the long-term storage device;
   f) determining if the computer software program has an alias file associated with the specific file and/or the specific file directory address on said long-term storage device;
   g) reading the alias file, if and only if, the alias file exists for the computer software program and the specific file combination as determined by step f), and
   h) reading said specific file at said specific file directory address, if and only if, said alias file does not exist on said long-term storage device for that said specific file at said specific file directory address, wherein steps g) and h) are interchangeable in execution order.

18. The method in claim 1, wherein step c) further includes associating the alias file and/or its directory address with the combination of the specific program requesting access and the specific file, whereby the alias file is accessed when the specific program requests access to the specific file.

19. A method of managing access requests between a computer and a nonvolatile memory storage device by using a hardware security device interposed between the computer and the nonvolatile memory storage device, comprising the steps of:
   a) identifying a plurality of files onto the nonvolatile memory storage device,
   b) allowing each file in the plurality of files to access each of the other files in the plurality of files;
   c) identifying a specific program as it initiates a write request to write and/or modify a specific file to a specific file address on the nonvolatile memory storage device, wherein the specific file address comprises a directory address and a file name;
   d) redirecting said write request and writing the specific file's data as an alias file, if and only if, the specific program is not associated with the specific file address, wherein the alias file is given association with both the specific program and the specific file address and is stored physically separate from the specific file address, wherein neither the directory address nor file name need to exist in order to write the alias file, and
   e) writing the specific file's data at the specific file address, if and only if, the specific program is associated with the specific file address, wherein the file name does not have to exist in order to write the specific file at the specific file address, wherein steps d) and e) are interchangeable in execution order.

20. The method of managing access requests in claim 19, further comprising the steps:
   f) identifying the specific program that initiates a read request to access the specific file address on the nonvolatile memory storage device, and
   g) redirecting the read request for the specific file address to the alias file, if and only if, the alias file, associated with both the specific program and the specific file address, exists;
   h) accessing the specific file address, if and only if, the alias file, associated with both the specific program and the specific file address, does not exist, wherein steps g) and h) are interchangeable in execution order, whereby the method of managing access requests provides read

68 access to the alias file if the alias file exists, and provides access to the specific file address if the alias file does not exist.

21. The method in claim 19, wherein the method of managing access requests in claim 19, further comprising the steps:
   f) identifying a second program as it initiates a second write request to write and/or modify a second file at the specific file address on the nonvolatile memory storage device;
   g) redirecting said second write request and writing the second file's data at a second alias file address, if and only if, the second program is not associated with the specific file address, wherein the second alias file is given association with both the second program and the specific file address and is stored physically separate from the specific file address and the first alias file, wherein the specific file address does not have to exist in order to write the second alias file, and
   h) writing the second file's data at the specific file address, if and only if, the second program is associated with the specific file address, wherein the specific file address does not have to exist in order to write the second file's data at the specific file address, wherein steps g) and h) are interchangeable in execution order.

22. The method of managing access requests in claim 19, wherein step c) further comprises testing to determine if the specific file address contains a registry comprising a plurality of entries, wherein if it is determined that the specific file address holds the plurality of entries then steps g) and h) are skipped and instead the following steps are performed:
   f) identifying a specific entry in the plurality of entries that the specific program is attempting to modify or rewrite;
   g) testing if the specific entry is associated with the specific program making the write request, then and only then, modifying or rewriting the specific entry within the plurality of entries, wherein if the specific entry is not associated with the specific program making the write request, then the specific entry is not modified or rewritten.

23. A method of managing access requests between a computer and one or more nonvolatile memory storage devices by interposing a hardware security device between the computer and the one or more nonvolatile memory storage devices, comprising the steps of:
   a) identifying a plurality of files on the one or more nonvolatile memory storage devices,
   b) allowing each program file in the plurality of files the ability to be executed on the computer;
   c) identifying a specific program file initiating a write request to write and/or modify a specific file at a specific file address on the one or more nonvolatile memory storage devices, wherein the specific program file is one of the plurality of files;
   d) redirecting said write request and writing the specific file's data as an alias file, if and only if, the specific program file is not associated with the specific file and/or the specific file address, wherein the alias file is made associated with both the specific program and the specific file and is stored physically separate from the specific file, wherein the specific file need not exist in order to write the alias file, and
   e) writing the specific file's data at the specific file address, if and only if, the specific program file is associated with the specific file and/or the specific file address, wherein the specific file need not exist in order to write the specific file at the specific file address, wherein steps d) and e) are interchangeable in execution order;

f) allowing the specific program file in the plurality of files to initiate a read request to access the specific file on the one or more nonvolatile memory storage devices, and g) redirecting the read request and reading the alias file, if and only if, the alias file exists which is associated with both the specific program and the specific file; and h) accessing the specific file, if and only if, the alias file associated with both the specific program and the specific file does not exist, wherein steps g) and h) are interchangeable in execution order, and i) wherein steps c) through e) are interchangeable in execution order with steps f) through h), whereby any specific program in the plurality of files can read, write and modify any file in the plurality of files for its own use.

g) wherein if the second hierarchical folder address is within said group of associated files and/or folders the specific file is written and/or modified by said writing means at the second hierarchical folder address, and h) wherein if the second hierarchical folder address is not within said group of associated files and/or folders then an alias file is written and/or modified by said writing means at an alias hierarchical folder address, wherein the alias file is physically different than the specific file at said second hierarchical folder address; wherein the alias file is associated with the specific program and the specific file.

24. The method of managing access requests in claim 23, wherein the specific program file and the specific file are considered associated if the specific program file and the specific file are located within a common directory folder and/or one or more subfolder of the common directory folder on the nonvolatile memory storage devices.

25. The method of managing access requests in claim 23, wherein a specific directory folder on the one or more nonvolatile memory storage devices is operated under a write-restricted mode, and/or a load-restricted mode, and/or a restricted-folder mode, and/or a protected-folder mode, and/or a locked-folder mode, and/or a restricted-file mode, and/or a protected-file mode, and/or a locked-file mode, and/or a restricted-extension folder mode, and/or a non-executable folder mode, and/or a read-only folder mode, and/or a write-once folder mode, and/or a locked-files mode, and/or a safe-folder mode, and/or a registry protected mode, and/or a system protected mode, and/or a registry-restricted mode, and/or a temporary-folder mode, and/or time-dependent mode.

26. The method of managing access requests in claim 1, wherein the step of identifying the computer software program making the write request further comprises identifying the computer software program and/or the computer software program's storage directory address on the long-term storage device that initiated the write request, whereby the computer software program and/or the program directory address is identified as the program that initiated the write request.

27. The method of managing access requests in claim 4, wherein the step of identifying the computer software program making the read request comprises identifying the computer software program initiating the read request and/or the program directory address of the computer software program initiating the read request, whereby the computer software program and/or the program directory address is identified as the program that initiated the read request.

28. The method in claim 1, wherein the step of redirecting said write request further comprises redirecting a second write request from a second program not associated with the computer software program, to a second alias file which is physically separate from both the specific file and the alias file even if the specific file directory address and specific file requested are the same for both programs, wherein redirecting said write request further comprises making the alias file associated with both the computer software program and the specific file, and wherein said second write request further comprises making the second alias file associated with both the second program and the specific file, wherein the alias file, the second alias file and the specific file are stored physically separate from each other.

29. The method of managing access requests in claim 28, further including the steps of:

e) identifying the computer software program making a read request to read the specific file at the specific file directory address on the long-term storage device and/or identifying the program directory address of the computer software program making the read request to read the specific file at the specific directory address on the long-term storage device, wherein said computer software program and/or program directory address is not associated with the specific file;

f) determining if the alias file exists that is associated with both the computer software program and the specific file, and/or associated with both the computer software program and the specific file directory address, and/or associated with both the program directory address and the specific file and/or associated with both the program directory address and the specific file directory address, wherein the specific alias file is physically separate from the specific file requested;

g) reading said specific alias file, if and only if, the specific alias file exists with association as determined by step f), and h) reading the specific file at the specific directory address, if and only if, the specific alias file does not exist with association as determined by step f), wherein steps g) and h) are interchangeable in execution order.

30. The method of managing access requests in claim 2, wherein a specific directory folder on the long-term storage device is operated under a write-restricted mode, and/or a load-restricted mode, and/or a restricted-folder mode, and/or a protected-folder mode, and/or a locked-folder mode, and/or a restricted-file mode, and/or a protected-file mode, and/or a locked-file mode, and/or a restricted-extension folder mode, and/or a non-executable folder mode, and/or a read-only folder mode, and/or a write-once folder mode, and/or a locked-files mode, and/or a safe-folder mode, and/or a registry protected mode, and/or a system protected mode, and/or a registry-restricted mode, and/or a temporary-folder mode, and/or time-dependent mode.

31. The method of managing access requests in claim 1, wherein the predetermined association between the computer software program and the specific file does exist if the specific file was originally written and/or modified at the request of the computer software program and/or was originally written and/or modified at the request of a second program called or directed by the computer software program.

32. The method of managing access requests in claim 1, wherein the hardware security controller is separate from an operating system executing on the computer, wherein one or more steps are implemented in the hardware-security controller, whereby the specific file is more secure from damage than if all the steps are implemented in software.

33. The method of managing access requests in claim 23, wherein one or more of the steps c) identifying, d) redirecting, e) writing, g) redirecting and h) accessing, are implemented in the hardware security device logically connecting the computer to the long-term storage device, whereby the plurality of files are more secure from damage than if all the steps are implemented in software.

34. The memory storage security system in claim 7, wherein at least a portion of the memory storage security system is implemented in hardware, wherein at least two or more of the seven items and limitations b) detecting means, c) identifying means, d) associating means, e) comparing means, f) writing means, limitation g), and limitation h) are implemented in hardware, whereby the stored files are more secure from damage than if all the items and limitations are implemented in software.

* * * * *